United States Patent [19]
Shimizu et al.

[11] Patent Number: 6,109,032
[45] Date of Patent: Aug. 29, 2000

[54] MECHANISM OF RETURNING TO NEUTRAL FOR AXLE DRIVING APPARATUS

[75] Inventors: Hiroaki Shimizu; Ryota Ohashi; Masaru Iida, all of Amagasaki, Japan

[73] Assignee: Kanzaki Kokyukoki Mfg. Co., Ltd., Kyogo-ken, Japan

[21] Appl. No.: 09/192,315

[22] Filed: Nov. 16, 1998

Related U.S. Application Data

[63] Continuation-in-part of application No. 08/872,672, Jun. 11, 1997, Pat. No. 5,836,159.

[30] Foreign Application Priority Data

Jun. 26, 1996 [JP] Japan ..................... 8-166225

[51] Int. Cl.⁷ ............... F16D 31/02; F01B 3/02
[52] U.S. Cl. ................ 60/468; 60/487; 91/489; 91/505
[58] Field of Search .......... 60/468, 487; 91/486, 91/489, 504, 505; 92/12.1, 12.2

[56] References Cited

U.S. PATENT DOCUMENTS

| | | | |
|---|---|---|---|
| 3,837,235 | 9/1974 | Peterson . | |
| 4,968,227 | 11/1990 | Szulczewski et al. | 91/497 |
| 5,094,077 | 3/1992 | Okada | 91/497 |
| 5,235,810 | 8/1993 | Havens | 60/468 |
| 5,239,827 | 8/1993 | Havens | 91/497 |
| 5,809,781 | 9/1998 | Krantz | 91/497 |
| 5,836,159 | 11/1998 | Shimizu et al. | 92/12.2 |

FOREIGN PATENT DOCUMENTS 720656  11/1965  Canada .

*Primary Examiner*—F. Daniel Lopez
*Attorney, Agent, or Firm*—Sterne, Kessler, Goldstein & Fox PLLC

[57] ABSTRACT

A hydrostatic transmission is provided comprising a hydraulic pump and a hydraulic motor fluidly connected with each other through a closed fluid circuit. Pistons press against a control arm connected with a movable swash plate of the hydraulic pump and generate a friction force when the movable swash plate, which has been rotated slantwise, automatically returns toward the neutral position by a neutral return spring. The movable swash plate gradually returns to the neutral position by pressure of the piston. A discharging oil hole is open at the utmost end of each of the pistons for draining a portion of operating oil which operates the piston in the closed fluid circuit to the interior of a housing. Grooves are formed along a surface of the control arm abutting against the pistons. When the movable swash plate is rotated between the neutral position and a predetermined position, the discharging oil holes are connected to the interior of the housing through the grooves so as to release the oil pressure out of the closed fluid circuit. Thus, braking shock can be moderated and the neutral position can be expanded.

12 Claims, 55 Drawing Sheets

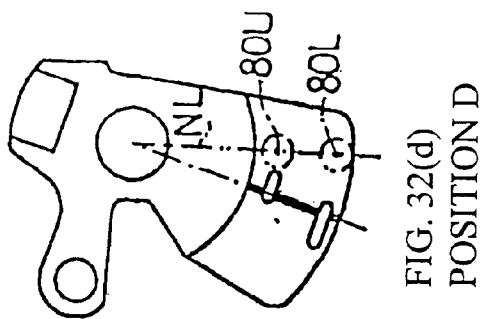
FIG. 32(d) POSITION D
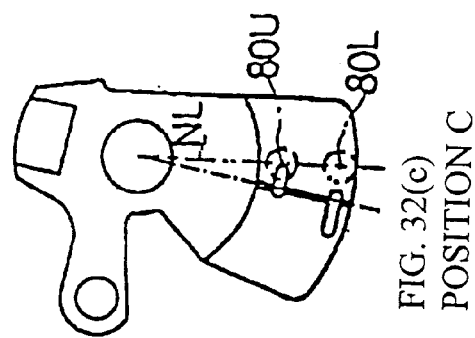
FIG. 32(c) POSITION C
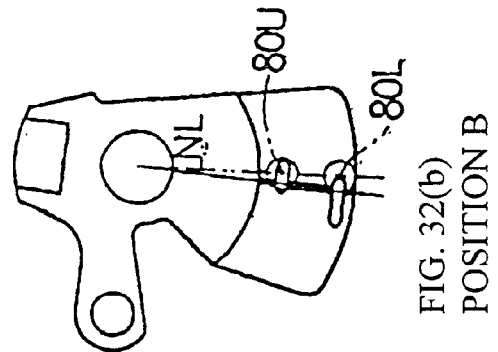
FIG. 32(b) POSITION B
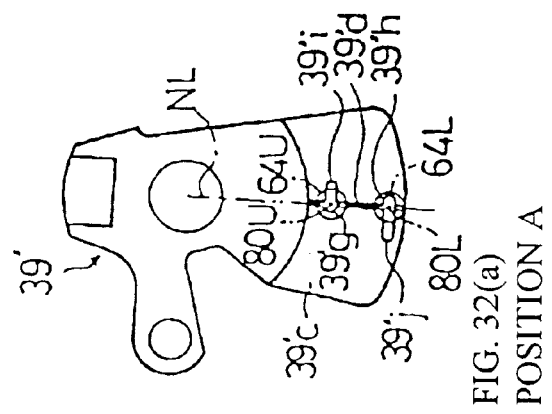
FIG. 32(a) POSITION A

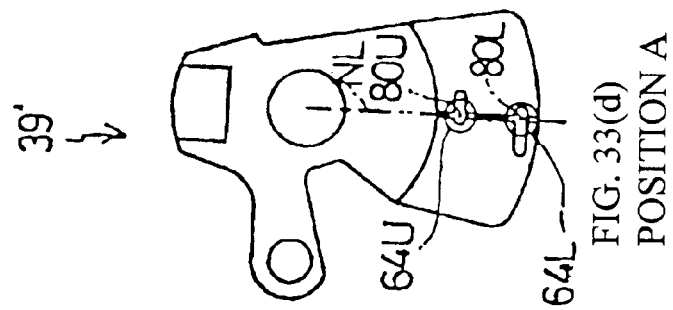
FIG. 33(d) POSITION A
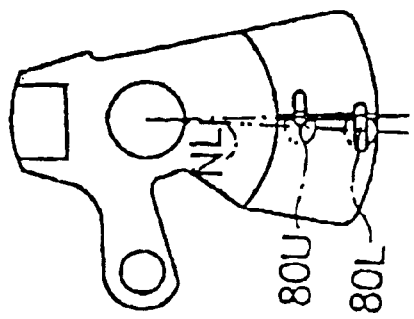
FIG. 33(c) POSITION E
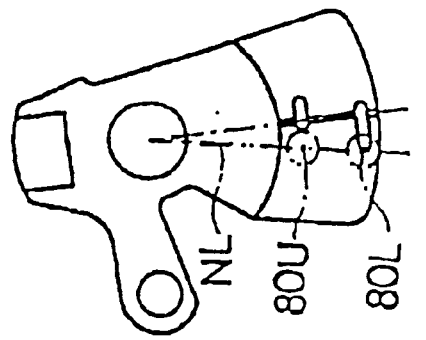
FIG. 33(b) POSITION F
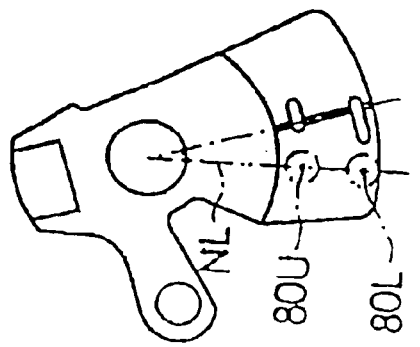
FIG. 33(a) POSITION G

MECHANISM OF RETURNING TO NEUTRAL FOR AXLE DRIVING APPARATUS

REFERENCE TO RELATED APPLICATION

This application is a Continuation-in-Part of application Ser. No. 08/872,672; filed Jun. 11, 1997, now U.S. Pat. No. 5,836,159, the disclosure of which is incorporated in its entirety by reference hereto.

BACKGROUND OF THE INVENTION

1. Field of the Invention

The present invention relates to a mechanism for automatically returning a movable swash plate to the neutral position in an axle driving apparatus which drives the axles thereof by a hydrostatic transmission (hereinafter referred to as an "HST") for steplessly changing the rotational speed of an engine, wherein resistance is given to the movable swash plate and pressure generated in a closed fluid circuit of the HST escapes therefrom when the movable swash plate returns to the neutral position, so as to prevent the vehicle from a sudden stop.

2. Related Art

Conventionally, an HST comprising a hydraulic pump and a hydraulic motor, which are fluidly connected through a closed fluid circuit, has a control arm which engages with a movable swash plate of the hydraulic pump. The quantity of oil discharged from the hydraulic pump can be changed in a stepless fashion by rotation of the control arm. The control arm is regularly biased by a neutral return spring, whereby the movable swash plate is automatically returned to its neutral position by the neutral return spring when an operator stops speed changing operation and releases the operational power. Accordingly, the movable swash plate suddenly returns to the neutral position when the operating force is released at a high speed position of the movable swash plate and operating oil which has smoothly circulated in the closed fluid circuit theretofore is blocked in the hydraulic pump so that the rotation of the hydraulic motor is suddenly stopped. In other words, a dynamic brake is applied. Therefore, a control arm is often provided with a shock absorber to prevent sudden returning to its neutral position, as disclosed in U.S. Pat. No. 5,094,077, for example.

A shock absorber which is provided to prevent the control arm from suddenly returning to its neutral position is disposed on the outside of the HST housing so as to enable mounting and exchange thereof However, a shock absorber which uses gas or fluid for shock absorption is heated by radiation of the housing which is heated by the rising temperature of the oil therein and is affected by the temperature of the outside air. The gas or fluid expands or contracts because of such a change of temperature so that operation of the shock absorber differs according to temperature or, in some cases, the neutral position can not be fixed at a high or a low temperature.

Further, a shock absorber mounted on the outside of the housing requires space for it to be mounted which can restrict the shape of the axle driving apparatus. As a result, the entire axle driving apparatus becomes larger. Also, because the shock absorber is mounted outside of the housing, the movable portion of the shock absorber is conventionally covered with a protector such as a rubber boot to avoid penetration of water, dust or other foreign matter, and therefore, requires an increase in the number of parts and in the cost.

SUMMARY OF THE INVENTION

The main object of the present invention is to provide a mechanism of returning to neutral for an axle driving apparatus, which can moderate a shock of deceleration by returning to neutral in advancing or reversing of a vehicle.

The second object of the present invention is to provide a mechanism of returning to neutral for an axle driving apparatus, which can moderate a starting shock of vehicle for advancing and reversing.

The third object of the present invention is to provided a mechanism of returning to neutral for an axle driving apparatus, which can prevent the vehicle left on a slope in neutral from suddenly self-descending.

The axle driving apparatus regarding to the present invention is constructed as follows:

Axles and a hydrostatic transmission as a combination of a variable capacity hydraulic pump and a hydraulic motor for driving axles are contained in fluid sump formed within a housing for the axle driving apparatus. The hydrostatic transmission is constructed such that suction and discharge ports of the hydraulic pump are respectively connected with discharge and suction ports of the hydraulic motor through fluid passages. The hydrostatic transmission is provided with a capacity changing member, which can be shifted between a neutral position making the hydraulic pump discharge substantially no fluid and an acting range making the hydraulic pump discharge fluid. A biasing member biases the capacity changing member in the acting range so as to return it to the neutral position. Orifices are provided which are connected to the fluid passages. A shutting member faces the orifices so as to be operable to open and shut the orifices toward the fluid sump. The shutting member is interlocked with the capacity changing member so that at least one of the orifices is open to the fluid sump during returning of the capacity changing member from the acting range to the neutral position. Pistons with the orifices provided therethrough are slidably fit to the oil passages and the outer surfaces thereof are pressed against the shutting member by hydraulic pressure in the oil passages. The shutting member is provided with grooves so as to communicate with the orifices of the piston pressed as such. Other biasing members for pushing the pistons are smaller than the biasing member for returning the capacity changing member to neutral.

In such a construction, to achieve the main object, a predetermined position is provided in the acting range, so that when returning the capacity changing member in the acting range to the neutral position, the shutting member shuts both the orifices of the pistons until it reaches the predetermined position, and after the capacity changing member passes the predetermined position until the neutral position, it allows one of the orifices to open toward the fluid sump while still shutting the other orifice.

Alternatively, the shutting member is constructed such that during returning of the capacity changing member in the acting range to the neutral position, it shuts one of the orifices and allows the other orifice to open toward the fluid sump at any position in the acting range.

To achieve the second object, the shutting member is constructed such that at the moment that the capacity changing member leaves the neutral position, it allows both the orifices to open toward the fluid sump, and when the capacity changing member is further apart from the neutral position, the shutting member shuts one of the orifices.

To achieve the third object, the shutting member is constructed such that when the capacity changing member is in the neutral position, it allows both the orifices to open partly toward the fluid sump, or it allows both the orifices to open fully in case that the orifices are diametrically small enough, or the shutting member shuts both the orifices in case that another member for giving a dead zone of the neutral position is provided, or it shuts one of the orifices.

BRIEF DESCRIPTION OF THE FIGURES

FIG. 32A–D are views showing the same control arms 39' at various positions in series of its advancing range A;

FIG. 33A–D are views showing the same control arms 39' at various positions in series of its reversing range R;

DESCRIPTION OF THE PREFERRED EMBODIMENT

Figure 1:
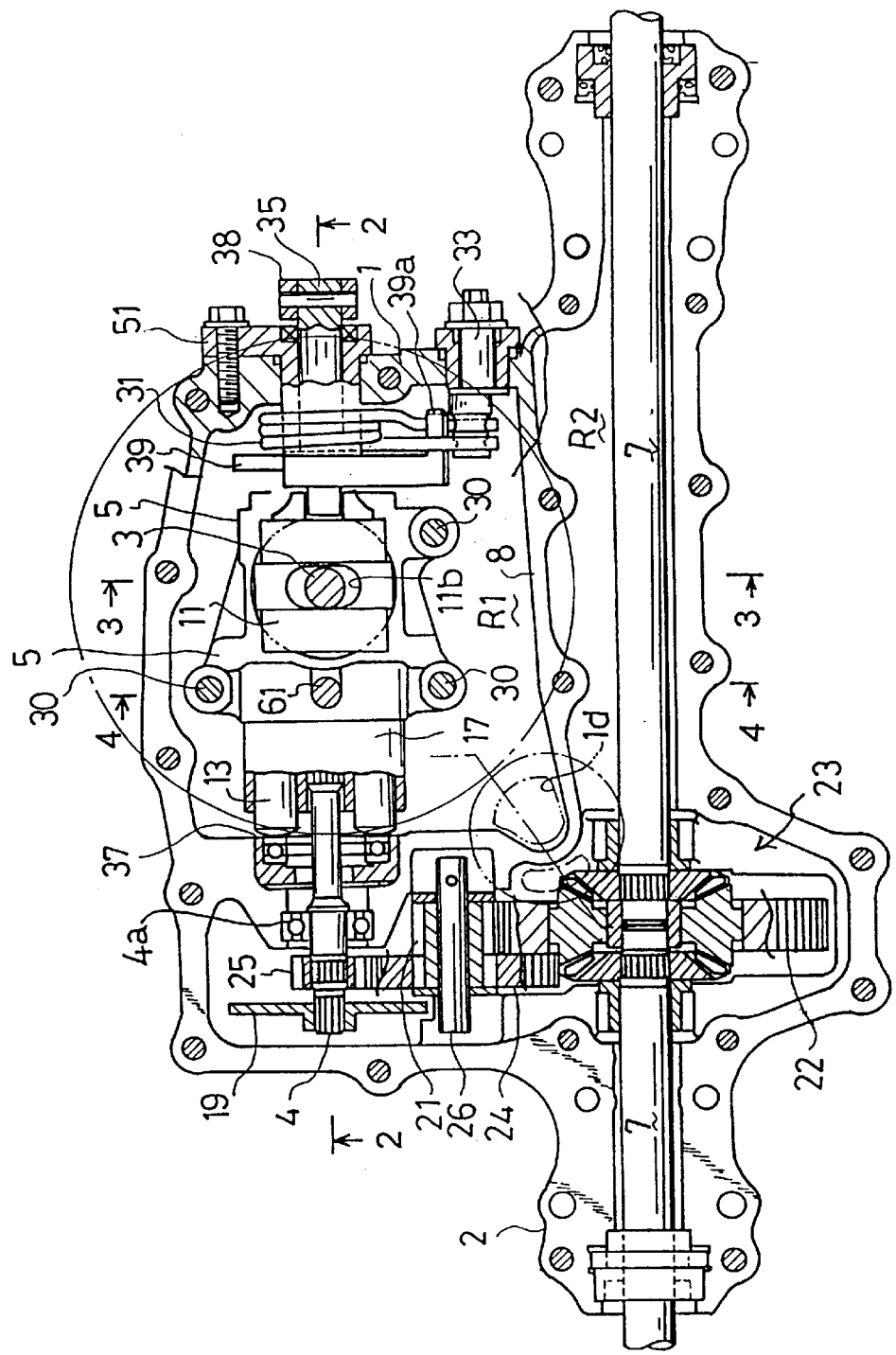
FIG. 1 is a plan view, partly in cross section, of an axle driving apparatus of the present invention, from which an upper half housing has been removed.

Explanation will first be given on the entire construction of an axle driving apparatus having the neutral return mechanism of the present invention. FIGS. 1, 2, 3 and 4 show a housing constructed by joining an upper half housing 1 and a lower half housing 2 along horizontal joint surfaces. At the joint surfaces is provided a bearing for a motor shaft 4. Bearings for axles 7 are shifted upwardly from the joint surfaces of the housing and are disposed in upper half housing 1 to rotatably support axles 7. Axles 7 are differentially coupled by a differential gear unit 23. One end of each axle 7 projects laterally from the housing, The interior of the housing is divided by an inner wall 8 into a first chamber R1 for housing an HST and a second chamber R2 for housing differential gear unit 23, a transmission gear unit for transmitting power from motor shaft 4 to differential gear unit 23 and axles 7. First and second chambers R1 and R2 are filled with lubricating oil in common so as to form an oil sump. An air reservoir (not shown) is formed above differential gear unit 23 in upper half housing 1. An oil supply hole is bored through the portion of the housing which is above the air reservoir, enabling oil to be supplied thereto.

Figure 5:
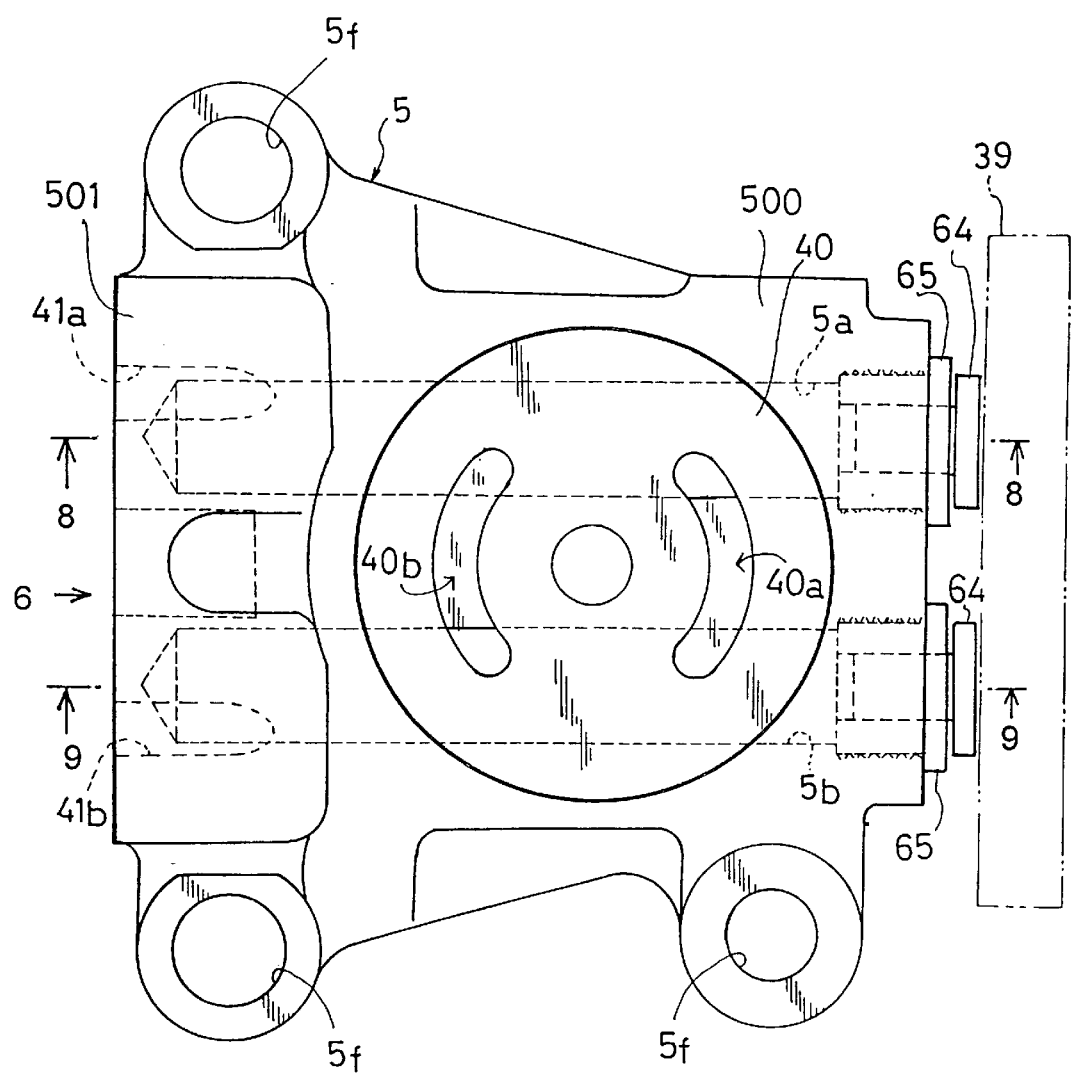
FIG. 5 is a plan view of center section 5 of the present invention.

Within first chamber R1 is mounted a center section 5 which is L-like shaped when viewed from the side and has a horizontal portion 500 and a vertical portion 501. At the peripheral portions of horizontal portion 500 are vertically open through bores 5f at three positions, as shown in FIG. 5. A mounting bolt 30 is inserted into each through bore 5f from below to fix center section 5 to the inside of upper half housing 1. On the upper surface of horizontal portion 500 of center section 5 is formed a pump mounting surface 40. A cylinder block 16 is rotatably and slidably disposed thereon. Pistons 12 are fitted, through biasing springs, into a plurality of cylinder bores in cylinder block 16 and are reciprocally movable. A thrust bearing 11a of a movable swash plate 11 abuts against the heads of pistons 12. An opening 11b is provided at the center of movable swash plate 11 so as to enable a pump shaft 3 to perforate therethrough. Pump shaft 3 is also used as an input shaft and is vertically disposed and is not relatively rotatably retained onto the axis of rotation of cylinder block 16, thereby constituting an axial piston type hydraulic pump. Pump shaft 3 projects outwardly at the upper end thereof from upper half housing 1. An input pulley 43, with a cooling fan 44, is fixed onto pump shaft 3. Input pulley 43 receives power from a prime mover (not shown) through a belt transmitting mechanism (also not shown).

Figure 6:
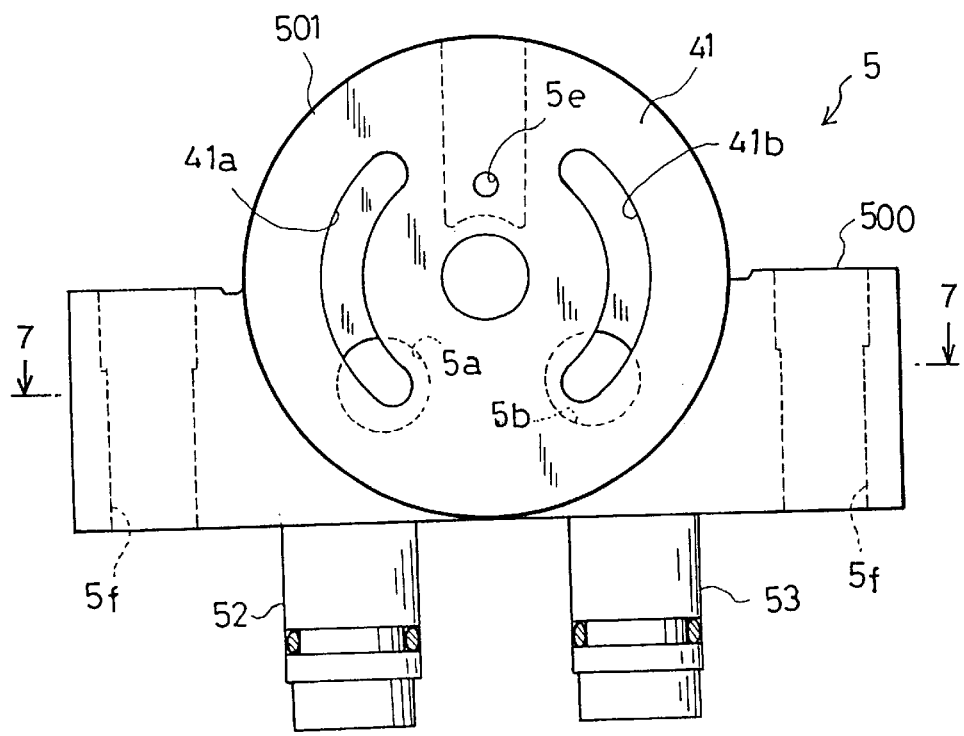
FIG. 6 is a view looking in the direction of arrow 6 in FIG. 5.

As shown in FIG. 6, at the outside surface of vertical portion 501 of center section 5 is formed a motor mounting surface 41 on which a cylinder block 17 is rotatably supported. A plurality of pistons 13 are fitted into a plurality of cylinder bores in cylinder block 17. Pistons 13 are reciprocally movable whereby the heads thereof abut against a fixed swash plate 37 which is fixedly sandwiched between upper half housing 1 and lower half housing 2. Motor shaft 4 is horizontally disposed on the axis of rotation of cylinder block 17 and is not relatively rotatably retained thereto so as to constitute an axial piston type hydraulic motor. Motor shaft 4 is also rotatably supported by a bearing bore provided on vertical portion 501 of center section 5 and by a bearing 4a with a seal held at the joint surfaces of upper half housing 1 and lower half housing 2.

Figure 2:
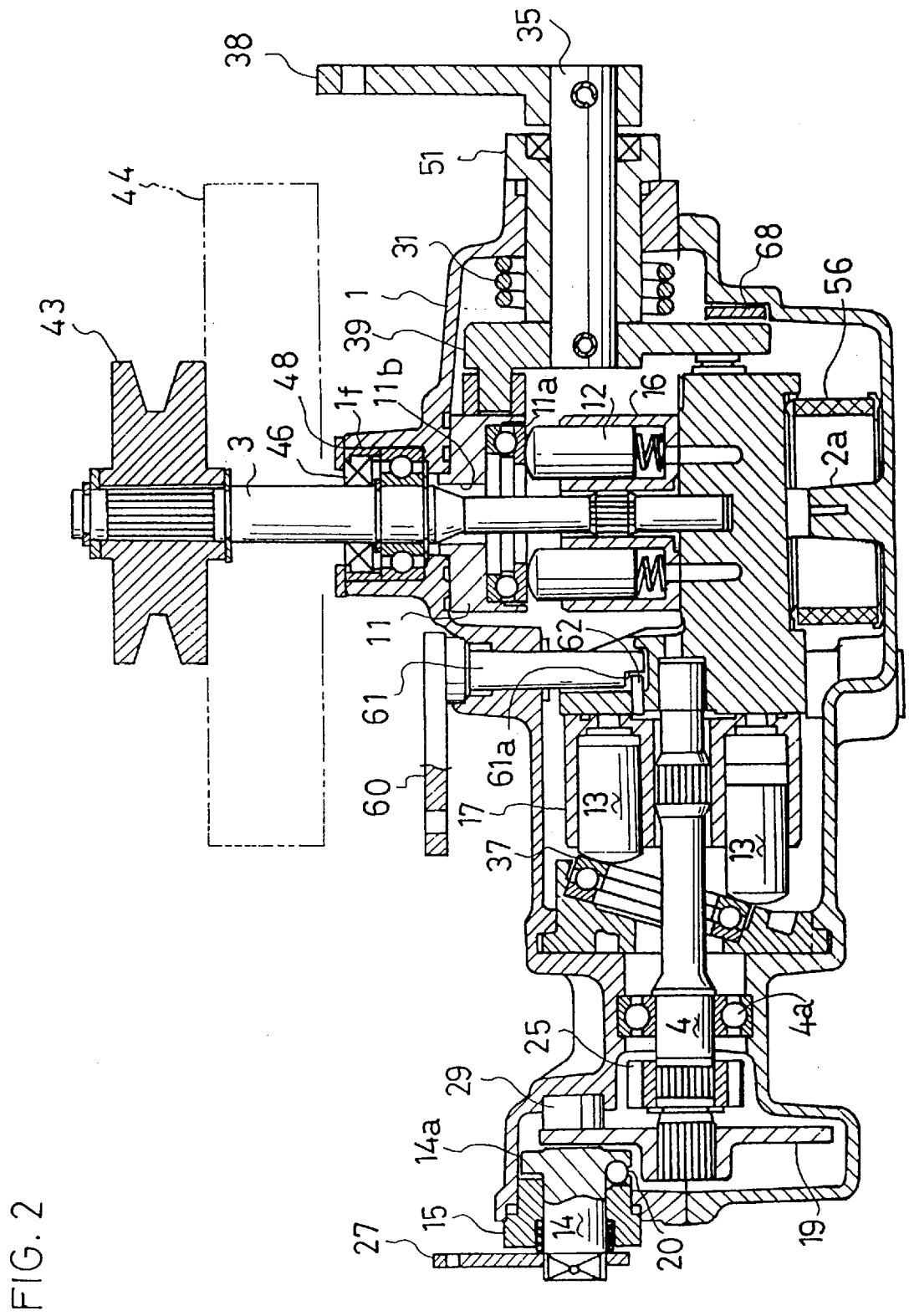
FIG. 2 is a cross-sectional view looking in the direction of arrows 2—2 in FIG. 1.

Transmission gear unit for transmitting power from motor shaft 4 to differential gear unit 23 is shown in FIGS. 1 and 2. A gear 25 engageable with a larger diameter gear 24 on counter shaft 26 is provided on motor shaft 4 where it enters into second chamber R2. A smaller diameter gear 21 on counter shaft 26 engages with a ring gear 22 of differential gear unit 23. Ring gear 22 drives differential gear unit 23 so as to transmit power to left and right axles 7.

As shown in FIG. 2, a brake disk 19 is fixed onto an axial end of motor shaft 4 positioned in second chamber R2. A brake operating shaft 14 is supported by upper half housing 1 through a bush 15. A brake arm 27 is fixed to the outer end of brake operating shaft 14 projecting from the housing. When brake arm 27 is rotated, balls 20 ride on cam grooves provided on a flange 14a. Brake operating shaft 14 slides toward brake disk 19, so that the brake disk 19 is put between the inner end surface of brake operating shaft 14 and a brake pad 29, thereby exerting a braking action to motor shaft 4.

As shown in FIG. 5, a pair of arcuate ports 40a and 40b are open along pump mounting surface 40 on horizontal portion 500 of center section 5 so that the feed oil discharged from cylinder block 16 is introduced into center section 5. As shown in FIG. 6, a pair of arcuate ports 41a and 41b are open on the motor mounting surface 41 of vertical portion 501 thereby introducing feed discharge oil into center section 5 from cylinder block 17.

Figure 7:
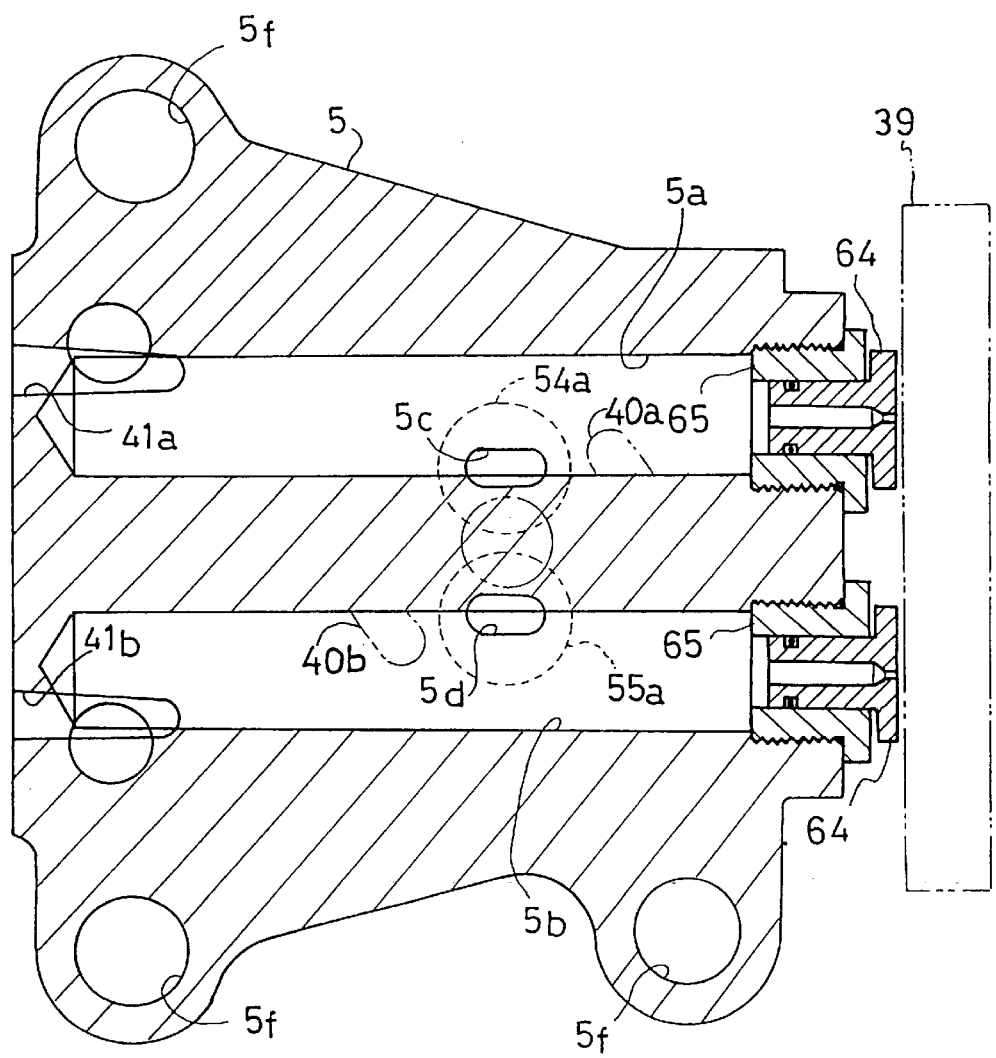
FIG. 7 is a cross-sectional view looking in the direction of arrows 7—7 in FIG. 6.
Figure 8:
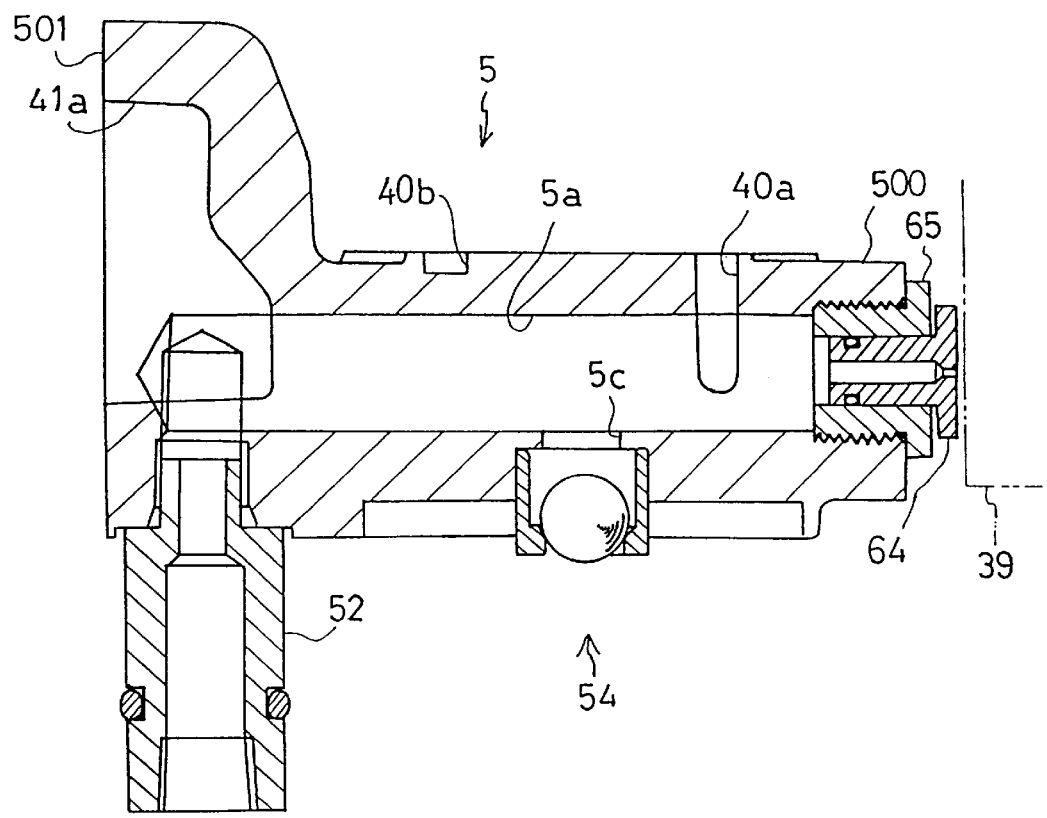
FIG. 8 is a cross-sectional view looking in the direction of arrows 8—8 in FIG. 5.
Figure 9:
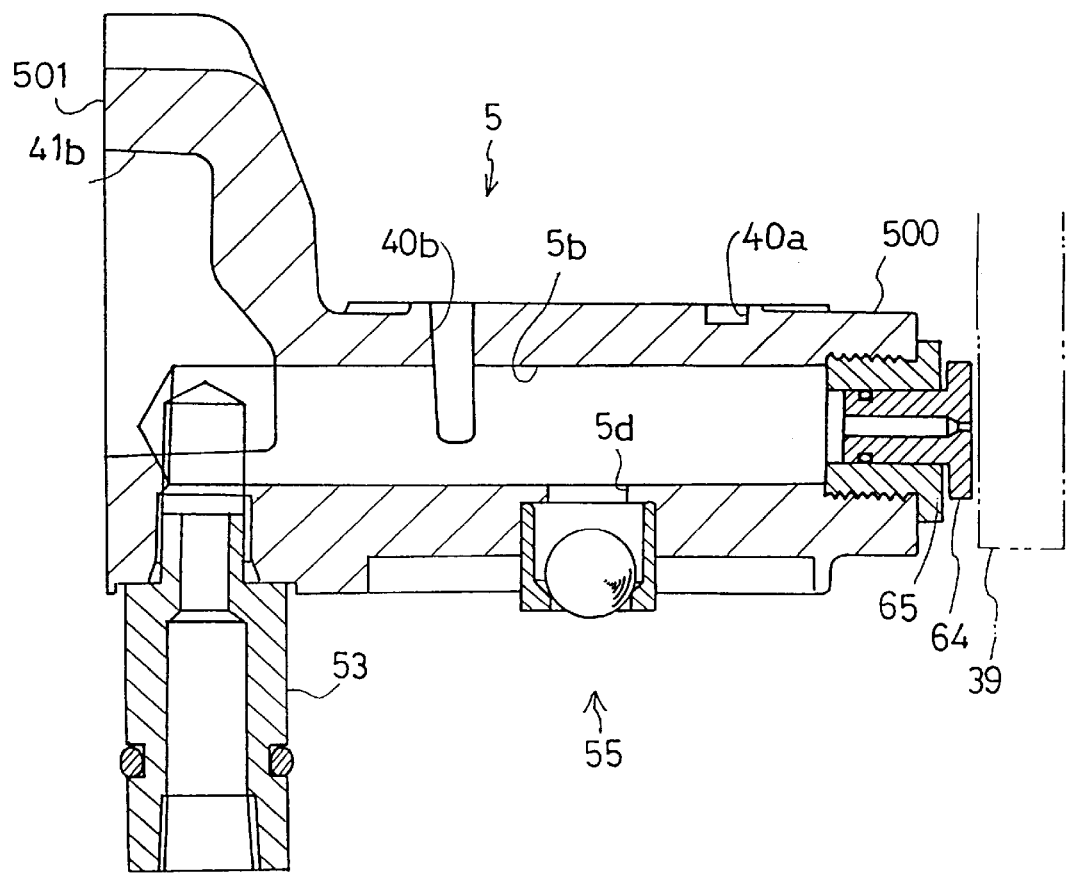
FIG. 9 is a cross-sectional view looking in the direction of arrows 9—9 in FIG. 5.

As shown in FIG. 7, a linear first oil passage 5a and a linear second oil passage 5b are drilled in parallel with each other within the thick horizontal portion 500 of center section 5 forming a closed fluid circuit for circulating operating oil between the hydraulic pump and the hydraulic motor. As shown in FIGS. 8 and 9, oiling pipes 52 and 53 communicating with first and second oil passages 5a and 5b are disposed on the lower surface of horizontal portion 500 of center section 5 and are exposed at the lower ends thereof at the outer bottom surface of lower half housing 2. After the axle driving apparatus has been assembled, the closed fluid circuit is filled with operating oil from the open end of each oiling pipe 52 and 53. Thereafter, the open end of each oiling pipe 52 and 53 is closed by a plug.

Figure 3:
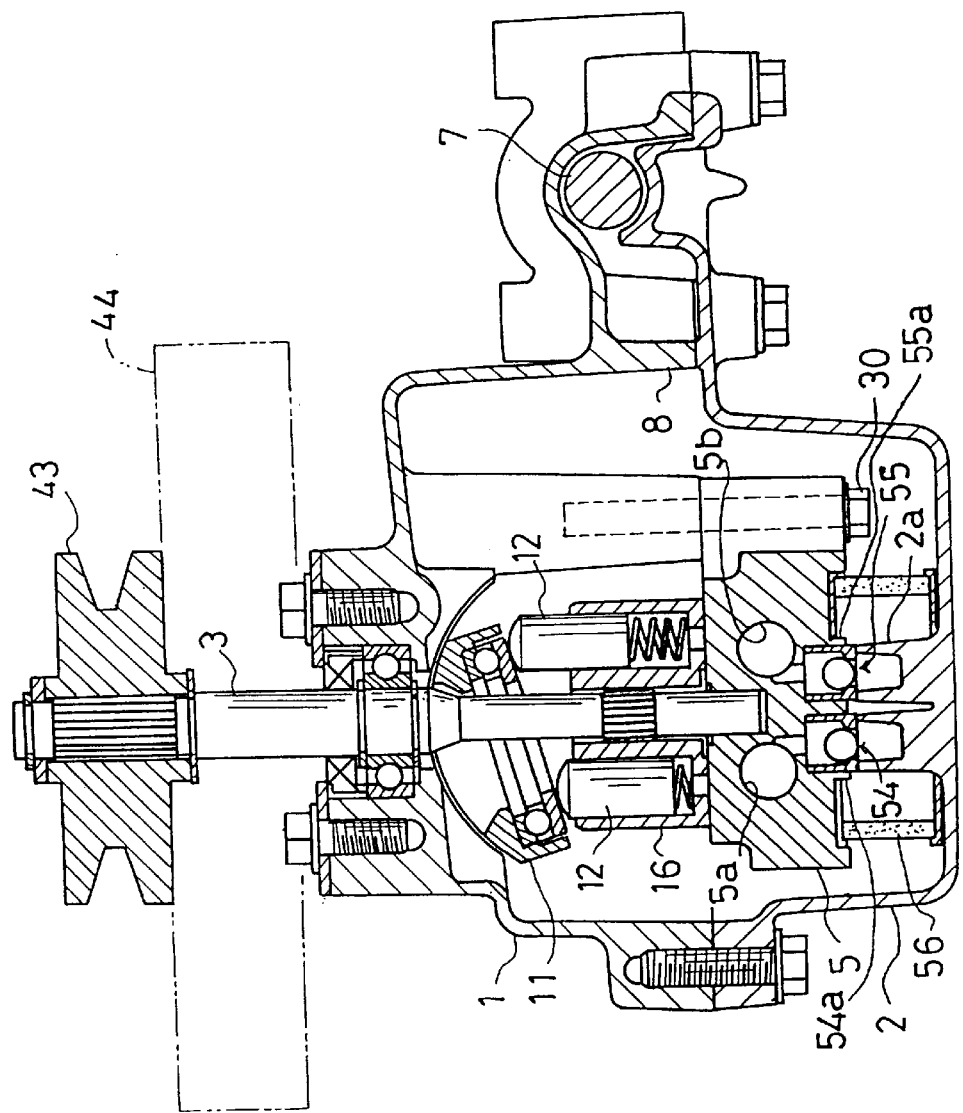
FIG. 3 is a cross-sectional view looking in the direction of arrows 3—3 in FIG. 1.

As shown in FIGS. 3, 7, 8 and 9, oil holes 5c and 5d are branched downwardly from the intermediate portion of first and second oil passages 5a and 5b. Oil holes 5c and 5d are open on the lower surface of horizontal portion 500 of center section 5. Check valves 54 and 55, which automatically open merely when oil is supplied, are disposed in the open end of oil holes 5c and 5d, respectively. As shown in FIG. 3, valve casings 54a and 55a are supported on projections 2a which project upwardly from the inner bottom surface oflower half housing 2. An annular oil filter 56 is disposed in the oil sump between the lower surface of center section 5 and the inner bottom surface of lower half housing 2 and surrounds projections 2a.

Figure 4:
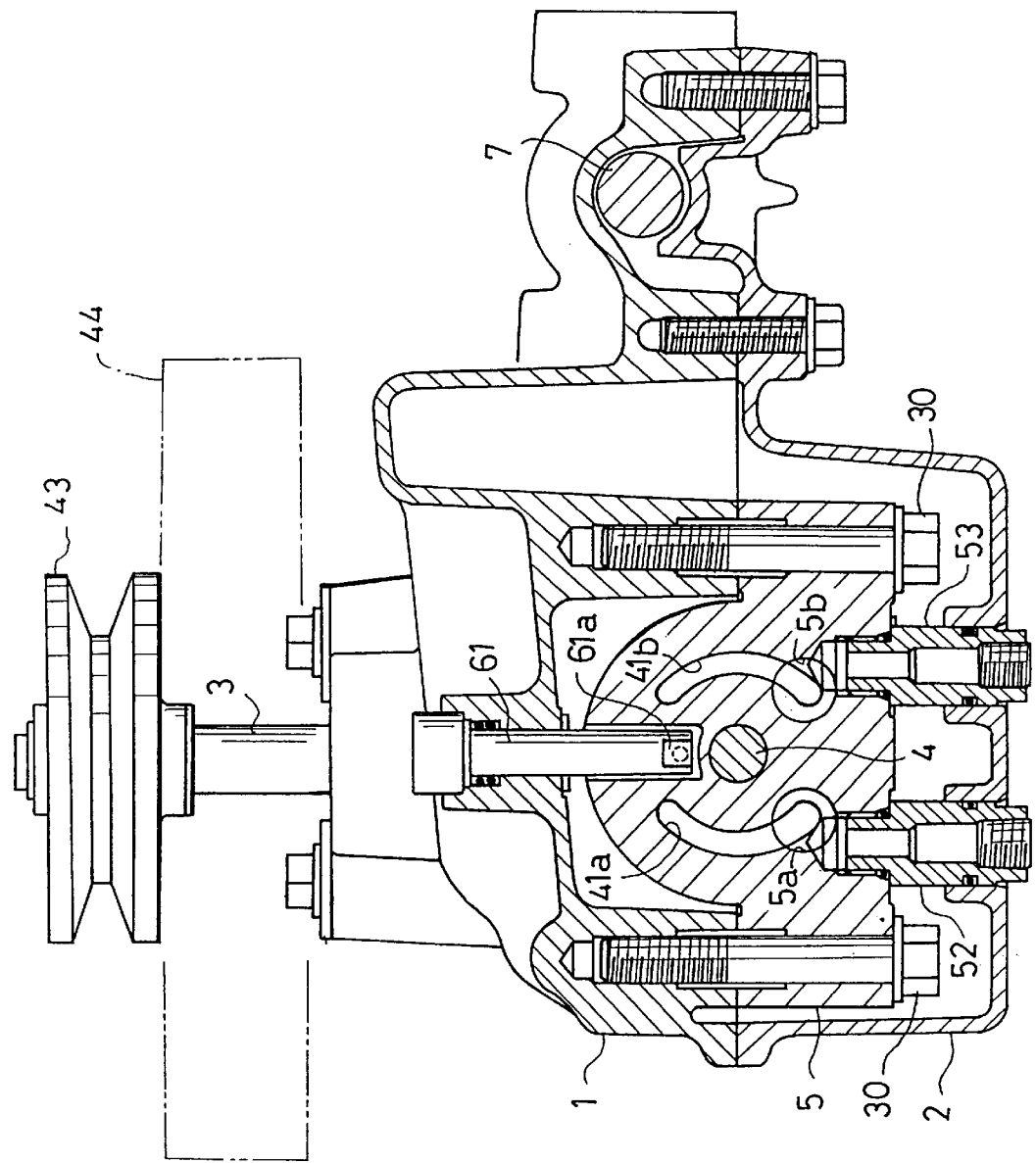
FIG. 4 is a cross-sectional view looking in the direction of arrows 4—4 in FIG. 1.

As shown in FIGS. 2 and 4, a by-pass operating arm 60 is disposed on upper half housing 1 so as to open first and second oil passages 5a and 5b into the oil sump for enabling axles 7 to be idle when the vehicle is hauled. In particular, by-pass operating arm 60 is fixed at the base thereof to an upper end of a by-pass shaft 61 which is vertically and pivotally supported to the upper wall of upper half housing 1. By-pass shaft 61 extends at the lower end thereof into vertical portion 501 of center section 5, so that a flat surface 61 a formed at the side surface of the lower end thereof abuts one end of a push pin 62 which can abut at the other end thereof against the rotatable slidable surface of cylinder block 17 supported on vertical portion 501. When an operator operates by-pass operating arm 60 outside of the housing for hauling the vehicle, by-pass shaft 61 is rotated and flat surface 61 a at the lower end thereof diagonally presses push pin 62 toward cylinder block 17. First and second oil passages 5a and 5b communicate with the oil sump in the housing through arcuate ports 41 a and 4 1b, thereby enabling motor shaft 4 to be idle.

Figure 12:
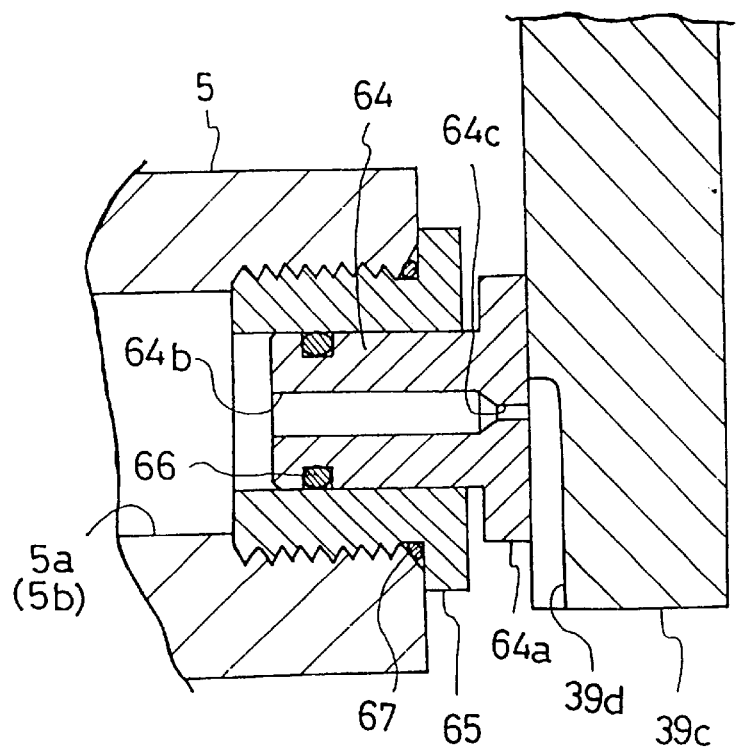
FIG. 12 is a cross-sectional view looking in the direction of arrows 12—12 in FIG. 10.

As shown in FIGS. 7, 8, 9 and 12, pistons 64 constituting the neutral return means of the present invention are horizontally and slidably disposed in the open end portions of first and second oil passages Sa and 5b which are open at the side surface of horizontal portion 500 of center section 5, opposite to vertical portion 501. Each piston 64 is cylindrical and has a large diametric flange 64a formed at the outside end thereof Each piston 64 is slidably inserted into an axial opening through a bush 65 which is screwed into the open end of each of first and second oil passages 5a and 5b. As best seen in FIG. 12, a seal 66 is disposed between each bush 65 and the external surface of piston 64. A seal 67 is disposed between each bush 65 and center section 5. Seals 66 and 67 prevent oil from leaking. An oil passage 64b is bored along the axis of piston 64. A discharging oil hole 64c having a diameter smaller than oil passage 64b, is formed in the closed end of oil passage 64b. Each oil passage 5a and 5b can be opened to the outside of the closed fluid circuit through oil passage 64b and discharging oil hole 64c.

Figure 10:
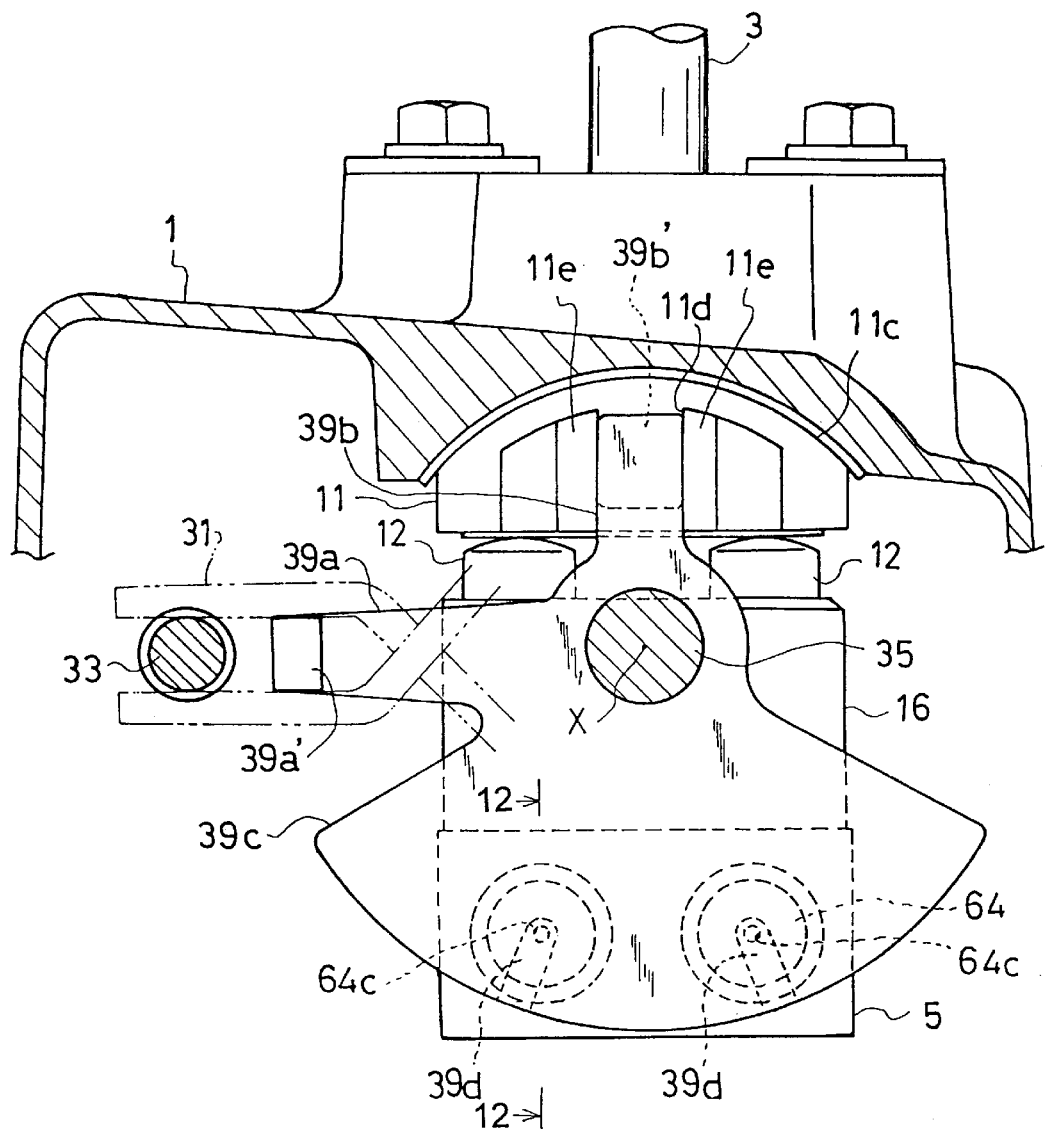
FIG. 10 is a partial cross-sectional side view of the axle driving apparatus of the present invention showing a side view of operational members of movable swash plate 11.

Movable swash plate 11 is constructed for slanting movement. As shown in FIGS. 1, 2 and 10, a bush 51 is disposed on a side wall of upper half housing 1 positioned on a phantom extension line of the center of curvature X of convex portion 11c at a back surface of movable swash plate 11. Bush 51 rotatably supports a control shaft 35. Onto the outer end of control shaft 35, outside of the housing is fixed a control lever 38 to enable movable swash plate 11 to be slantingly operated from the exterior of the housing. Control lever 38 is connected through a control rod (not shown) and may be pushed or pulled longitudinally to control a speed changing member (not shown) of the vehicle, such a lever or a pedal (not shown) provided on the vehicle.

As shown in FIG. 10, a control arm 39 is fixed to the inner end of control shaft 35 within the housing, and comprises a first arm 39a, a second arm 39b and a radially extending, fan-shaped contact plate 39c. Contact plate 39c may be divided from control arm 39 so long as contact plate 39c rotates following control arm 39.

Figure 11:
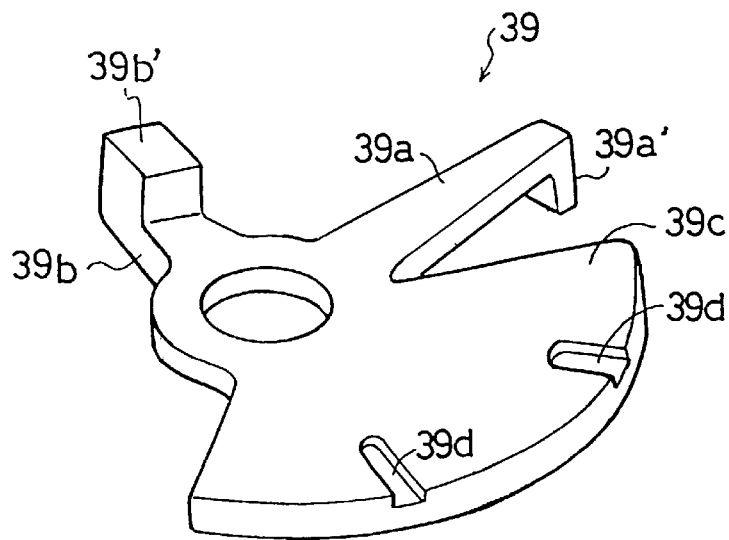
FIG. 11 is a perspective view of control arm 39.

As best seen in FIG. 11, first arm 39a extends horizontally and forms, at one end thereof, an engaging portion 39a' for paralleling control shaft 35. Second arm 39b extends upwardly and forms, at one end thereof, an engaging portion 39b' for paralleling control shaft 35. Engaging portions 39a' and 39b' project in opposite directions from each other.

Engaging portion 39b' is connected to a groove 11d provided in a side surface of movable swash plate 11. Groove 11d is formed between a pair of engaging projections 11e disposed on the side surface of movable swash plate 11 and are longitudinally spaced apart at a predetermined interval. In such a construction, when control arm 38 is rotated around an axis lateral to the vehicle body, resulting in being rotated longitudinally of the vehicle body, control arm 39 rotates longitudinally around control shaft 35 to enable movable swash plate 11 to be slantingly operated and the hydraulic pump to be operated to change the quantity and direction of its discharging oil.

As shown in FIGS. 2 and 10, a coiled neutral return spring 31 is fitted onto bush 51. Both ends of neutral return spring 31 are crossed to extend in the direction of first arm 39a and sandwich between them an eccentric shaft 33. As shown in FIG. 1, eccentric shaft 33 is mounted to an inside wall of upper half housing 1 near control shaft 35 and engaging portion 39a' formed at one end of control arm 39.

Accordingly, when control lever 38 is turned to change the vehicle speed, control arm 39 is turned and one end of neutral return spring 31 is moved away from the other end, which is received by eccentric shaft 33, thereby applying a biasing force to control lever 38 to return it to the neutral position. When operating force to the speed changing member is released, a restoring force generated at one end of neutral return spring 31 returns engaging portion 39a' toward eccentric shaft 33 so as to hold control arm 38 in the neutral position. The extension of eccentric shaft 33 outside of the housing creates an adjusting screw. When the adjusting screw is loosened and eccentric shaft 33 is rotatably shifted, control arm 39 is shifted around control shaft 35 through neutral return spring 31 so that movable swash plate 11 can be adjusted to be in an accurate neutral position.

Contact plate or shutting member 39c is fan-shaped around a center of curvature X so as to abut against pistons 64 along its entire rotational range between the furthest forward and furthest rearward positions, including a neutral position. As shown in FIGS. 10, 11 and 12, grooves 39d are formed in contact plate 39c at positions which abut against discharging oil holes 64c of pistons 64 when control arm 39 is in the neutral position, and extend therefrom to the fringe of fan-shaped contact plate 39.

The interior of the closed fluid circuit is connected with the oil sump in the housing through grooves 39d and discharging oil holes 64c. When control arm 39 is rotated from the neutral position so that movable swash plate 11 is slantingly rotated beyond a predetermined angle, discharging oil holes 64c are cut off from contact with grooves 39d. The surface of contact plate 39c abutting oil holes 64c at this time is smooth and plain. As shown in FIG. 2, a retaining plate 68 is disposed at a side of contact plate 39c opposite to oil holes 64c and is fixed to the inner portion of lower half housing 2. When pistons 64 are advanced by oil pressure, contact plate 39c is sandwiched between pistons 64 and retaining plate 68 so as to be given a rotational resistance against the biasing force of neutral return spring 31.

Figure 13:
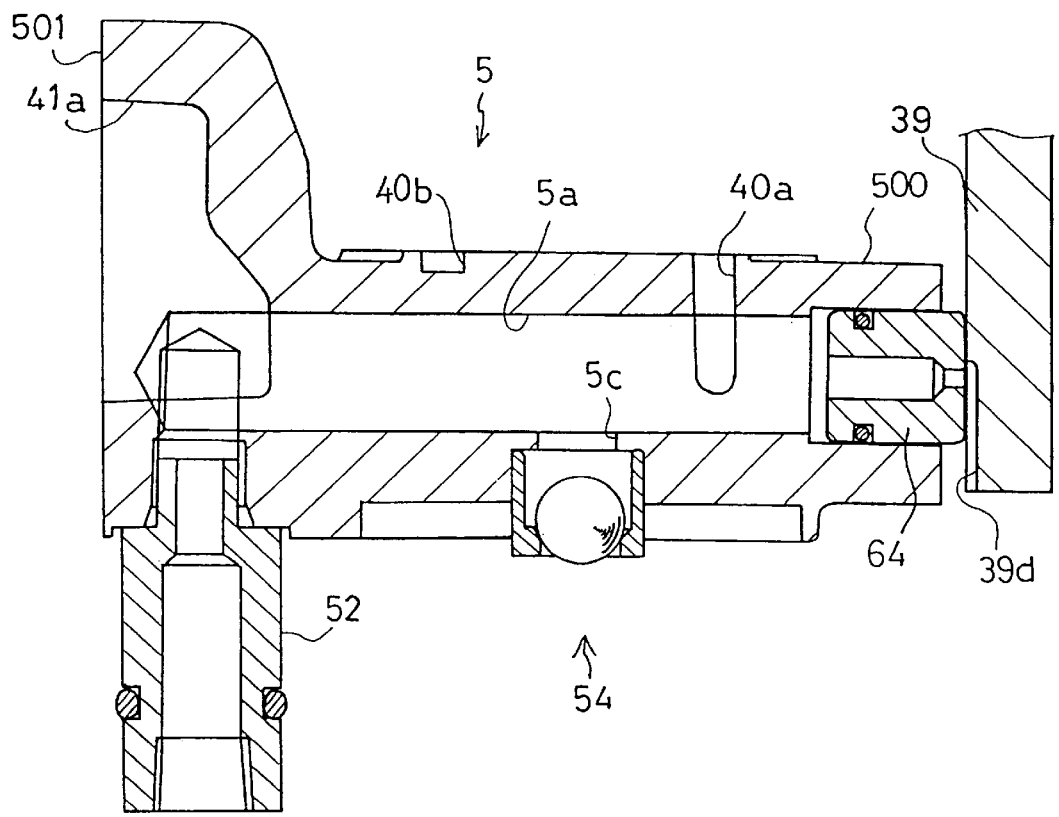
FIG. 13 is a cross-sectional view of a principal part of another embodiment of the present invention showing the disposition of pistons 64 in center section 5.

Alternatively, contact plate 39c may be disposed between pistons 64 and the inner wall of lower half housing 2, without a retaining plate 68 so as to provide rotational resistance directly by the inner wall of lower half housing 2. Further, rather than being screwed into bushes 65 in the open ends of first oil passage 5a and second oil passage 5b, pistons 64 can be directly, slidably inserted into the open ends of first oil passage 5a and second oil passage 5b, as shown in FIG. 13.

When control lever 38 is rotated by operating a speed changing member, control arm 39 is rotated by control shaft 35 so as to slantingly rotate movable swash plate 11 which is connected by engaging portion 39b' to engaging projections 11e thereof, thereby changing the quantity of fluid discharged from the hydraulic pump. Accordingly, the rotational direction and speed of motor shaft 4 of the hydraulic motor is shifted to correspond with the rotational direction and degree of the speed changing member, so as to transmit driving force to axles 7.

In this case, whichever of first oil passage 5a and second oil passage 5b has higher pressure oil receives pressure in proportion to the load on axles 7 so that one of pistons 64 slides outwardly and pushes against contact plate 39c of control arm 39. The friction force generated by such pushing is set to be smaller than the biasing force of neutral return spring 31. Therefore, an operator must operate the speed changing member with an operating force exceeding the friction force and the biasing force. After movable swash plate 11 is slantingly rotated beyond the predetermined position, discharging oil holes 64c of pistons 64 are sealed by the smooth and plain surface of contact plate 39c, whereby operating oil circulating in the closed fluid circuit does not leak therefrom so as to maintain the volume efficiency of the HST.

In such a condition, when the operator releases operating force applied to the speed changing member, control arm 39 is rotated toward the neutral position by the biasing force of neutral return spring 31. Pressure of piston 64 generates a friction force against contact plate 39c of contact plate 39, as above mentioned, causing a resistant against the rotation toward the neutral position. Thereby, control arm 39 is gradually rotated toward the neutral position. As a result, a dynamic brake is not applied so that a vehicle does not stop suddenly.

When control arm 39 reaches the proximity of the neutral position, discharging oil holes 64c of pistons 64 communicate with grooves 39d so that the pushing force of pistons 64 against contact plate 39c and any remaining pressure in the closed fluid circuit escapes, thereby moderating the braking shock and enlarging the range of the neutral position of the HST.

One of pistons 64 is disposed in the high-pressure oil passage for running the vehicle in a forward direction, the other is disposed in the high-pressure oil passage running the vehicle in a reverse direction. Both of the high-pressure oil passages, first oil passage 5a and second oil passage 5b, are separated from each other so that an operational condition of one piston 64 does not interfere with that of the other piston 64. Hence, the operational condition of each piston 64 can be adjusted individually so as to enable each of the friction forces against contact plate 39c to meet the individual requirements to braking the vehicle when advancing and when backing the vehicle up. As a result, a vehicle can avoid stop shock when braking both in the case of an advancing vehicle and one that is backing up.

Figure 14:
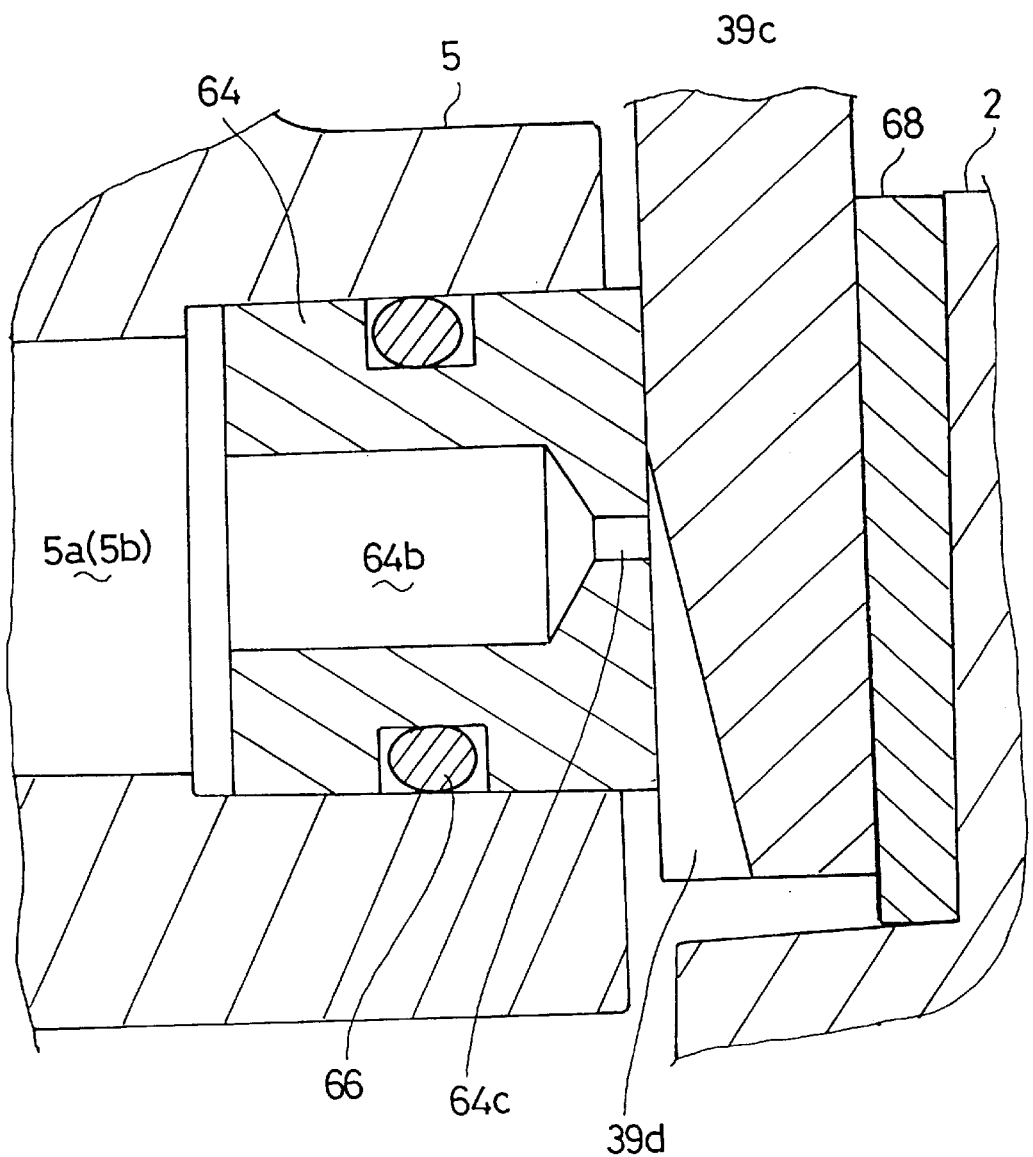
FIG. 14 is a cross-sectional view of a principal part of a further embodiment of the present invention showing the shape of groove 39d on the surface of control arm 39 in contact with piston 64.
Figure 15:
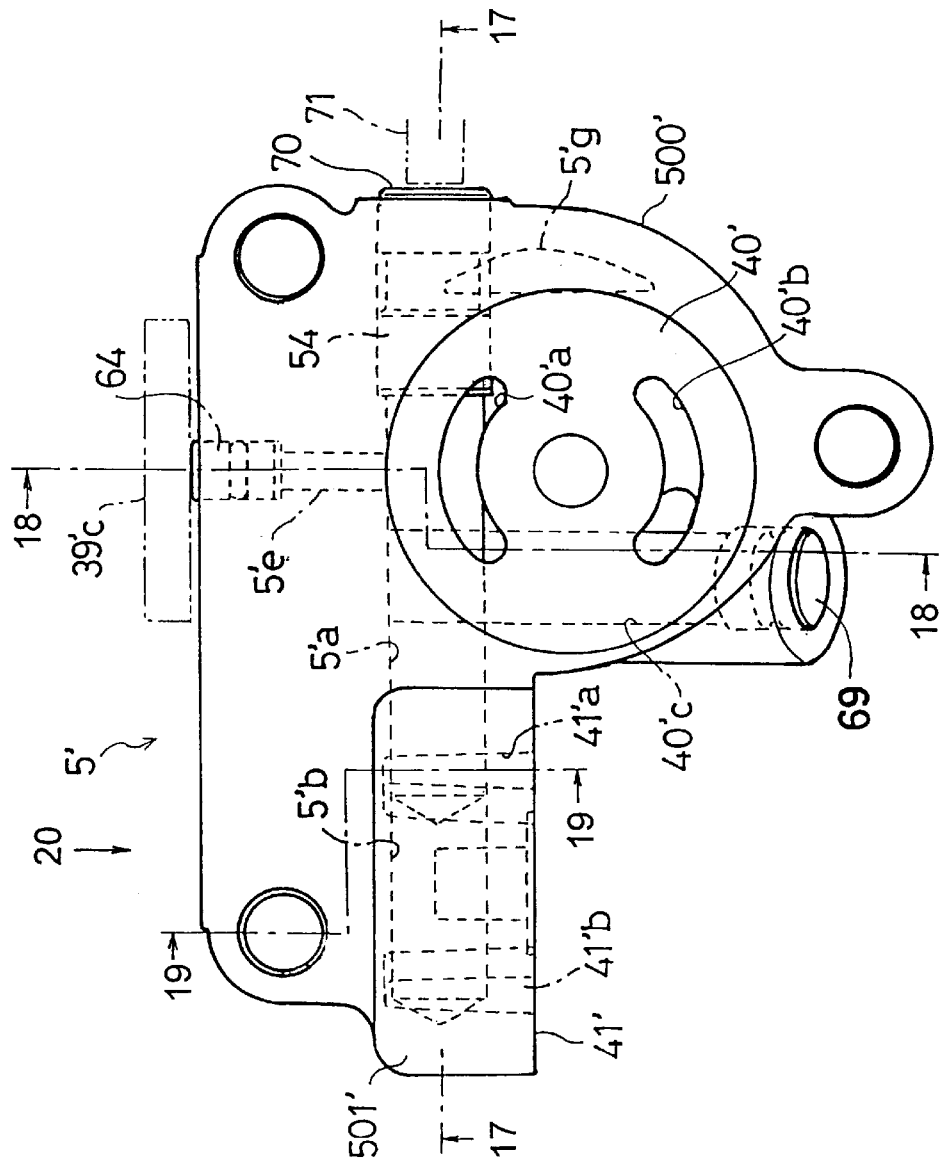
FIG. 15 is a plan view of center section 5'.

The operational condition of each piston 64 can be adjusted by modifying the diameter of discharging oil hole 64c and/or the width or shape of groove 39d. In FIG. 14 is disclosed an alternative embodiment of the present invention in which the shape of groove 39d has been modified. In this embodiment, the depth of the grove varies in that groove 39d is shallower the closer it is to communicating with discharging oil hole 64c. This modification of groove 39d can also be applied to the embodiment of the invention in which bush 65 is interposed between piston 64 and center section 5, as shown in FIG. 12.

Figure 16:
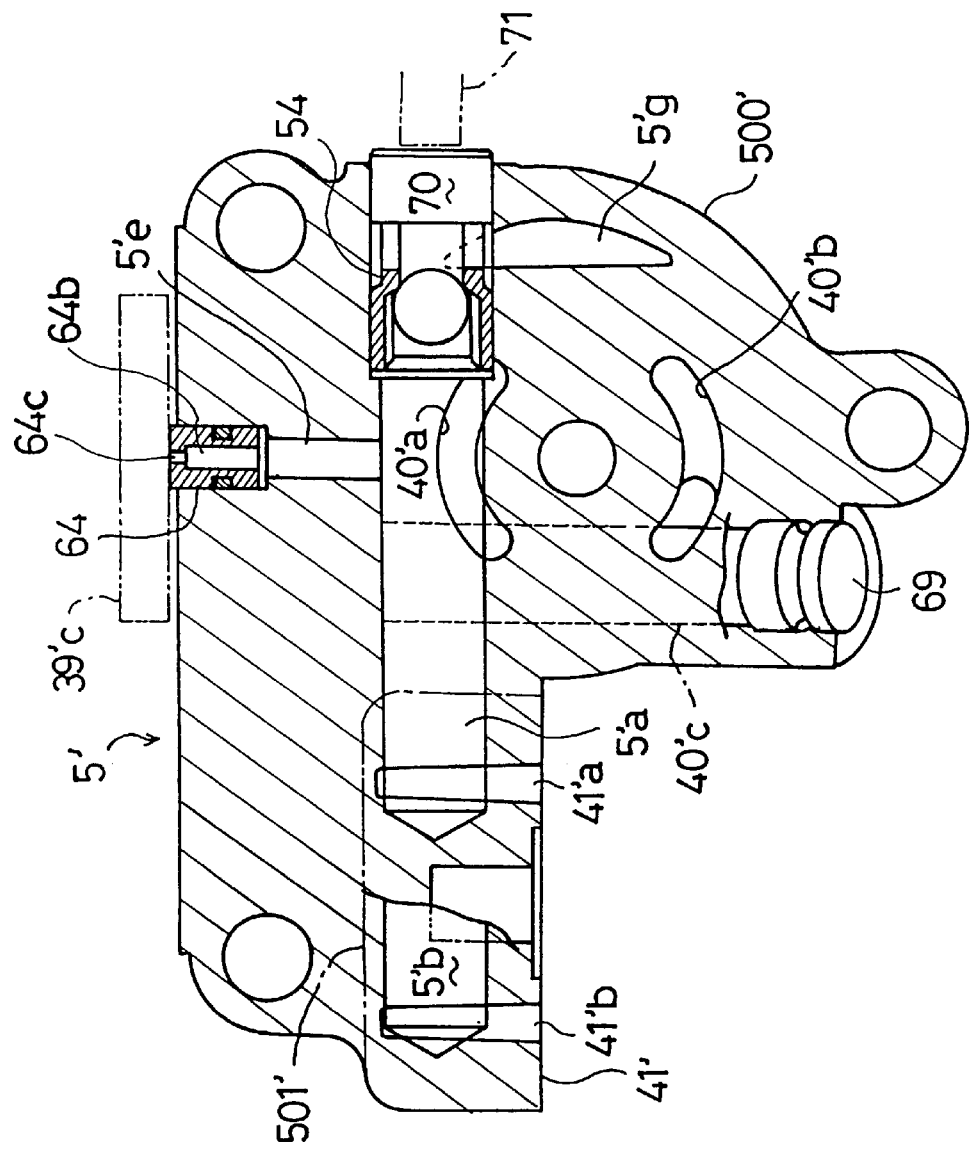
FIG. 16 is a cross-sectional plan view of center section 5'.
Figure 17:
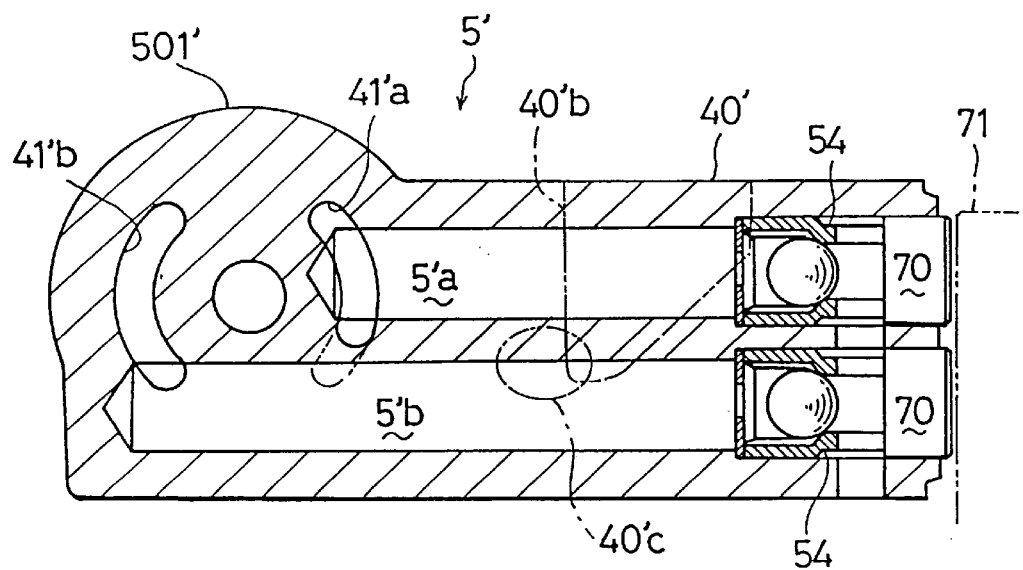
FIG. 17 is a cross-sectional view looking in the direction of arrows 17—17 in FIG. 15.

As shown in FIGS. 8 and 9, the above mentioned center section 5 includes first oil passage 5a and second oil passage 5b in parallel to each other on a common horizontal plane. In FIGS. from 15–20, an alternative embodiment of the present invention will be described which comprises a center section 5' instead of center section 5. In this embodiment, center section 5' includes a horizontal first oil passage 5'a and a horizontal second oil passage 5'b disposed in parallel to each other along a common vertical plane, so that first and second oil passages 5'a and 5'b overlap with each other as seen in the cross-sectional plan view of FIG. 16. As best seen in FIG. 17, each of kidney ports 41'a and 41'b which are open at a motor mounting surface 41' formed on the vertical portion 501' of center section 5', communicates with one end of each of first and second oil passages 5'a and 5'b, respectively.

Figure 18:
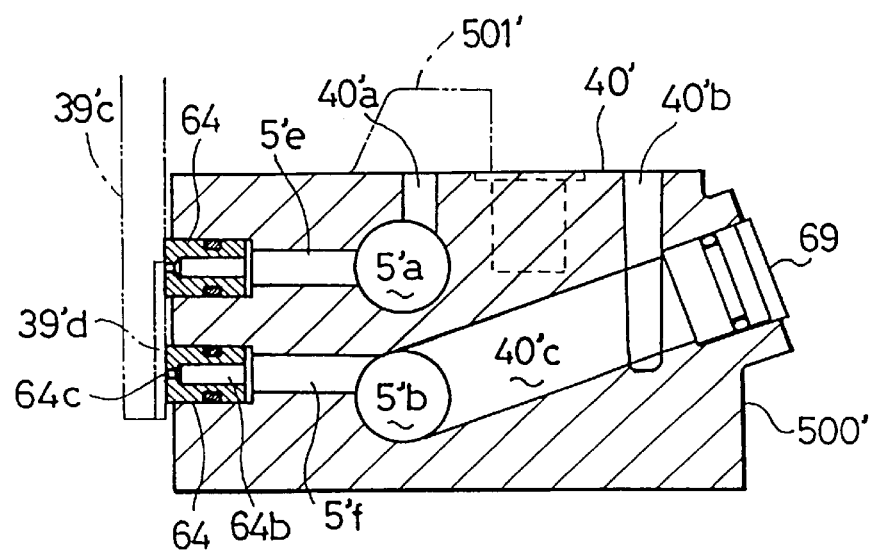
FIG. 18 is a cross-sectional view looking in the direction of arrows 18—18 in FIG. 15.
Figure 19:
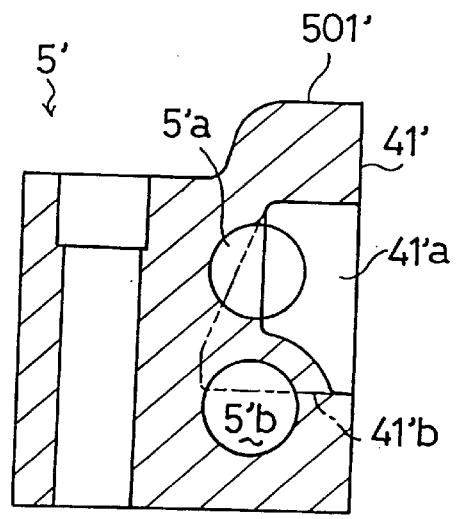
FIG. 19 is a cross-sectional view looking in the direction of arrows 19—19 in FIG. 15.

Kidney ports 40'a and 40'b are open at a pump mounting surface 40' formed on a horizontal portion 500' of center section 5'. Kidney port 40'a is open above first oil passage 5'a and extends downwardly to directly communicate with oil passage 5'a. As best seen in FIG. 18, kidney port 40'b is above, but to one side of second oil passage 5'b and communicates with second oil passage 5'b through a connecting oil passage 40'c which is slantingly and downwardly disposed from the outside of center section 5' to second oil passage 5'b. The outer open end of connecting oil passage 40'c is closed by a plug 69.

As seen in FIG. 17, the other ends of first and second oil passages 5'a and 5'b are open along an outside surface of horizontal portion 500'. A check valve 54 is disposed in each of the open ends of oil passages 5'a and 5'b for supplying oil to the closed fluid circuit. Each check valve 54 is closed by a plug 70. Each outer end of plug 70 abuts against a projection 71 formed along an inner surface of the housing to prevent the plugs 70 from slipping out.

A supply port 5'g is open at the lower surface of horizontal portion 500' and extends upwardly within center section 5' communicating with the entrance ports of check valves 54 in both first and second oil passages 5'a and 5'b. Supply port 5'g opens within an oil filter 56 disposed between the bottom of center section 5' and the bottom surface of lower half housing 2, as the previously described embodiments. Each of first and second oil passages 5'a and 5'b is supplied with oil from the housing which is filtered by oil filter 56 through supply port 5'g and check valves 54.

Oil holes 5'e and 5'f is horizontally branched from first and second oil passages 5a' and 5'b, respectively toward one side surface of center section 5'. The outer opening end of each of oil holes 5'e and 5'f is provided with a piston 64. In this embodiment, a flange and bush, as in the previous embodiments are not used.

Figure 20:
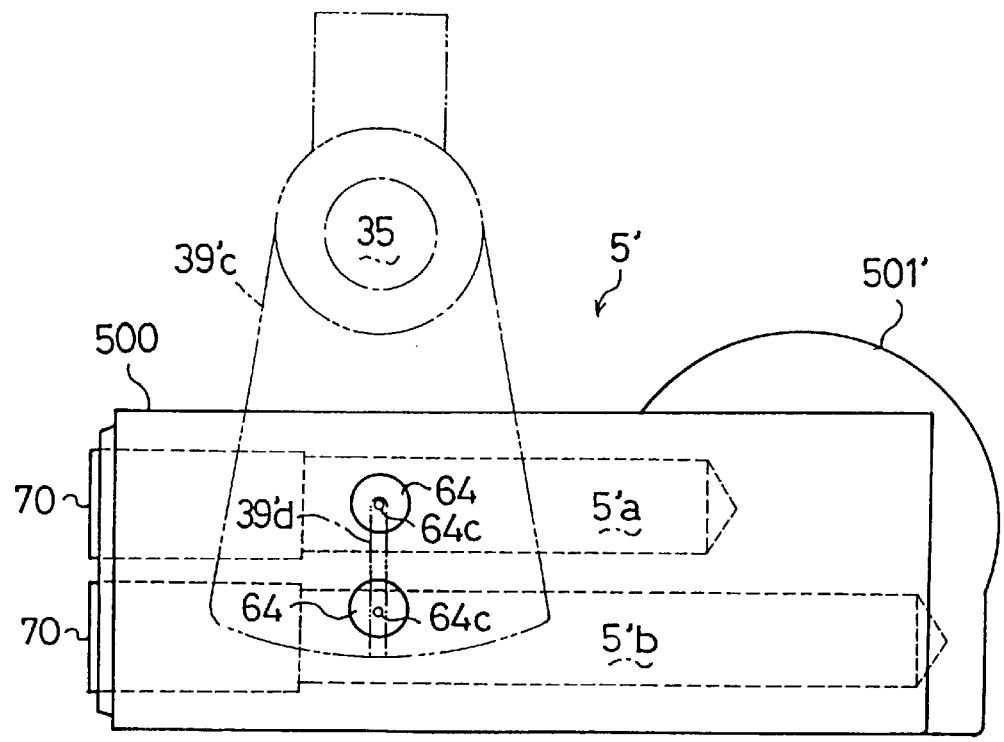
FIG. 20 is a side view looking in the direction of arrow 20 in FIG. 15.

Both oil holes 5'e and 5'f are disposed in parallel to each other with their axes along a common vertical plane so that pistons 64 are disposed in a vertical row, as shown in FIGS. 18 and 20. Accordingly, only one groove 39'd is formed on contact plate 39' along a surface which abuts against pistons 64 and communicates with both discharging oil holes 64c of pistons 64 simultaneously when contact plate 39'c is positioned in the neutral position. Because contact plate 39'c has only one groove 39'd, it can be more narrow as compared with contact plate 39c of the previous embodiments so as to make the space around it more compact.

When it is desired to moderate the difference in braking shock caused by advancing and backing of the vehicle, the braking shocks may be individually moderated by modifying the diameter of discharging oil holes 64c of pistons 64.

Figure 21:
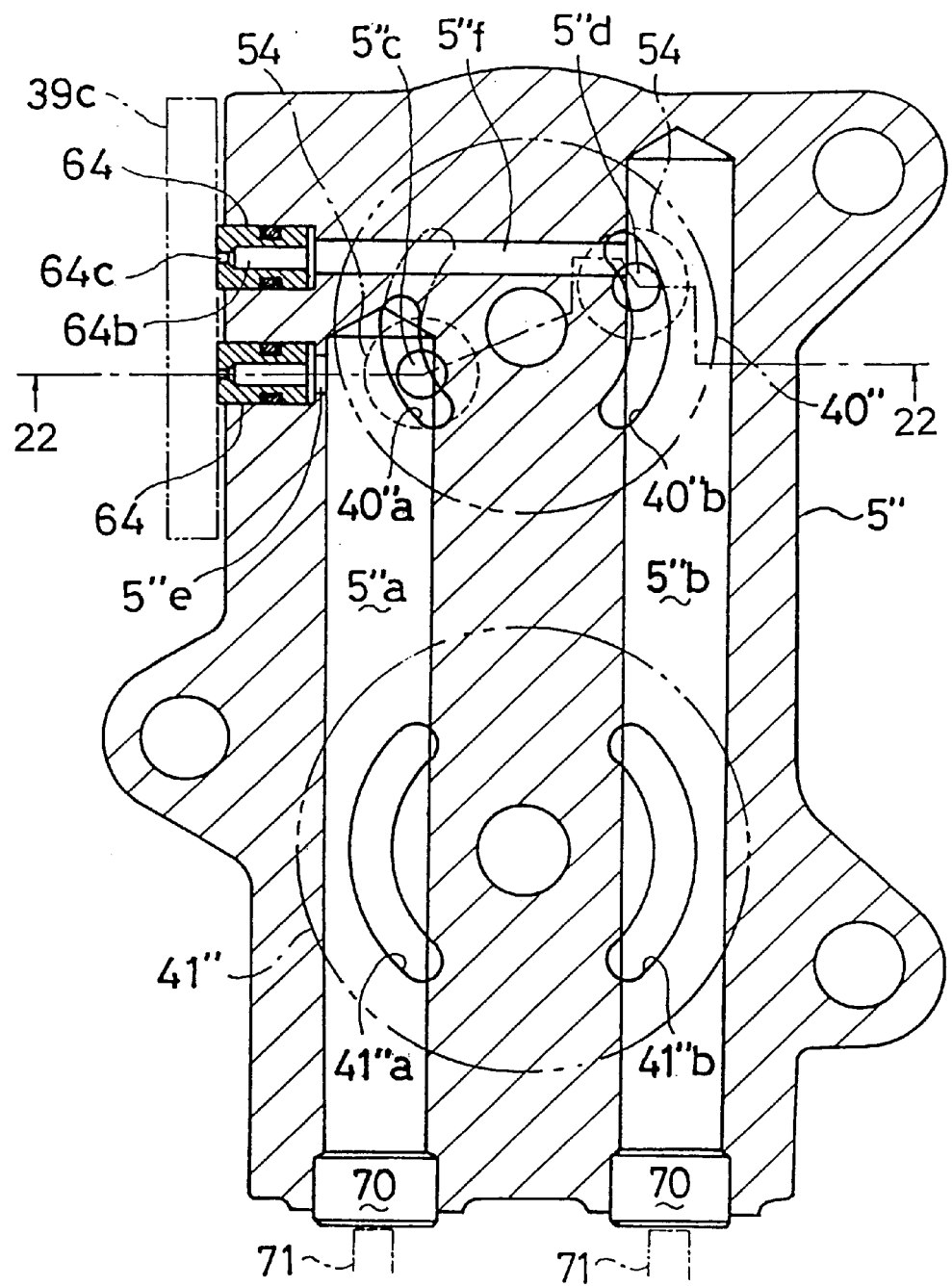
FIG. 21 is a cross-sectional plan view of center section 5"
Figure 22:
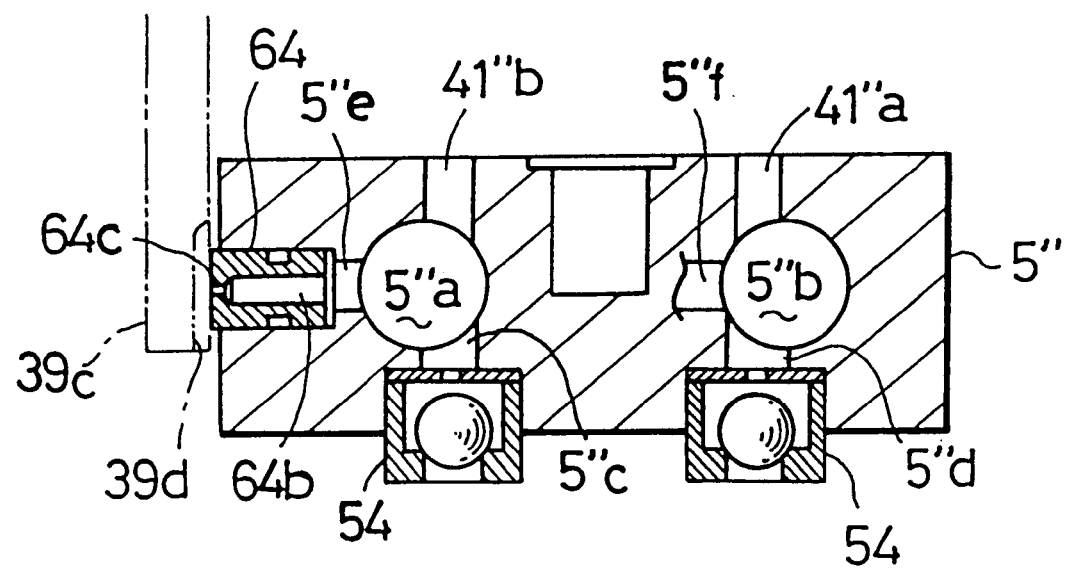
FIG. 22 is a cross-sectional view looking in the direction of arrows 22—22 in FIG. 21.

Center sections 5 and 5' mentioned above, which form pump mounting surfaces 40 and 40', respectively and motor mounting surfaces 41 and 41', respectively which are perpendicular to each other, may be adapted to an HST having a pump shaft and a motor shaft which are disposed in parallel to each other. Such a center section is shown in FIGS. 21 and 22 in which center section 5" forms a plate for an HST having a pump shaft 3 and a motor shaft 4 which are disposed in parallel to each other.

Center section 5" is formed as a thin plate. Both a pump mounting surface 40" and a motor mounting surface 41" are formed along a the top surface thereof. A first oil passage 5"a and a second oil passage 5"b are bored in center section 5" below pump mounting surface 40" and motor mounting surface 41". First and second oil passages 5"a and 5"b are disposed in parallel to each other on a common horizontal plane. Kidney ports 40"a and 40"b are open at pump mounting surface 40". Kidney ports 41"a and 41"b are open at motor mounting surface 41". Kidney ports 40"a and 41"a extend downwardly and communicate with first oil passage 5"a. Kidney ports 40"b and 41"b extend downwardly and communicate with second oil passage 5"b.

An oil hole 5"c and an oil hole 5"d extend downwardly from first and second oil passages 5"a and 5"b, respectively. In the opening of each of oil holes 5"c and 5"d which are open at the bottom surface of center section 5" is disposed a check valve 54 so as to enable operating oil to be supplied from the oil sump in the housing to each of first and second oil passages 5"a and 5"b.

One end of each of first and second oil passages 5"a and 5"b is open at one side surface of center section 5" and is closed by plug 70. Each plug 70 abuts against a projection 71 formed at the interior of the housing. First and second oil passages 5"a and 5"b differ in length so that the other end of first passage 5"a is offset from the other end of second oil passage 5"b. Horizontal oil holes 5"e and 5"f are branched perpendicularly from approximate the inner ends of first and second oil passages 5"a and 5"b, respectively. Both oil holes 5"e and 5"f are open at another side surface of center section 5". A piston 64, as discussed above, is disposed in each opening of oil holes 5"e and 5"f. At the exterior side of pistons 64 is disposed contact plate 39 having a pair of grooves 39d, as discussed above.

Another embodiment of an axle driving apparatus will be described with reference to FIGS. 23, 24 and 25. The HST of the axle driving apparatus of previously described embodiments includes a pump shaft 3 and motor shaft 4 which are disposed perpendicular to each other and have a movable swash plate 11 of a cradle-type which is separated from a control arm 39 or 39' for the hydraulic pump. The axle driving apparatus of this alternative embodiment has a center section 5", as shown in FIGS. 21 and 22 for supporting pump shaft 3 and motor shaft 4 in parallel to each other and has a trunnion-type movable swash plate 11' which forms a control shaft as single body. Center section 5" in FIGS. 21 and 22 differs from that in FIGS. 23 and 24 in, among other things, appearance and the shape of the oil holes, however, the technical idea of the latter center section 5" is the same as that of the former.

Figure 23:
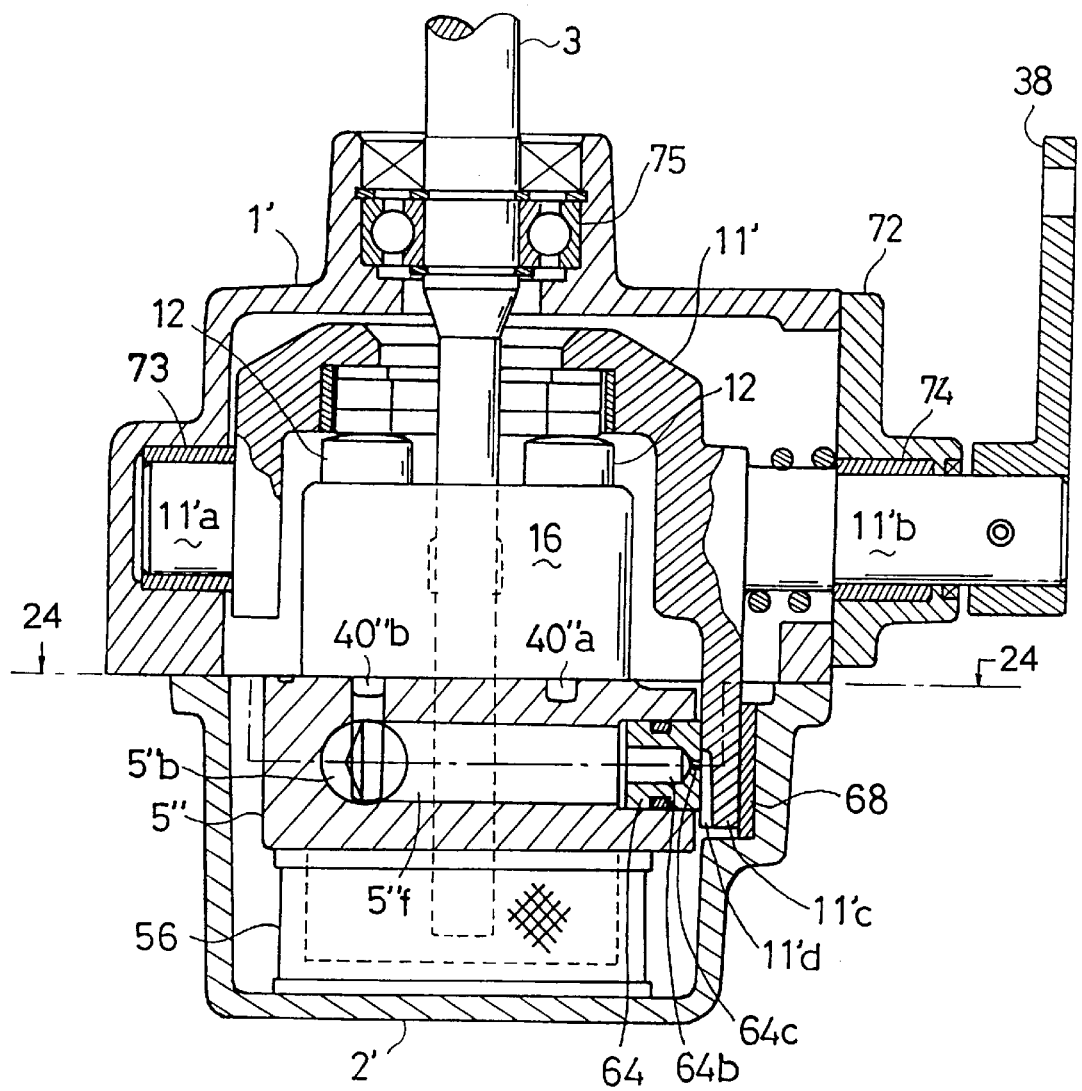
FIG. 23 is a vertical rear elevation view of another embodiment of an axle driving apparatus containing center section 5" of FIG. 21.
Figure 24:
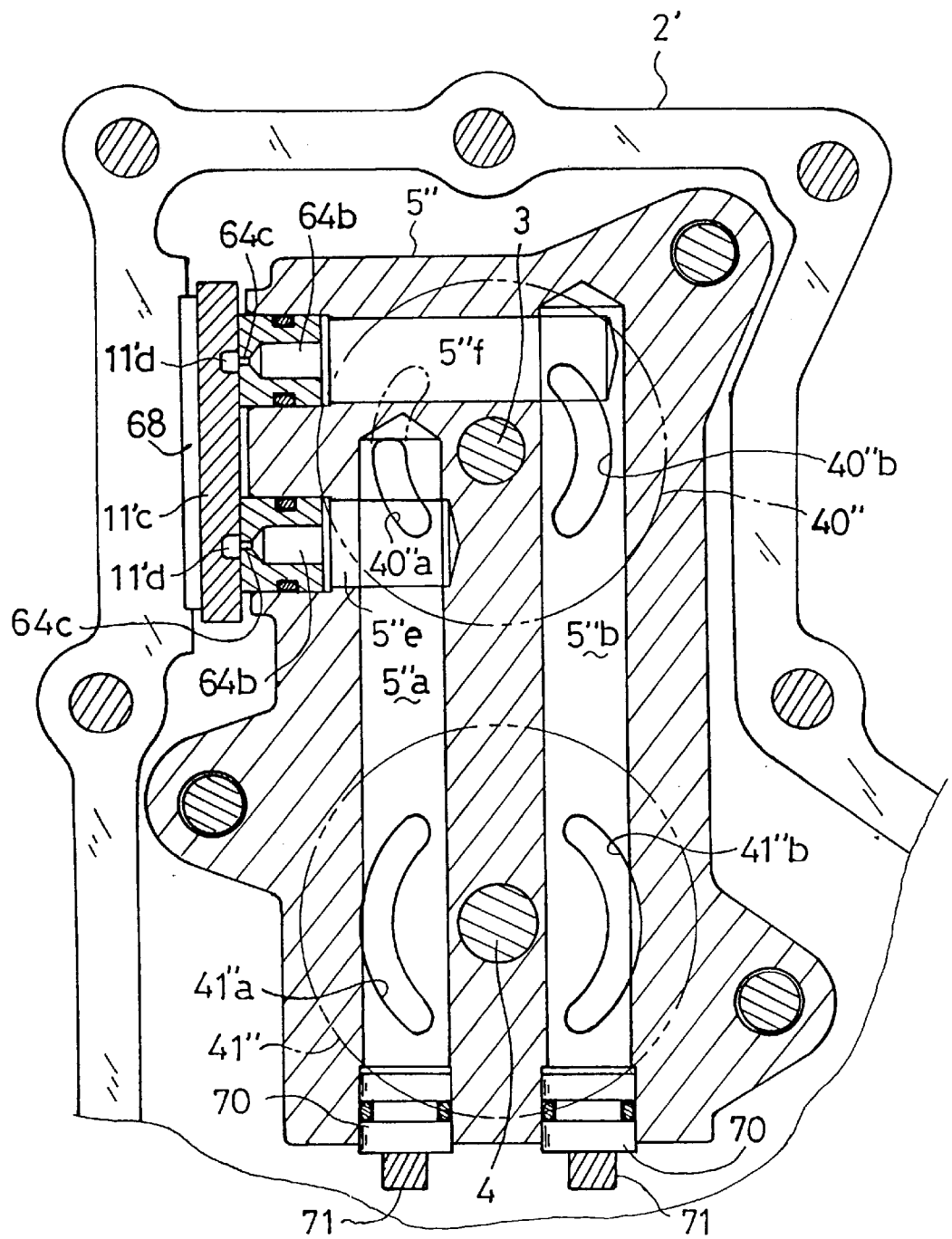
FIG. 24 is a cross-sectional view looking in the direction of the arrows 24—24 in FIG. 23.
Figure 25:
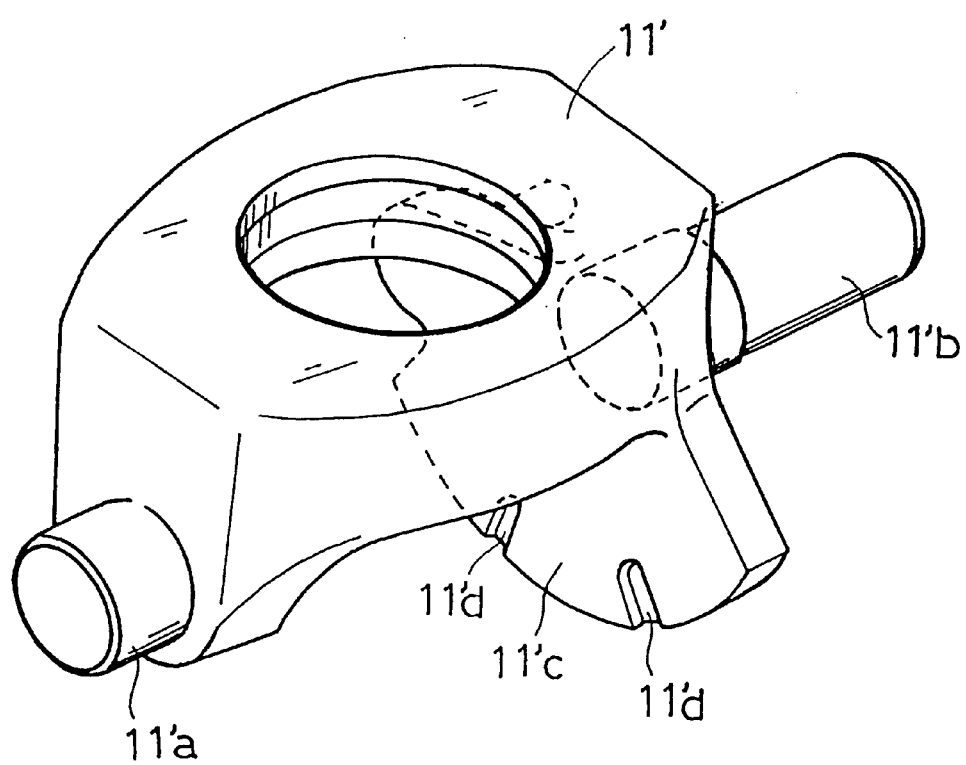
FIG. 25 is a perspective view of a movable swash plate 11' for the axle driving apparatus shown in FIG. 23.

With specific reference to FIGS. 23–25, center section 5" is disposed within a lower half housing 2'. On pump mounting surface 40" and motor mounting surface 41" formed on the upper surface thereof, is mounted a cylinder block for the hydraulic pump and a cylinder block for the hydraulic motor, respectively, thereby constituting an HST. Pump shaft 3 is connected with cylinder block 16 of the hydraulic pump and is vertically disposed and rotatably supported through bearings 75 at the upper portion of upper half housing 1'. The lower end thereof is rotatably inserted into center section 5". Movable swash plate 11', which is of a trunnion-type, is disposed above cylinder block 16 in upper half housing 1'.

The entire movable swash plate 11' is shown in FIG. 25. A pair of trunnion shafts 11'a and 11'b are formed on movable swash plate 11' and project in opposite directions from both sides thereof. A fan-shaped contact plate 11'c, equivalent to contact plate 39c, is formed below the base end of trunnion shaft 11'b, equivalent to control shaft 35. A pair of grooves 11'd, equivalent to grooves 39d, are formed at an inner surface of contact plate 11'c.

In upper half housing 1', trunnion shaft 11'a is supported by a side wall thereof through a bush 73. Trunnion shaft 11'b is supported by a lid 72 attached to upper half housing 1" through an other bush 74. Control lever 38 is fixed to the exterior portion of trunnion shaft 11'b projecting from lid 72. The surface of contact plate 11'c forming the pair of grooves 11'd abuts against the utmost ends of pistons 64 inserted into center section 5". Restraining plate 68 is interposed between the inner wall of lower half housing 2' and contact plate 11'c. Such a construction constitutes a neutral return position member for returning the movable swash plate 11' to the neutral position effecting the same as that comprising pistons 64 and contact plate 39c, described above.

Next, an axle driving apparatus having center section 5' as described in FIGS. 15 through 20 will be explained in accordance with FIGS. 26 through 58. The members whose construction and function are identical and similar with those shown in FIGS. 1 through 20 are marked with the same reference numerals and the detailed descriptions of them are hereinafter omitted.

Figure 26:
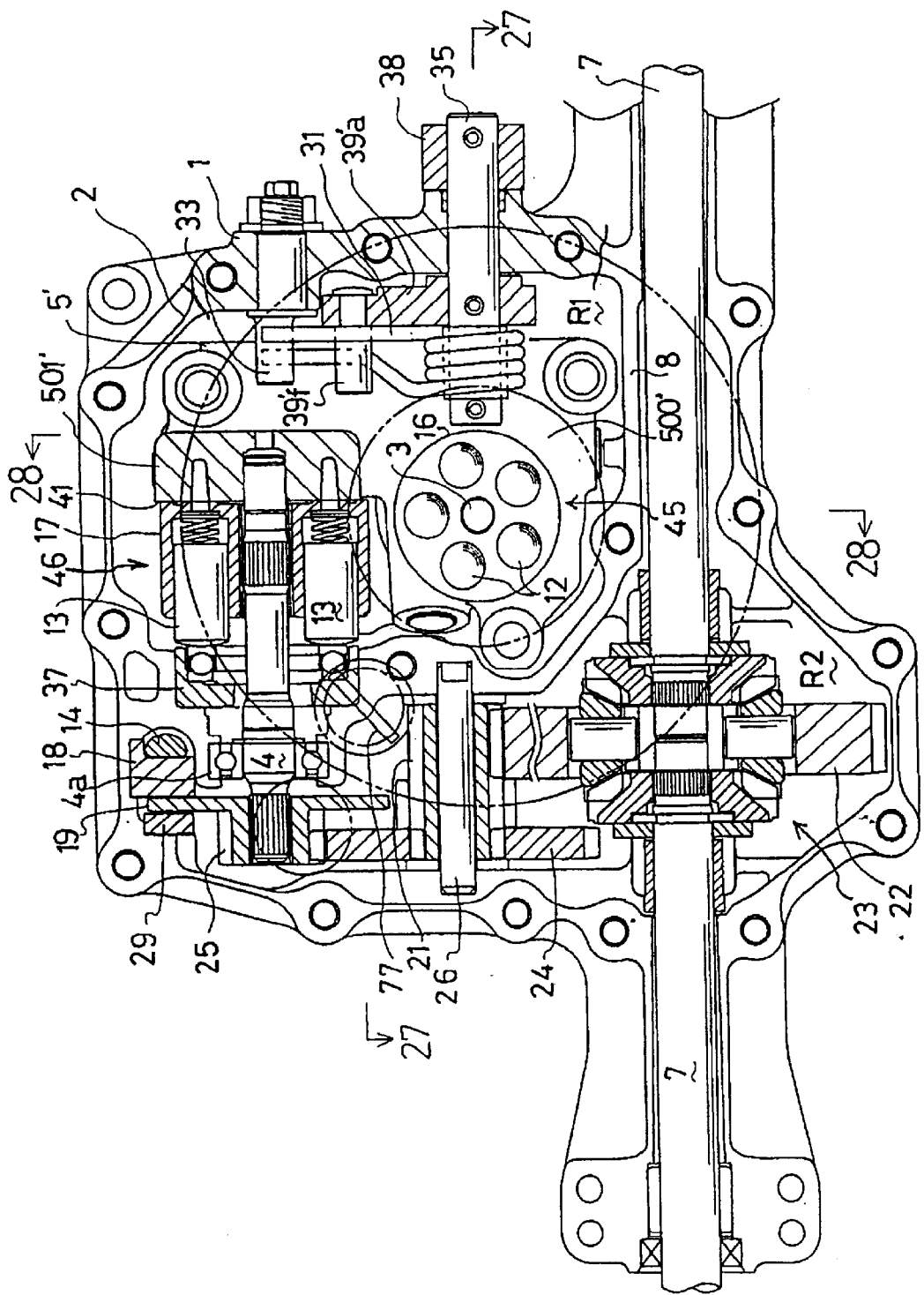
FIG. 26 is a plan view, partly in cross section, of another axle driving apparatus of the present invention suiting center section 5' shown in FIGS. 15 through 20 in condition that upper half housing 1 has been removed therefrom.
Figure 27:
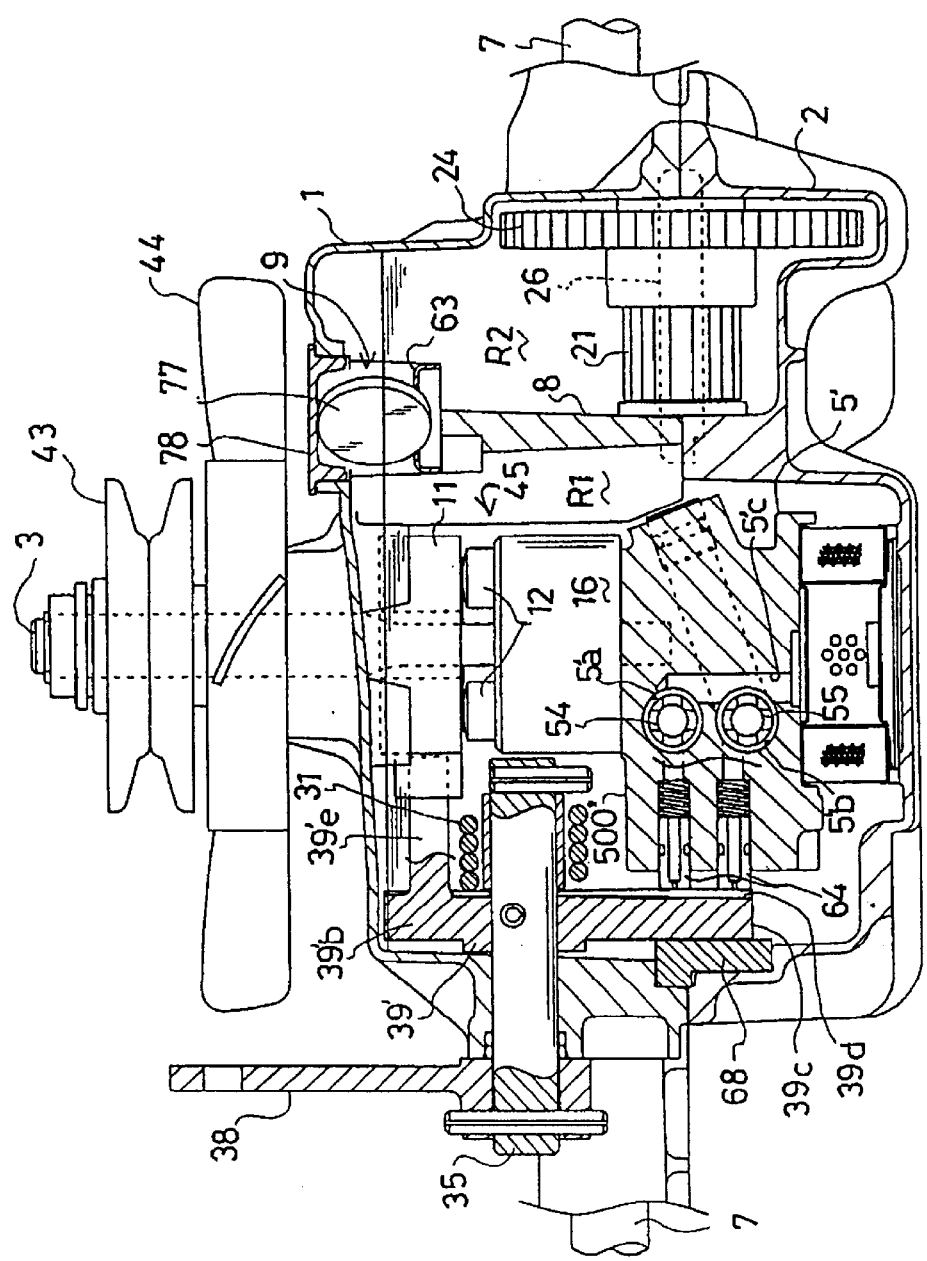
FIG. 27 is a cross-sectional view looking in the direction of arrows 27—27 in FIG. 26, being provided with upper half housing 1.
Figure 28:
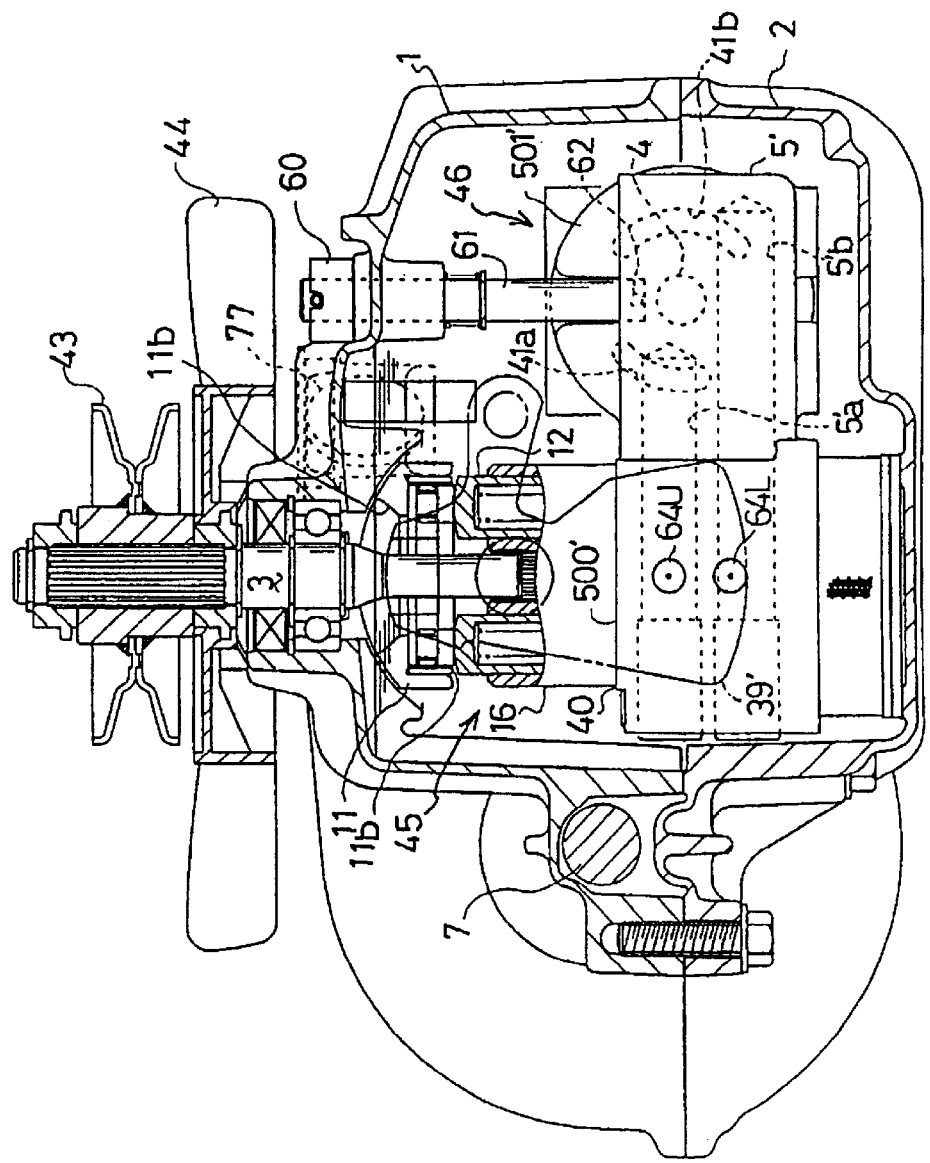
FIG. 28 is a cross-sectional view looking in the direction of arrows 28—28 in FIG. 26, being provided with upper half housing 1.

As shown in FIGS. 26 through 28, center section 5', which is substantially similar to that shown in FIGS. 15 through 20, is compactly disposed in first chamber R1 within the housing of the axle driving apparatus. Hydraulic pump 45 having vertical pump shaft 3 is disposed between axles 7 and hydraulic motor 46 having horizontal motor shaft 4 is disposed parallel to axles 7.

As shown in FIGS. 27 and 28 according to this embodiment, first chamber R1 and second chamber R2 are filled with oil so as to constitute an oil sump. Chambers R1 and R2 are connected with each other through a passage 9 so as to allow the inner oil of housing to interflow between chambers R1 and R2. Passage 9 is covered at the open top thereof with a lid 78 and provided on the bottom thereof with a seat 63. A discoid oil filter 77 is vertically disposed between lid 78 and seat 63 for removal of such impurities as metal fragments, which are generated by the rubbing of gears against each other, from oil in chambers R1 and R2.

Figure 29:
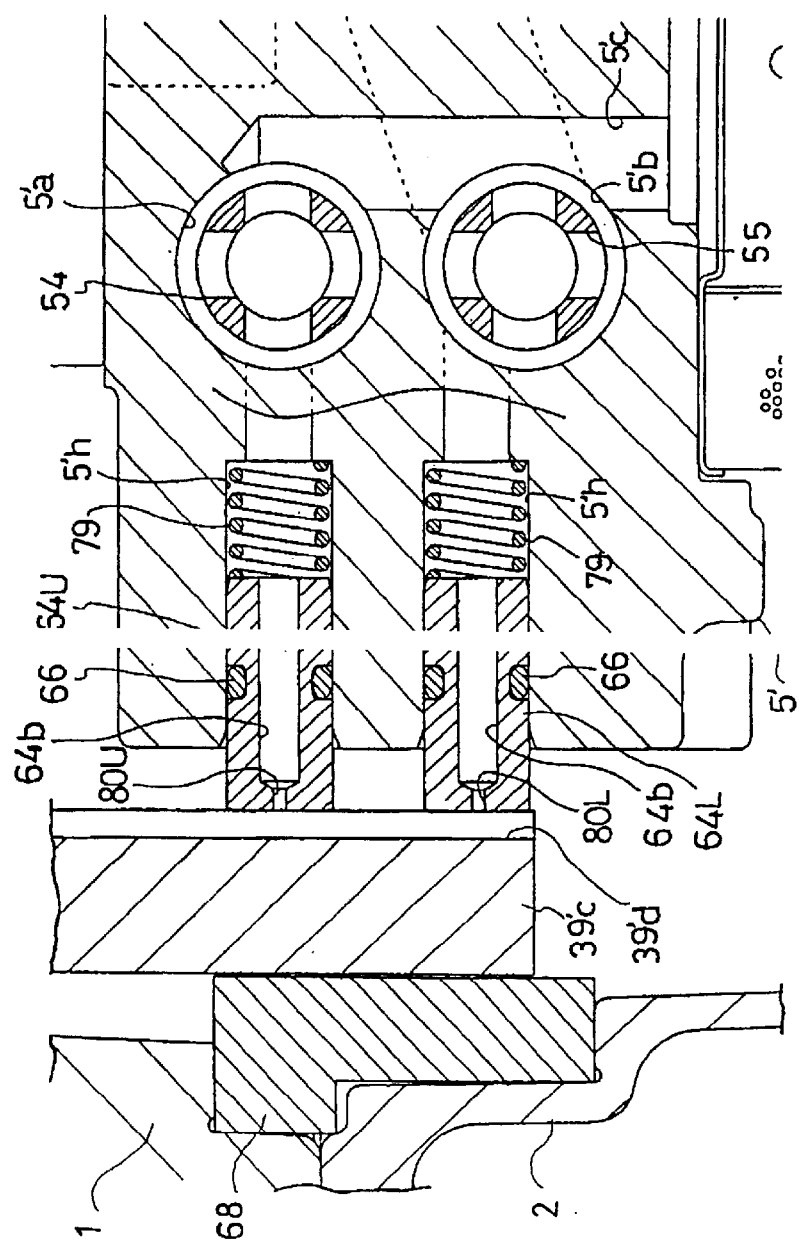
FIG. 29 is a cross-sectional view of a principal part of the axle driving apparatus shown in FIGS. 26 through 28 showing the disposition of upper and lower pistons 64U and 64L in center section 5'.

Center section 5' is provided therein with first and second oil passages 5'a and 5'b horizontally disposed in a vertical row as the above. Oil holes 5'e and 5'f horizontally branch in a vertical row from oil passages 5'a and 5'b, respectively, and are plugged at the outward open ends thereof with an upper piston 64U and a lower piston 64L, respectively. Pistons 64U and 64L constitute an internal damping system (IDS) which is provided mainly for moderating the dynamic braking shock during returning of the speed changing member to neutral and secondly for moderating the shock on starting of advancing and reversing. For this embodiment, as shown in FIG. 29, pistons 64U and 64L, which are bored therein by respective outward open upper and lower orifices 80U and 80L serving as the above-mentioned discharging oil holes 64c, are slidably fitted in outward open cylindrical portions 5'h formed at the ends of oil holes 5'e and 5'f, respectively. Seal 66 is interposed between the wall of cylindrical portion 5'h and the periphery of each of pistons 64U and 64L for avoiding an oil leak. Coiled springs 79 are interposed between the inner ends of pistons 64U and 64L and the inner ends of cylindrical portions 5'h so as to bias pistons 64U and 64L outwardly. The biasing force of coiled spring 79 is set to be smaller than that of coiled and twisted neutral return spring 31 winding around control shaft 35.

Next, referring to FIGS. 30 through 58, explanation will be given on various embodiments and modifications regarding control arm 39' with contact plate 39'c suiting pistons 64U and 64L fitted in center section 5' applied in the embodiment shown in FIGS. 26 through 29.

Figure 30:
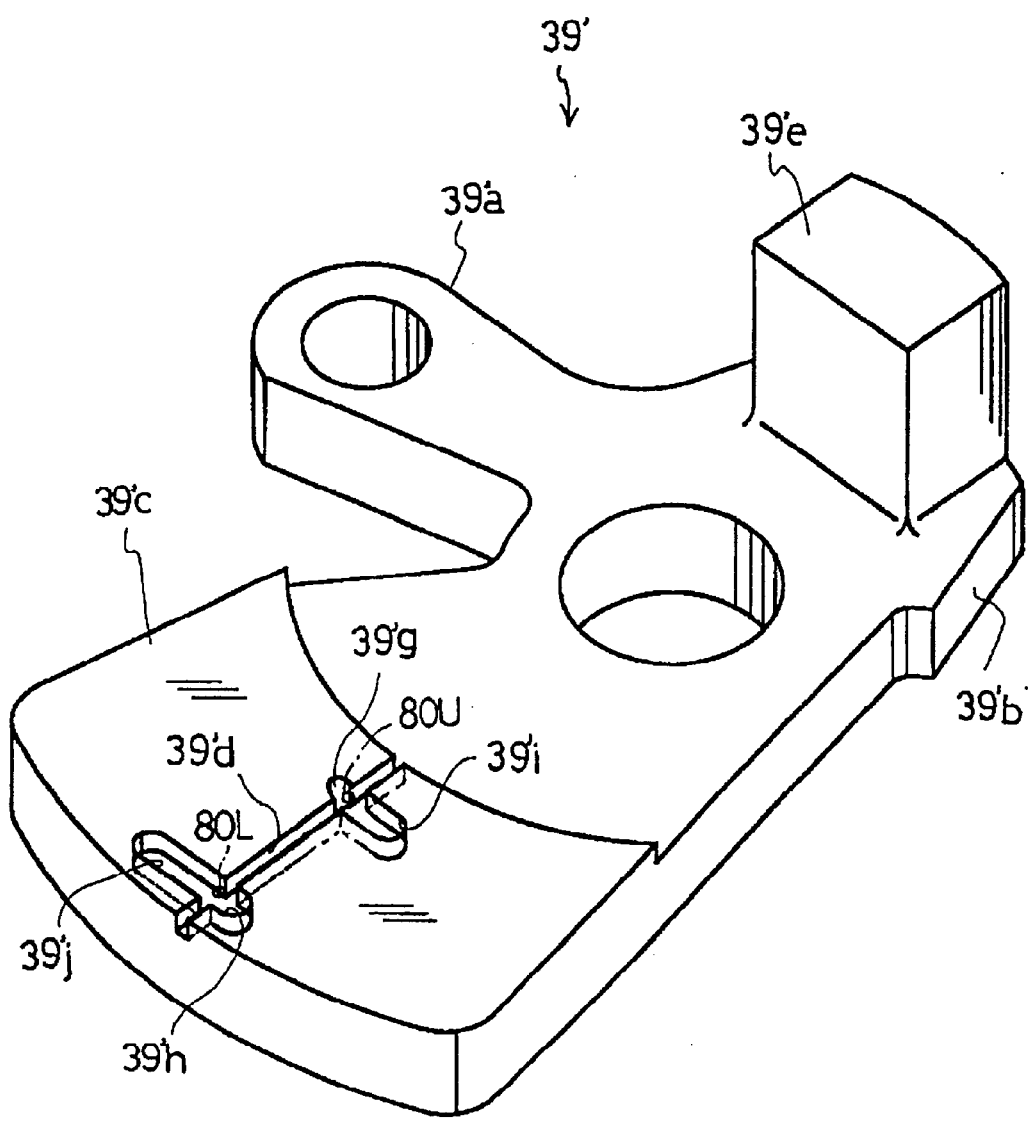
FIG. 30 is a perspective view of a preferred first embodiment of a control arm 39' which is suitable to center section 5' with pistons 64U and 64L.
Figure 31:
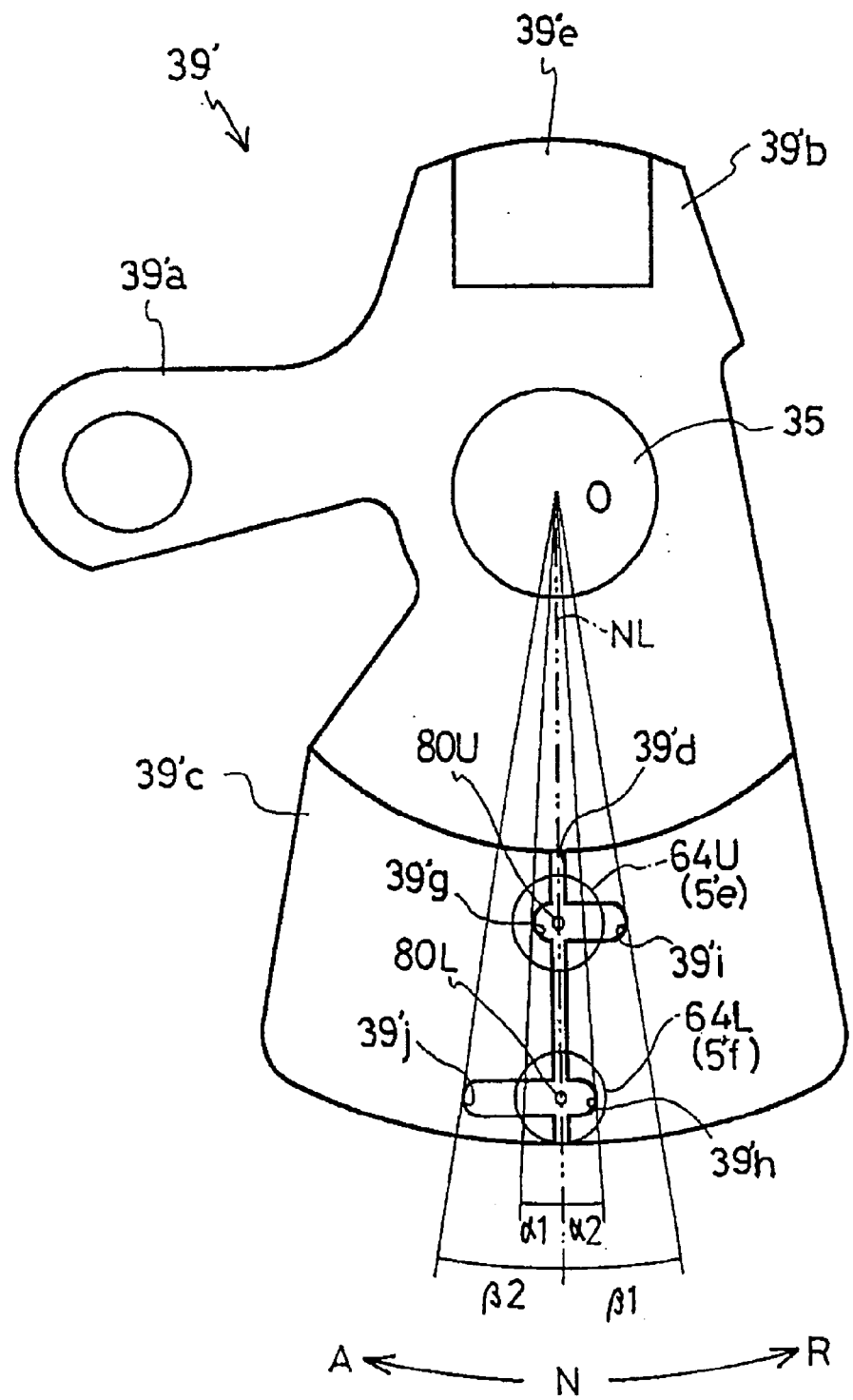
FIG. 31 is a side view of the same in a neutral position N.

A preferred first embodiment of control arm 39', shown in FIGS. 30 and 31, has contact plate 39'c, which is provided on the surface thereof facing pistons 64U and 64L with vertical groove 39'd similar to that shown in FIG. 20. Vertical groove 39'd has a width which is larger than the diameters of orifices 80U and 80L. When control arm 39' is positioned in neutral, orifices 80U and 80L are in communication with vertical groove 39'd, so that oil within the closed fluid circuit is released from orifices 80U and 80L through vertical groove 39'd into the oil sump formed in the housing of the axle driving apparatus. Thus, even if an error with respect to the neutral positioning of movable swash plate 11 occurs so that the closed fluid circuit is wrongly supplied with oil by hydraulic pump 45, hydraulic motor 46 is prevented from wrong slight rotation.

When the vehicle is left on a slope or slanted ground when the HST is in neutral and axles 7 are not locked for parking, the weight of vehicle is applied on axles 7 so as to rotate them in the descending direction. Then, the load on axles 7 generates a back-pressure in the closed circuit through hydraulic motor 46. In this case, if the inner oil of the closed circuit is drained through wide-open orifices 80U and 80L and vertical groove 39'd into the oil sump, such reduced hydraulic pressure cannot hold hydraulic motor 46, whereby hydraulic motor 46 freely follows the rotation of axles 7 and the vehicle descends the slope. However, each of orifices 80U and 80L of this embodiment is made smaller with its diameter than conventional one, whereby the oil cannot be drained therefrom perfectly. Hence, hydraulic motor 46 is held by the increased hydraulic pressure against the rotational force of axles 7 generated by the weight of vehicle, thereby enabling the vehicle to stay.

As shown in FIGS. 30 and 31, contact plate 39'c is provided with upper and lower first transverse grooves 39'g and 39'h and upper and lower second transverse grooves 39'i and 39'j branching transversely from vertical groove 39'd.

The relation of arrangement between first and second oil passages 5'a and 5'b may be reversed. However, this embodiment and others hereinafter will be described on the premise that first oil passage 5'a is disposed above second oil passage 5'b. It will be understood that in the rotational range of control arm 39' for advancing, first oil passage 5'a is lower-pressured and second oil passage 5'b is higher-pressured during acceleration, however, first oil passage 5'a becomes pressured higher than second oil passage 5'b because of back-pressure occurred by the rotation of hydraulic motor 46 following the rotation of axles 7 during deceleration by the returning of control arm 39' to neutral. Similarly, in the rotational range of control arm 39' for reversing, second oil passage 5'b, which is lower-pressured during acceleration, becomes pressured higher than first oil passage 5'a during the returning of control arm 39' to neutral.

For this embodiment, upper first transverse groove 39'g having a slight range is disposed so as to communicate with upper orifice 80U of upper piston 64U connected to first oil passage 5'a when control arm 39' is positioned in its rotational range for reversing (hereinafter, reversing range R). Lower first transverse groove 39'h having a slight range is disposed so as to communicate with lower orifice 80L of lower piston 64L connected to second oil passage 5'b when control arm 39' is positioned in its rotational range for advancing (hereinafter, advancing range A). An angle $\alpha 1$ which the center line of the width of vertical groove 39'd passing center 0 of control shaft 35 (when control arm 39' is in neutral position N, the center line is common with a neutral line NL passing center 0 and centers of orifices 80U and 80L) forms with the line passing the utmost end of upper first transverse groove 39'g and center 0 is as large as an angle $\alpha 2$ which the same center line forms with the line passing the utmost end of lower first transverse groove 39'h and center 0.

Angles $\alpha 1$ and $\alpha 2$ may be different. They can be optionally determined so as to enable the advancing and reversing vehicle to start without a shock.

On the start of advancing, the increase of hydraulic pressure closed fluid circuit within center section 5' is slightly delayed because higher-pressured second oil passage 5'b is in communication with lower first transverse groove 39'h through lower orifice 80L, and after control arm 39' is rotated so that lower orifice 80L passes the end of lower first transverse groove 39'h, the amount of oil supplied to hydraulic motor 46 by hydraulic pump 45 is increased so much as to enable the vehicle to start. On the start of reversing, similarly, the hydraulic pressure within the closed fluid circuit reaches the degree capable of driving hydraulic motor 46 after control arm 39' is rotated so as to let upper orifice 80U pass the end of upper first transverse groove 39'g. Thus, the starts of advancing and reversing are comfortably moderated.

Upper second transverse groove 39'i having the predetermined range is disposed so as to communicate with upper orifice 80U of upper piston 64U connected to first oil passage 5'a when control arm 39' is positioned in its advancing range A. Lower second transverse groove 39'j having the predetermined range is disposed so as to communicate with lower orifice 80L of lower piston 64L connected to second oil passage 5'b when control arm 39' is positioned in its reversing range R. An angle of $\beta 1$ which the center line of vertical groove 39'd passing center 0 of control shaft 35 forms with the line passing the utmost end of upper second transverse groove 39'i and center 0 is as large as an angle β2 which the same center line forms with the line passing the utmost end of lower second transverse groove 39'j and center 0.

Angles β1 and β2 may be different. They can be optionally determined so as to enable the advancing and reversing vehicle to stop without a braking shock.

When a speed changing member on the vehicle is released by an operator during advancing or reversing of the vehicle, control arm 39' returns to neutral by biasing of neutral return spring 31. In case of the absence of second transverse grooves 39'i and 39'j so far, until control arm 39' reaches its neutral position, a dynamic brake regarded as an engine brake is applied so as to decelerate the vehicle rapidly. When reaching the neutral position, the pressure oil in the closed fluid circuit is drained from both of orifices 80U and 80L to the oil sump through vertical groove 39'd, whereby the hydraulic pressure is reduced suddenly so that hydraulic motor 46 is made freely rotatable and axles 7 run idle. Accordingly, in case of deceleration in advancing, an operator leans forward until reaching neutral, and when reaching neutral, the decelerating force is suddenly lost, thereby making the operator bend backward. Thus, the operator is forced to change his/her posture greatly, and it will make him/her very uncomfortable.

In case of employing the above constructed contact plate 39'c having second transverse grooves 39'i and 39'j, when the speed changing member is released during advancing (or reversing), the increased pressure oil in one of oil passages 5'a (5'b), which is pressured higher by back-pressure generated from self-rotating of hydraulic motor 46 while it is set to be lower-pressured by movable swash plate 11, is drained from corresponding orifice 80U (80L) to the oil sump through corresponding second transverse grooves 39'i (39'j) for a short time before returning control arm 39' reaches its neutral position N. Hence, the back pressure in the closed circuit is reduced until it reaches the peak thereof, thereby enabling the vehicle to stop smoothly.

The hydraulic action and its effect on the movement of vehicle in relation to the whole rotational positions of control arm 39' will be described according to FIGS. 32, 33 and 35.

Figure 35:
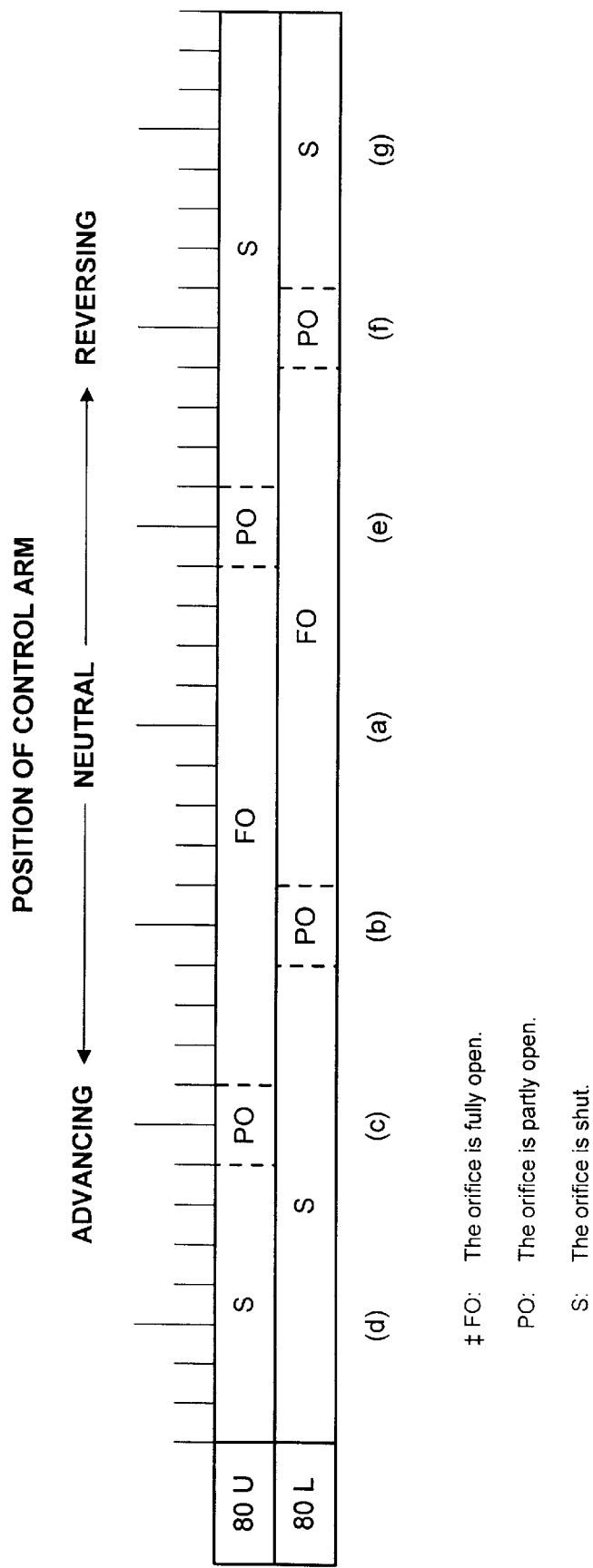
FIG. 35 is a schematic diagram showing opening conditions of orifices 80U and 80L in relation to the rotational positions of the preferred first embodiment of control arm 39' shown in FIGS. 31 and 32.

In FIG. 35, "FO" designates the condition that orifice 80U or 80L is fully open toward the oil sump when it is located in one of grooves 39'd, 39'g, 39'h, 39'i and 39'j. "PO" designates that orifice 80U or 80L is partly open toward the oil sump when it is put on the end of one of first and second transverse grooves 39'g, 39'h, 39'i and 39'j so as to be partly shut by contact plate 39'c. And "S" designates that orifice 80U or 80L is completely shut by contact plate 39'c. The same designations are used in FIGS. 38, 41, 44, 46, 48, 51, 53, 55 and 58.

The attitudes of control arm 39' in the rotational movement thereof marked as (a)–(g) shown in FIGS. 32, 33 and 35 will be employed in similarly in all embodiments of control arm 39' hereinafter.

Referring to FIGS. 32 and 35, the hydraulic action and its effect on the movement of vehicle in the advancing range A of control arm 39' will be described.

When an operator operates the speed changing member provided on the vehicle for acceleration in advancing so as to rotate control lever 38 of the axle driving apparatus from its neutral position into its advancing range, control arm 39' is rotated together with control lever 38 and control shaft 35 so as to change its position from (a) to (d) through (b) and (c) in FIG. 32.

During the rotation of control arm 39', movable swash plate 11 of hydraulic pump 45 is shifted so as to accelerate the advancing rotation of hydraulic motor 46 with motor shaft 4, thereby accelerating the advancing rotation of axles 7. Higher-pressured second oil passage 5'b is back-pressured further in proportion to the load applied on axles 7, thereby making lower piston 64L slide outwardly and press against contact plate 39'c. The friction force between friction plate 68 and contact plate 39'c pressed there against through lower piston 64L by the maximum hydraulic pressure and the biasing force of coiled spring 79 is set to be smaller than the biasing force of neutral return spring 31, so that control arm 39'c automatically returns to neutral when releasing the speed changing member For acceleration of the advancing speed, an operator must apply an operating force which exceeds the amount of such friction force and the biasing force of neutral return spring 31, onto the speed changing member.

At the position (a), both of orifices 80U and 80L are in communication with vertical groove 39'd, so that even if hydraulic pump 45 wrongly discharges oil into the closed circuit by an error of connecting means or linkage so as to apply hydraulic pressure to either oil passage 5'a or 5'b higher than the predetermined, the increased pressure oil therein is drained to the oil sump through either of orifices 80U and 80L. Also, when the vehicle is left in neutral on a slope so that hydraulic motor 46 is wrongly driven so as to apply back-pressure to either oil passage 5'a or 5'b, the increased pressure oil therein cannot be drained perfectly therefrom because orifices 80U and 80L have such small diameters as described above, thereby preventing the vehicle from suddenly descending the slope.

During the rotation of control arm 39' from the position (a) to the position (b), second oil passage 5'b is essentially higher pressured slightly by hydraulic pump 45, however, it is the fact that the hydraulic pressure therein tends to become higher than the predetermined base on the position of movable swash plate because of the load of staying axles 7 thereby causing the vehicle to start suddenly. According to this embodiment, lower orifice 80L enters lower first transverse groove 39'h, so that part of pressure oil in second oil passage 5'b by the back-pressure is drained, thereby moderating the starting shock. In addition, upper orifice 80U in communication with lower-pressured first oil passage 5'a enters upper second transverse groove 39'i.

When passing the position (c), lower orifice 80L passes the end of lower first transverse groove 39'h, so that lower piston 64L pushes contact plate 39'c to shut lower orifice 80L, whereby higher-pressured second oil passage 5'b is increased in its hydraulic pressure. However, upper orifice 80U is still open to second transverse groove 39'i.

When reaching the position (d), upper orifice 80U also passes the end of upper second transverse groove 39'i so as to be shut by contact plate 39'c, thereby enabling the entire capacity of the HST to perform advancing acceleration. In this state, contact plate 39'c is slidably rotated against friction plate 68, thereby preventing control arm 39' from rapid rotation. Hence, the vehicle is prevented from a rapid acceleration.

In case that an operator releases the operating force applied on the speed changing member during advancing so as to automatically rotate control arm 39' from the position (d) to the position (a) through the positions (c) and (b), in other words, in case of returning to neutral, the rotation of axles 7, whose force exceeds that of motor shaft 4, drives hydraulic motor 46 so as to function as a hydraulic pump, whereby lower-pressured first oil passage 5'a is changed to be pressured higher than second oil passage 5'b. In this condition, after control arm 39' passes the position (c), the excessive pressure oil in first oil passage 5'a is drained through upper orifice 80U and upper second transverse groove 39'i, thereby preventing the vehicle from sudden deceleration. Thus, the vehicle is moderated in its deceleration and stopping.

Referring to FIGS. 33 and 35, the hydraulic action and its effect on the movement of vehicle in the reversing range R of control arm 39' will be described. In case of reversing acceleration from neutral, an operator shifts the speed changing member so as to rotate control arm 39' from the position (a) to the position (g) through the positions (e) and (f). On starting, control arm 39' is positioned at the position (e), part of oil in higher pressured first oil passage 5'a, which is increased by hydraulic pump 45 and the load of axles 7, is drained through upper orifice 80U and first transverse groove 39'g, thereby preventing the vehicle from sudden start. In case of reversing deceleration by releasing the speed changing member so as to rotate control arm 39' by biasing of neutral return spring 31 from the position (g) to the position (a) through the positions (f) and (e), lower orifice 80L enters lower second transverse groove 39'j after control arm 39' passes the position (f), so that the excessive pressure oil in second oil passage 5'b, which is pressured higher by the rotational force of axles 7, is drained, thereby preventing the vehicle from sudden deceleration and rapid stopping.

Figure 34:
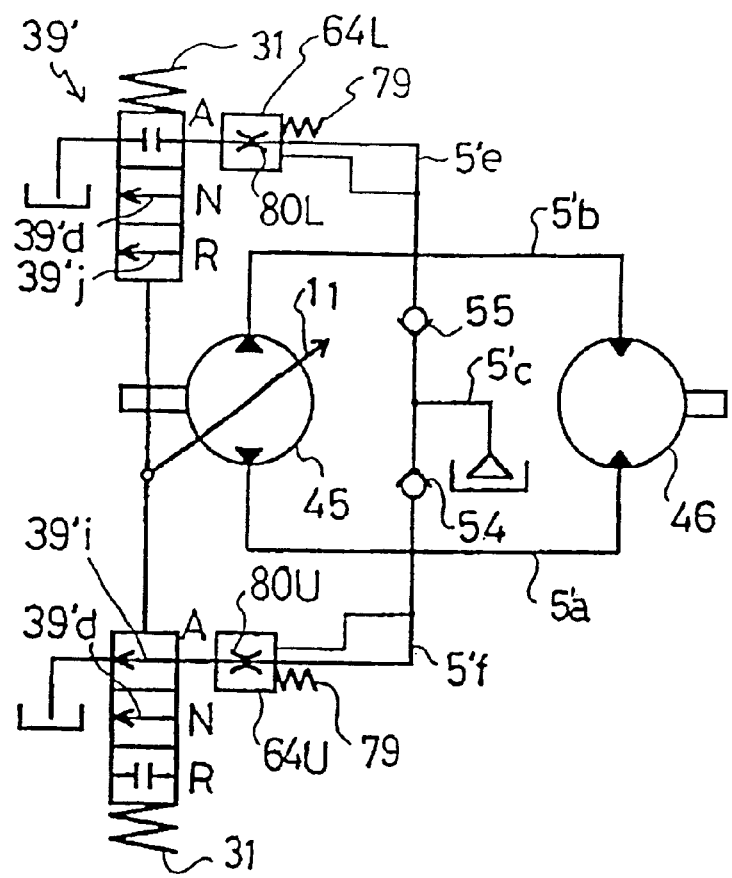
FIG. 34 is a hydraulic circuit diagram of an HST provided with center section 5' and control arm 39' according to the first embodiment shown in FIGS. 31, 32, 36, 37, 39 and 40.

The first embodiment of control arm 39' (including the following modifications thereof) comprising contact plate 39'c, vertical grooves 39'd and second transverse grooves 39'i and 39'j between the position (c) and the position (f) through the position (a) as neutral position N constitutes the valves shown in FIG. 34 which control the oil releasing of orifices 80U and 80L. In FIG. 34, first transverse grooves 39'g and 39'h are out of consideration. The orifice opening and closing action of control arm 39' is controlled together with movable swash plate 11 of hydraulic pump 45 by operation of speed changing member and biasing of neutral return spring 31. According to the opening and closing action, both upper and lower orifices 80U and 80L are fully open to the oil sump at neutral position N. In advancing range A, upper orifice 80U is opened to drain the pressure oil from first oil passage 5'a and lower orifice 80L is closed. In reversing range B, lower orifice 80L is opened to drain the pressure oil from second oil passage 5'b and upper orifice 80U is closed.

Next, various modifications of the first embodiment of control arm 39' as shown in FIGS. 30 and 31 will be described according to FIGS. 36 through 41.

Figure 36:
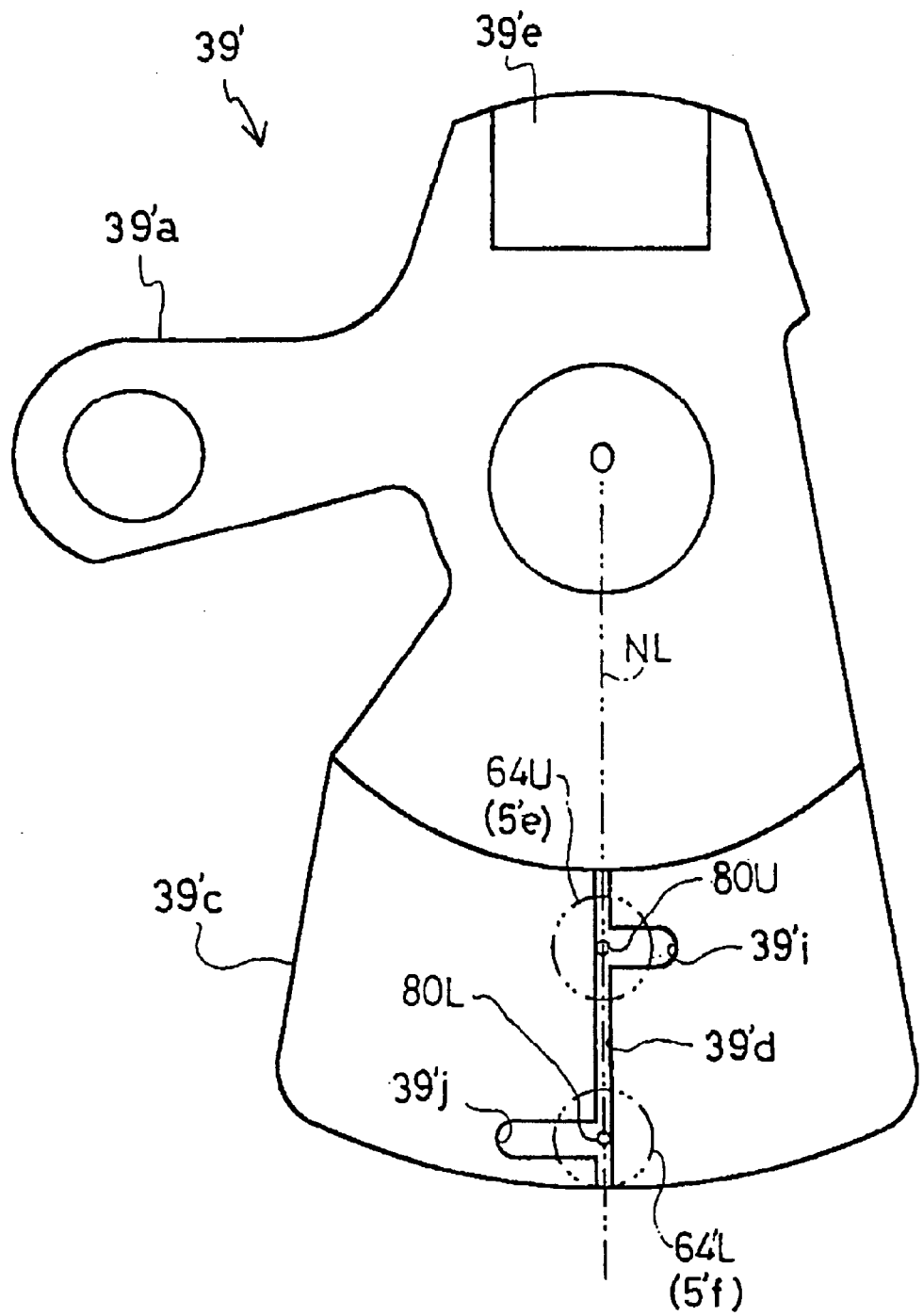
FIG. 36 is a side view of a first modification of the first embodiment of control arm 39' in neutral position N.

A first modification thereof shown in FIG. 36, in which first transverse grooves 39'g and 39'h are eliminated, is adapted to such case that the moderation of starting shock does not have to be considered. In FIG. 35, "PO" of upper orifice 80U in the position (e) and lower orifice 80L in the position (b) are changed into "S".

Figure 37:
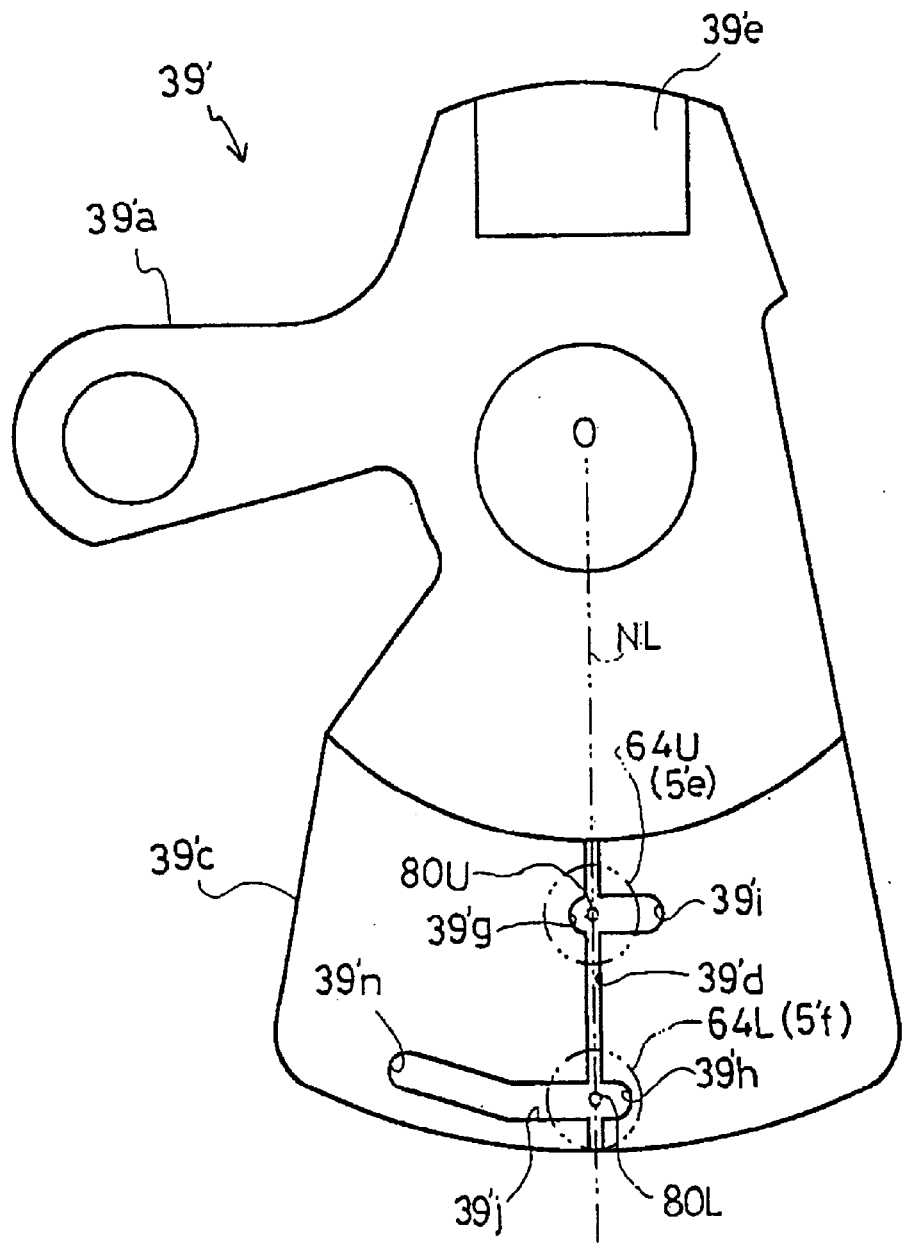
FIG. 37 is a side view of a second modification of the first embodiment of control arm 39' in neutral position N.
Figure 38:
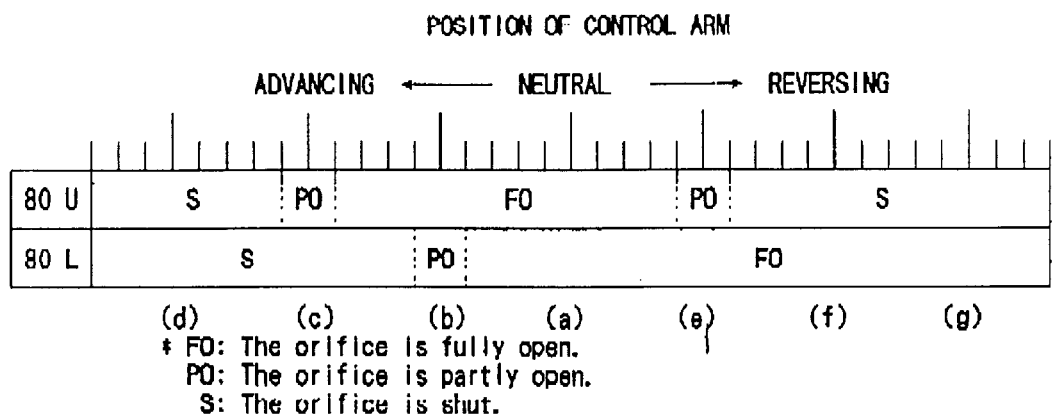
FIG. 38 is a schematic diagram showing opening conditions of orifices 80U and 80L in relation to the rotational positions of the second modification of the first embodiment control arm 39' shown in FIG. 37.

With regard to a second modification shown in FIG. 37, vertical groove 39'd and first transverse grooves 39'g and 39'h are similar to the preferred first embodiment shown in FIGS. 30 and 31. One of second transverse grooves 39'i and 39'j is extended so that either orifice 80U or 80L is in communication with the extended second transverse groove at any position of one of advancing and reversing ranges A and R of control arm 39'. In the case shown in FIG. 38, an extending groove 39'n is formed so as to extend from the end of lower second transverse groove 39'j, whereby lower orifice 80L is in communication with either 39'j or 39'n at all the positions between the neutral position N and the maximum position of reversing range R of control arm 39'. Lower second transverse groove 39'j and extending groove 39'n are formed in a bending shape corresponding to the locus of lower orifice 80L. They may be formed in an arcuate shape. Accordingly, when the speed changing member in the reversing range is released, the excessive pressure oil in second oil passage 5'b is drained through lower orifice 80L and the series of extending groove 39'n and lower second transverse groove 39'j in all the reversing range R of control arm 39', so that dynamic braking is rarely applied during deceleration of reversing between the maximum position and the neutral position. Such variation of opening condition of orifices 80U and 80L in relation to the whole rotational positions of control arm 39' according to the second modification of the first embodiment is shown in FIG. 38.

Figure 39:
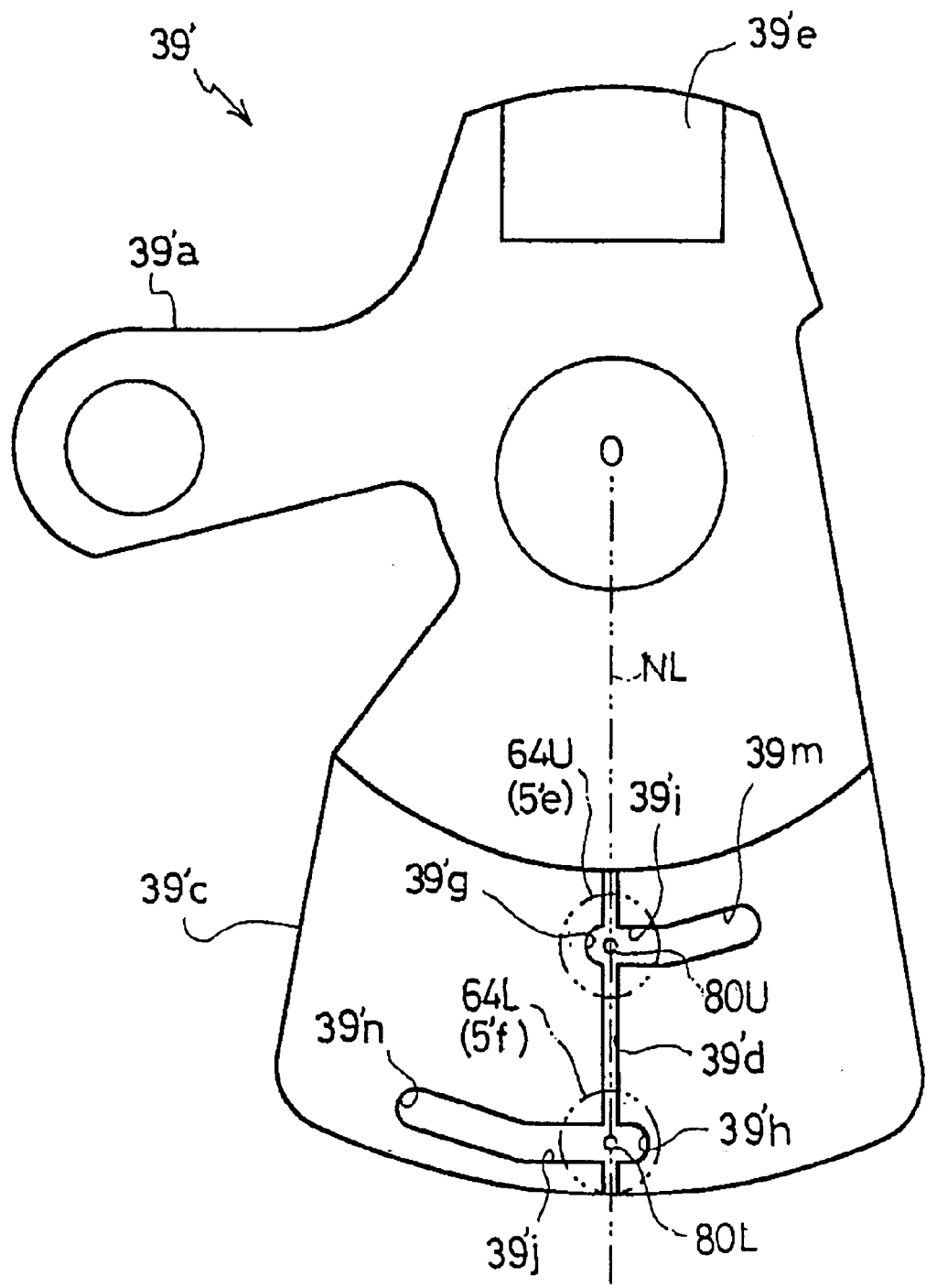
FIG. 39 is a side view of a third modification of the first embodiment of control arm 39' in neutral position N.

With regard to a third modification shown in FIG. 39 serving as a modification of the second modification shown in FIG. 37, extending grooves 39'm and 39'n are extended from the ends of both second transverse grooves 39'i and 39'i, respectively, so that the two series of grooves 39'i and 39'm, and 39'i and 39'n form a bending shape corresponding to the locus of orifices 80U and 80L in all of the advancing and reversing rotational ranges A and R of control arm 39'. Thus, even in the event of returning to neutral from the maximum position of advancing and reversing of the speed changing member, the excessive pressure oil in the higher-pressured one of oil passages 5a and 5'b is drained until the neutral position, thereby preventing the vehicle from dynamic braking during deceleration of advancing and reversing.

Figure 40:
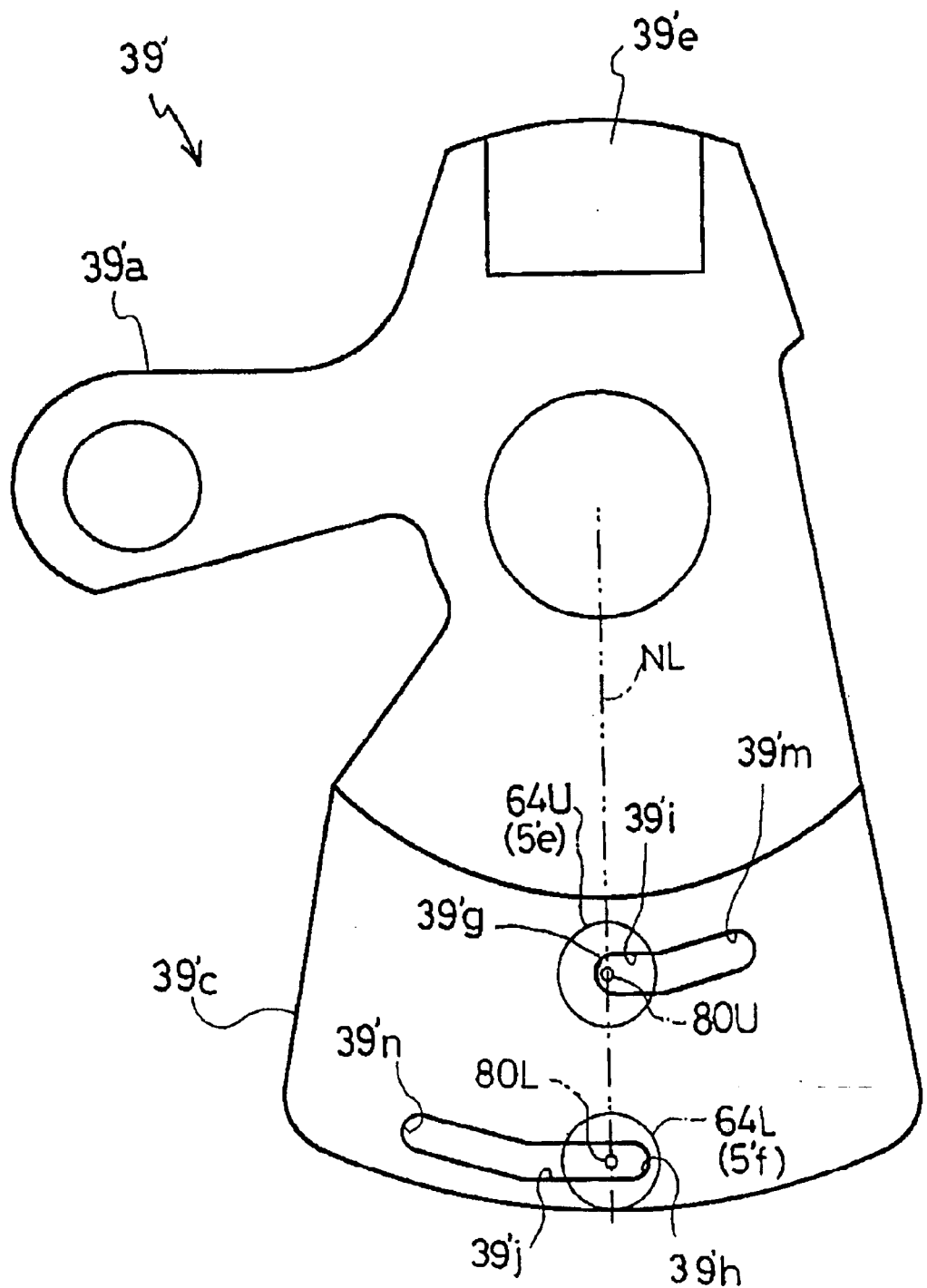
FIG. 40 is a side view of a fourth modification of the first embodiment of control arm 39' in neutral position N.

With regard to a fourth modification shown in FIG. 40, which is a modification of that shown in FIG. 39, the cross-sectional areas of second transverse grooves 39'i and 39'j and extending grooves 39'm and 39'n are large enough to drain the excessive pressure oil in the higher pressured one of oil passages 5'a and 5'b sufficiently, thereby allowing vertical groove 39'd to be removed. Hence, control arm 39' becomes so simple as to be produced at low cost.

Figure 41:
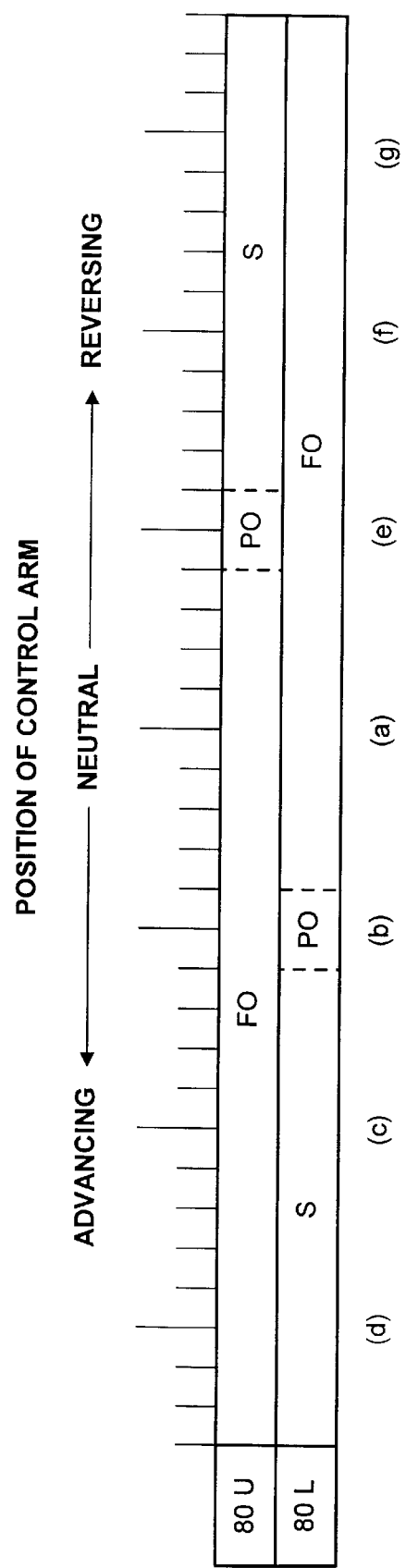
FIG. 41 is a schematic diagram showing opening conditions of orifices 80U and 80L in relation to the rotational positions of the third and fourth modifications of the first embodiment of control arm 39' shown in FIGS. 39 and 40.

Such variation of conditions of orifices 80U and 80L in relation to the whole rotational positions of control arm 39' according to the third and fourth modifications of the first embodiment is shown in FIG. 41.

Next, explanation will be given on a second embodiment of control arm 39' in accordance with FIGS. 42 through 48. As shown in FIGS. 43, 44, 46 and 48, the second embodiment of control arm 39' is characterized in that both orifices 80U and 80L are partly open toward the oil sump in neutral position N.

Figure 42:
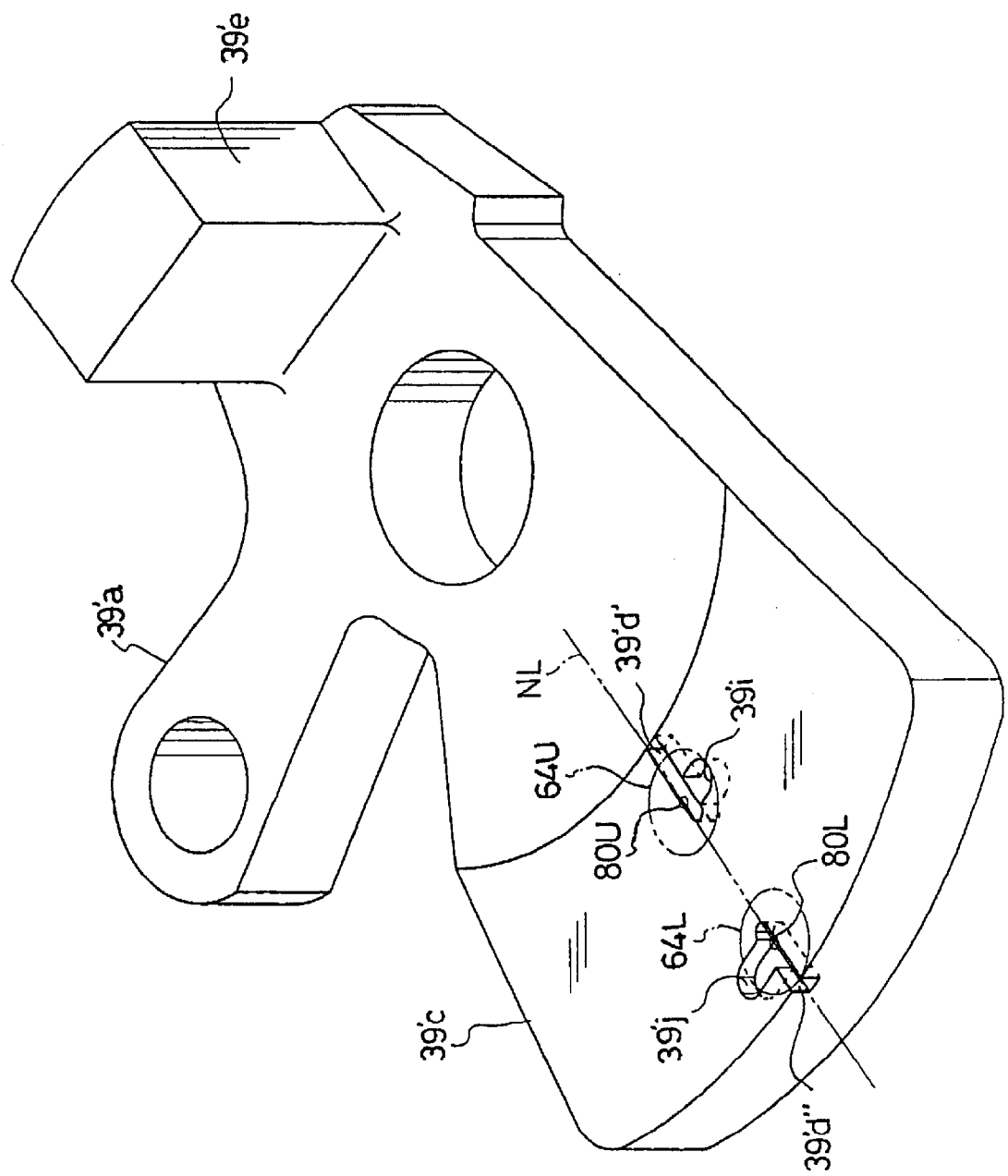
FIG. 42 is a perspective view of a preferred second embodiment of control arm 39' which is suitable to center section 5' with pistons 64U and 64L.
Figure 43:
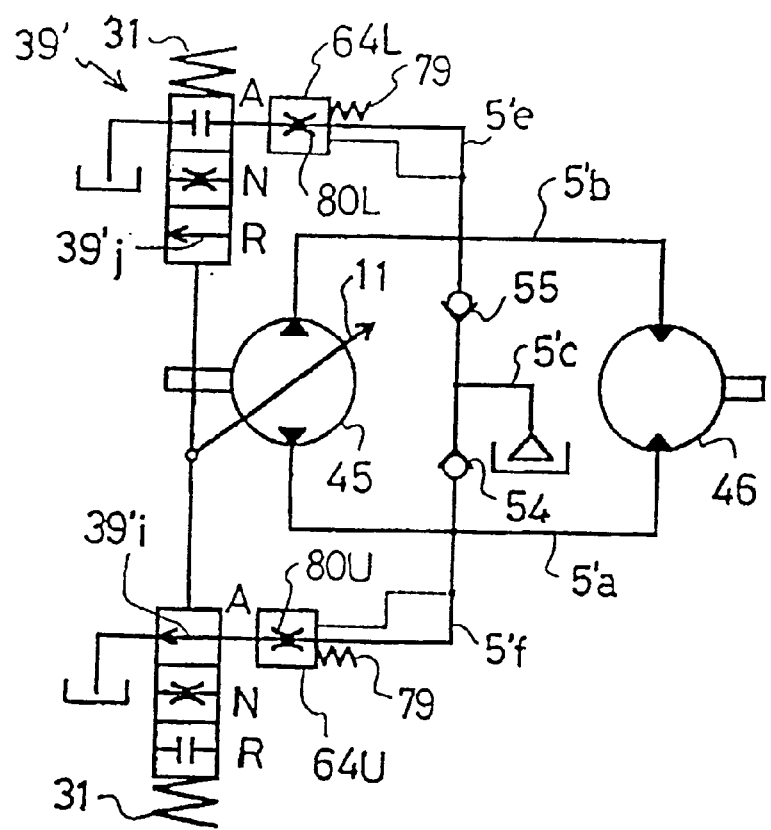
FIG. 43 is a hydraulic circuit diagram of an HST provided with center section 5' and control arm 39' according to the second embodiment shown in FIGS. 42, 45 and 47.

A preferred second embodiment of control arm 39' shown in FIG. 42 is provided on the surface of contact plate 39'c thereof with upper and lower second transverse grooves 39'i and 39'j which have the construction and function similar to the first embodiment. Vertical groove 39'd of the first embodiment is replaced with upper vertical groove 39'd' and lower vertical groove 39'd", which are connected with upper second transverse groove 39'i and lower second transverse groove 39'j, respectively, and are open at the upper and lower ends thereof toward the oil sump. Orifices 80U and 80L are diametrically larger than those of the first embodiment, so that when the vehicle in neutral is left on a slope, the increased pressure oil by back pressure is drained so much as to become impossible to hold hydraulic motor 46. It will be advantageous in manufacturing and will prevent orifices 80U and 80L, which are diametrically larger, from stop up.

Furthermore, the center line of the width of upper vertical groove 39'*d*' is offset from the vertical line serving as the horizontal center of contact plate 39'*e*, which is common with neutral line NL in neutral position N, toward upper second transverse groove 39'*i*, and that of lower vertical groove 39'*d*" is offset therefrom toward lower second transverse groove 39'*j*, so that when control arm 39' is at neutral position N, upper orifice 80U is put on a vertical edge of upper vertical groove 39'*d*' in opposite to upper second transverse groove 39'*i*, and lower orifice 80L is put on that of lower vertical groove 39'*d*" in opposite to lower second transverse groove 39'*j*. Thus, at the position (a) as neutral position N shown in FIGS. 43 and 44, the openings of orifices 80U and 80L are partly shut by contact plate 39'*c*, so as to be tightened. According to such construction, when the vehicle in neutral is left on a slope, the increased pressure oil by back pressure in the closed fluid circuit is hard to be drained, thereby preventing the vehicle from easily descending the slope.

Figure 44:
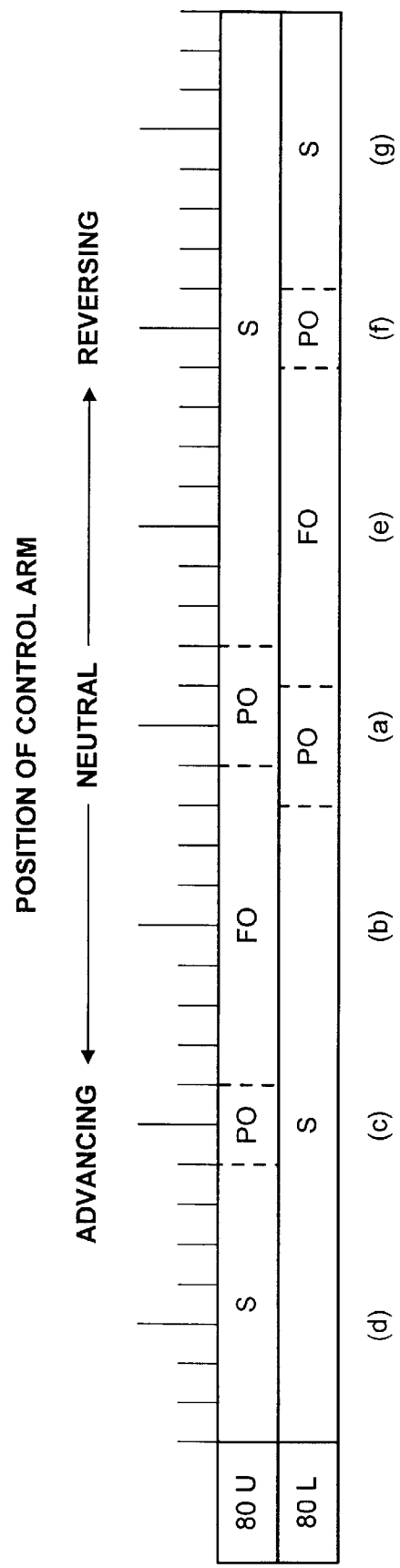
FIG. 44 is a schematic diagram showing opening conditions of orifices 80U and 80L in relation to the rotational positions of the preferred second embodiment of control arm 39' shown in FIG. 42.

At the positions (b) and (e) of control arm 39' shown in FIG. 44 as the starting of advancing and reversing, one of orifices 80U and 80L is fully open to corresponding one of grooves 39'*d*', 39'*d*", 39'*i* and 39'*j*, and the other is shut by contact plate 39'*c*, thereby enabling the vehicle to start for advancing and reversing swiftly.

At the positions (c) and (f) shown in FIG. 44, one of orifices 80U and 80L is put on the end of corresponding second transverse groove 39'*i* or 39'*j* so that the opening is tightened. During deceleration of advancing and reversing by returning to neutral, when control arm 39' passes the positions (c) or (f), the excessive pressure oil in the higher-pressured oil passage 5'*a* or 5'*b* is drained through corresponding orifice 80U or 80L and second transverse groove 39'*i* or 39'*j*, thereby moderating the decelerating shook. At the positions (d) and (g), both orifices 80U and 80L are shut so that the HST can be operated with the whole of its capacity.

Referring to FIGS. 45 through 48, modifications of the second embodiment of control arm 39' will be described.

Figure 45:
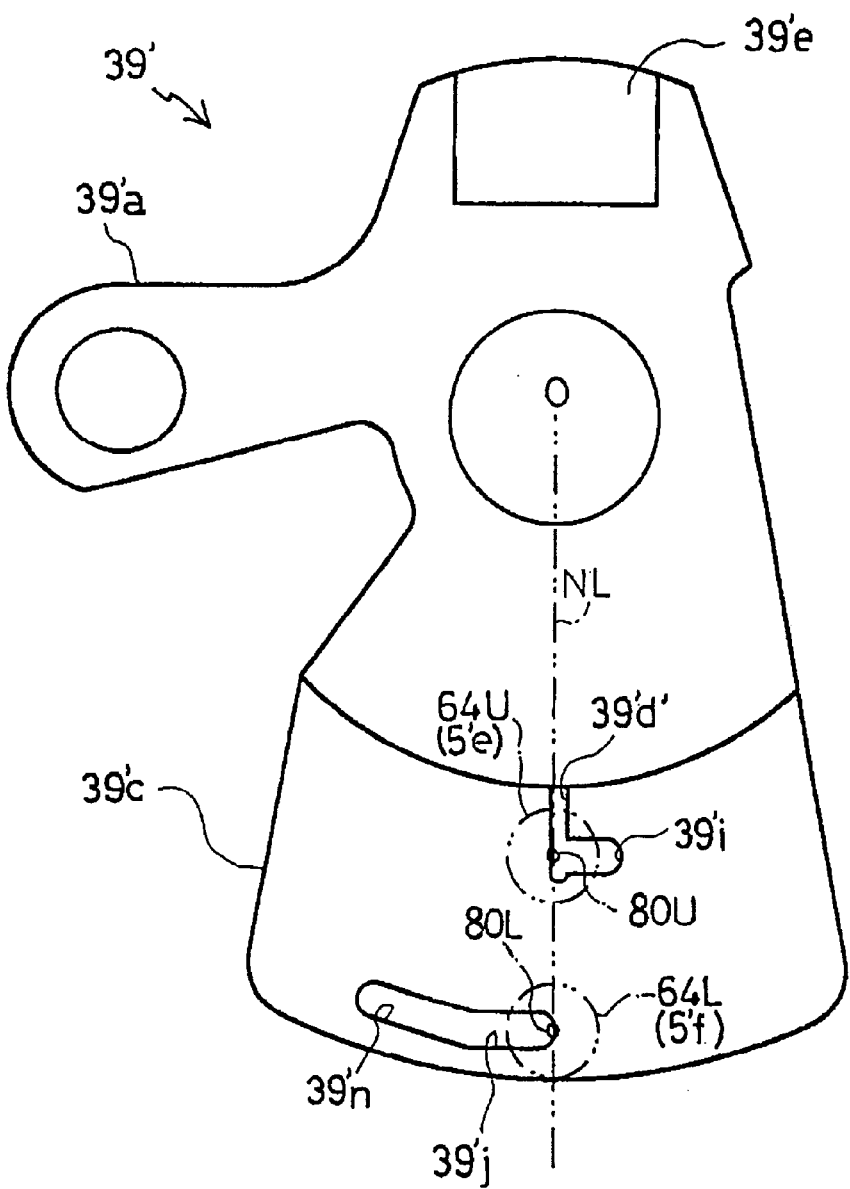
FIG. 45 is a side view of a first modification of the second embodiment of control arm 39' in neutral position N.
Figure 46:
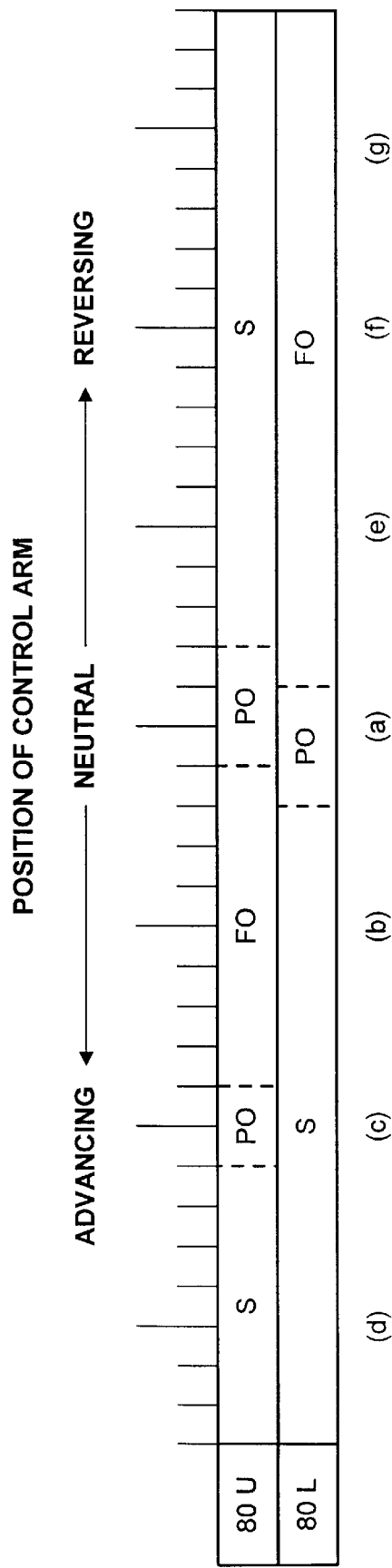
FIG. 46 is a schematic diagram showing opening conditions of orifices 80U and 80L in relation to the rotational positions of the first modification of the second embodiment of control arm 39' shown in FIG. 45.

With regard to a first modification shown in FIG. 45, lower vertical groove 39'*d*" is removed. Extending groove 39'*n* is extended from the end of lower second transverse groove 39'*j*, whereby lower orifices 80L is fully open to the series of grooves 39'*j* and 39'*n* during the whole reversing range R as shown in FIG. 46, so that the excessive pressure oil in higher-pressured second oil passage 5'*b* is drained so as to moderate the dynamic brake during deceleration of advancing. The opening patterns of orifices 80U and 80L in relation to the whole rotational positions of control arm 39' of the first modification is shown in FIG. 46.

Figure 47:
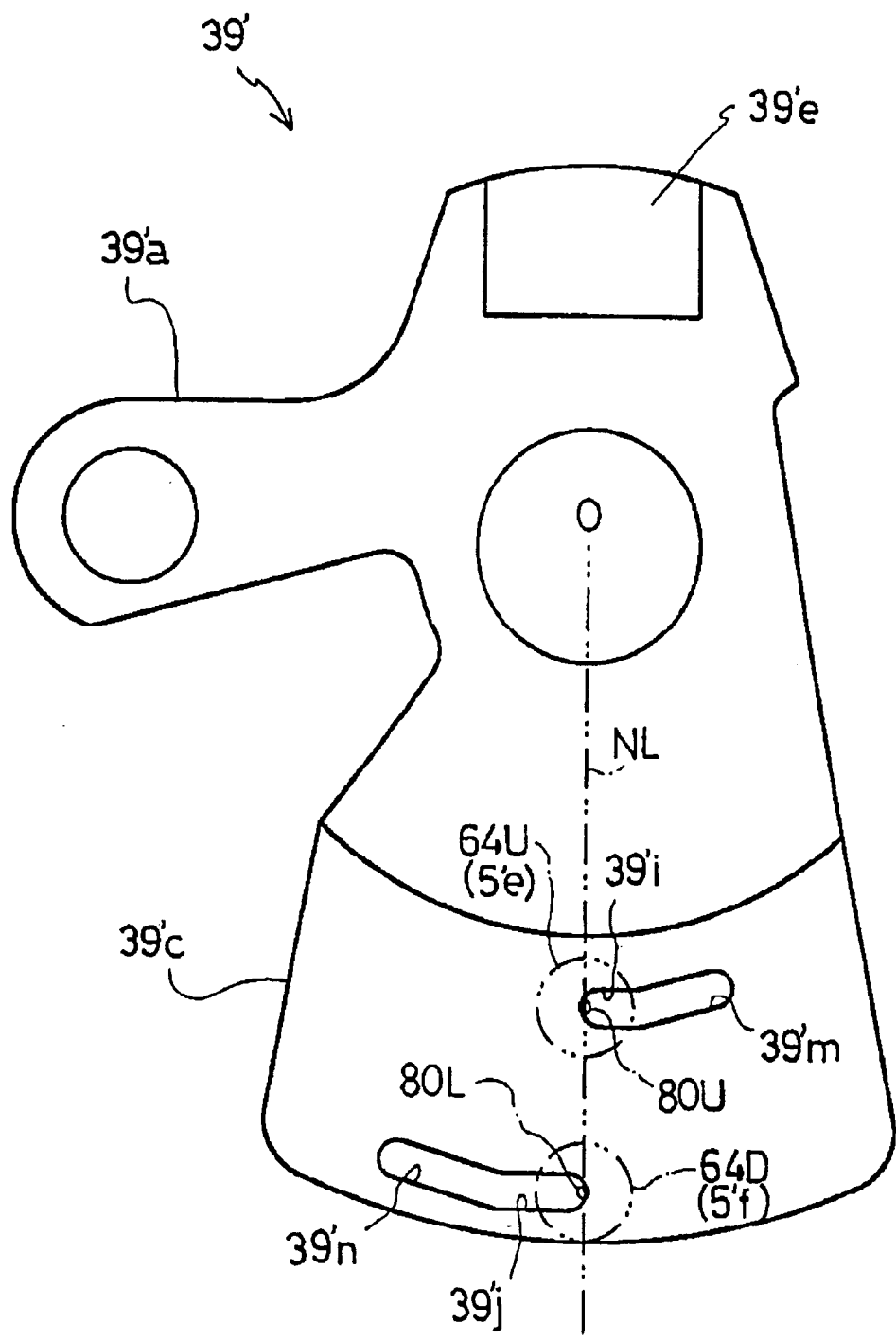
FIG. 47 is a side view of a second modification of the second embodiment of control arm 39' in neutral position N.
Figure 48:
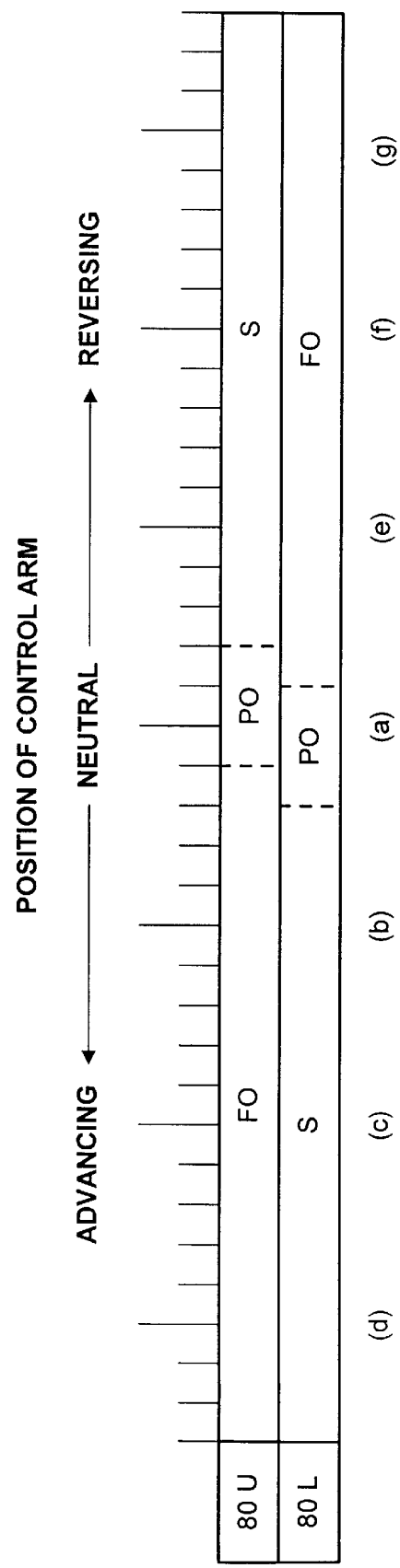
FIG. 48 is a schematic diagram showing opening conditions of orifices 80U and 80L in relation to the rotational positions of the second modification of the second embodiment of control arm 39' shown in FIG. 47.

With regard to a second modification shown in FIG. 47, upper vertical groove 39'*d*' is also removed and extending groove 39'*m* is also extended from the end of upper second transverse groove 39'*i* in addition to the construction of the first modification. Due to this construction, upper and lower orifices 80U and 80L are fully open to the respective series of grooves 39'*i* and 39'*m*, and 39'*j* and 39'*n* during the whole advancing and reversing ranges A and R as shown in FIG. 48, so that the excessive pressure oil in higher-pressured one of oil passages 5'*a* and 5'*b* is drained to moderate the dynamic brake during deceleration of advancing and reversing.

Next, explanation will be given on a third embodiment of control arm 39' in accordance with FIGS. 49 through 55. The third embodiment is characterized in that both orifices 80U and 80L are shut by contact plate 39'*c* when control arm 39' is located in neutral position N or the position (a) as shown in FIGS. 50, 51, 53 and 55.

Figure 49:
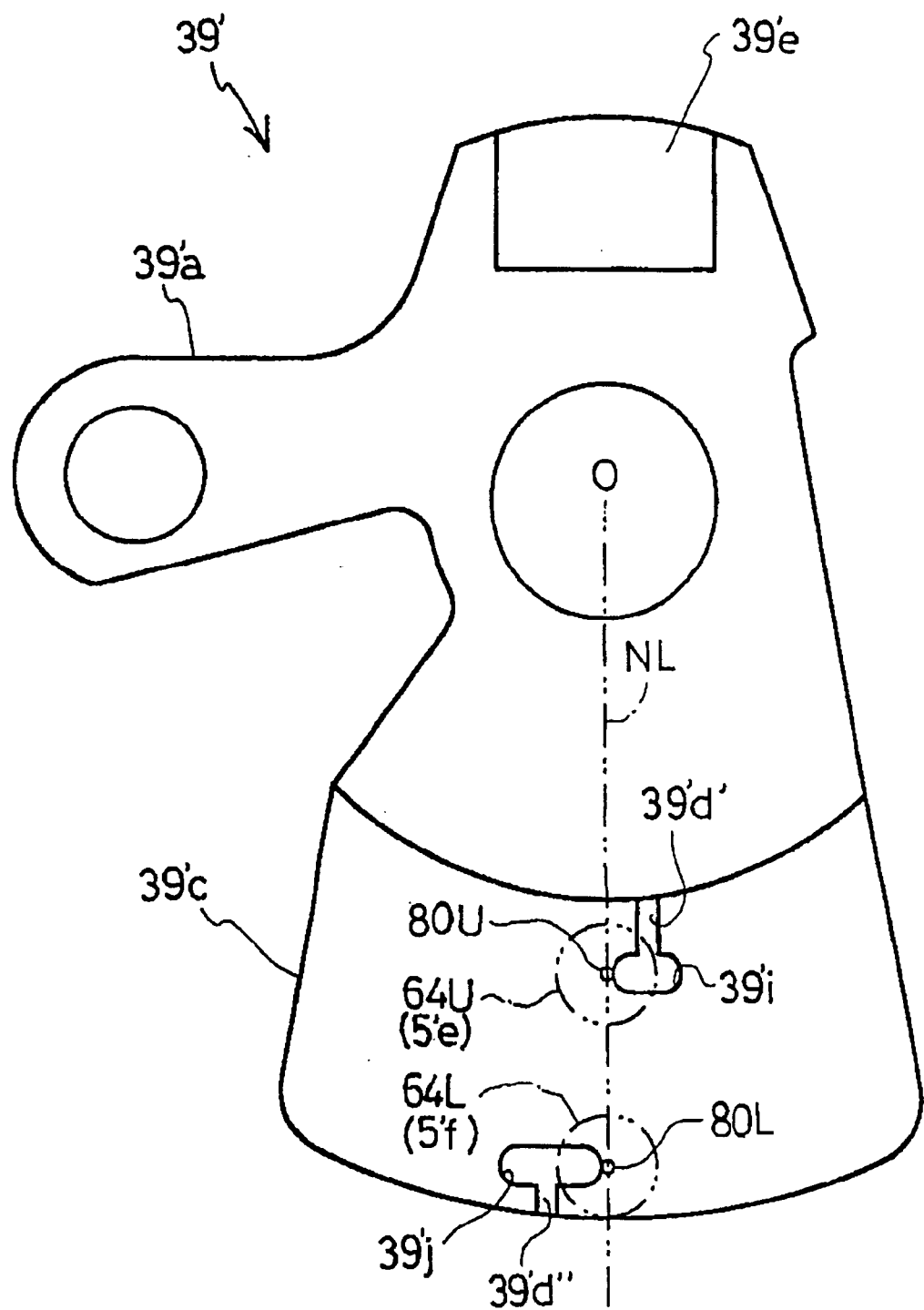
FIG. 49 is a side view of a preferred third embodiment of control arm 39' which is suitable to center section 5' with pistons 64U and 64L.
Figure 50:
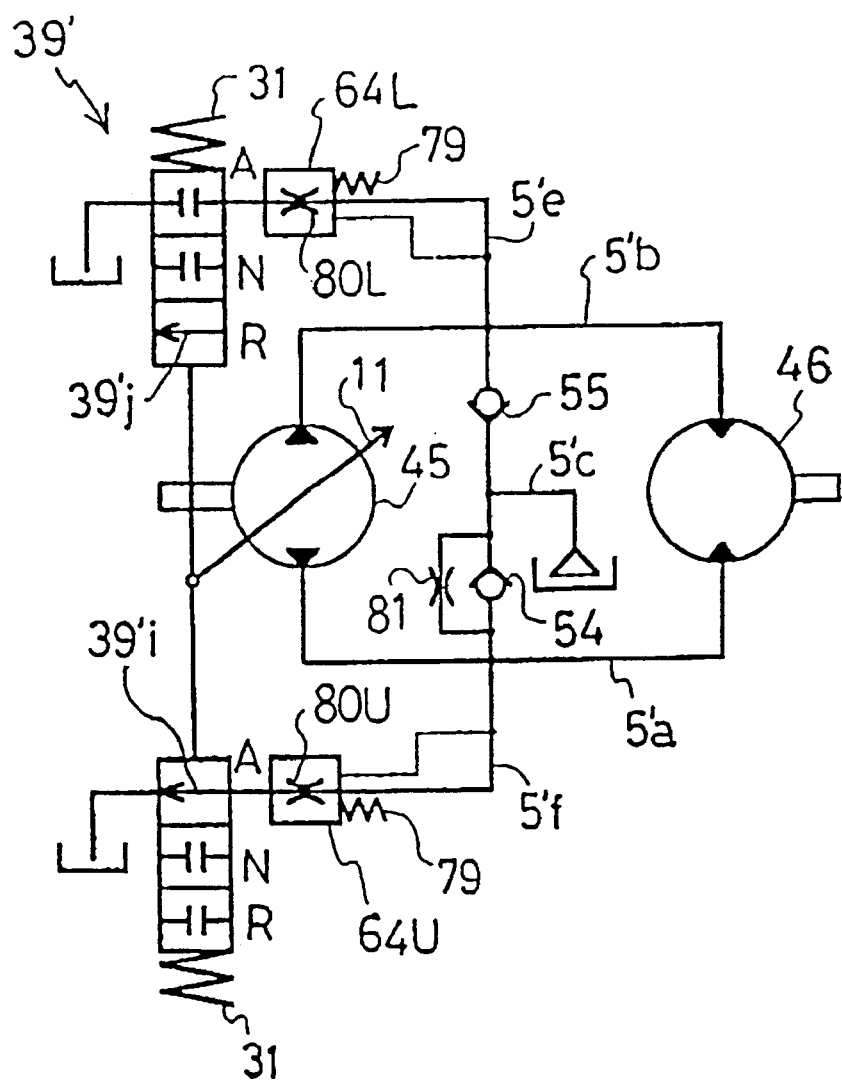
FIG. 50 is a hydraulic circuit diagram of an HST provided with center section 5' and control arm 391 according to the third embodiment shown in FIGS. 49, 52 and 54.

A preferred third embodiment of control arm 39' shown in FIG. 49 is provided with second transverse grooves 39'*i* and 39'*j* formed similar to those of the first and second embodiments of control arm 39'. Upper vertical groove 39'*d*', whose top is open to the oil sump, is offset from the vertical line constituting a horizontal center of contact plate 39'*c*, which is common with neutral line NL passing center 0 and both the centers of orifices 80U and 80L in neutral position N, so as to be connected at the lower end thereof with the intermediate portion of upper second transverse groove 39'*i*. Lower vertical groove 39'*d*", whose lower end is open to the oil sump, is offset from the same vertical line so as to be connected at the upper end thereof with the intermediate portion of lower second transverse groove 39'*j*. At the position (a) of control arm 39' as neutral position N shown in FIGS. 50 and 51, both orifices 80U and 80L are shut by contact plate 39'*c*, however, an orifice 81 is interposed between first and second oil passages 5'*a* and 5'*b* in the closed fluid circuit so as to be disposed in parallel to check valve 54 as shown in FIG. 50, thereby giving a dead zone of the HST in the neutral position thereof. The pressure oil, which is drained through orifice 81 at the neutral position, is so limited as to prevent the vehicle in neutral left on a slope from suddenly descending.

Figure 51:
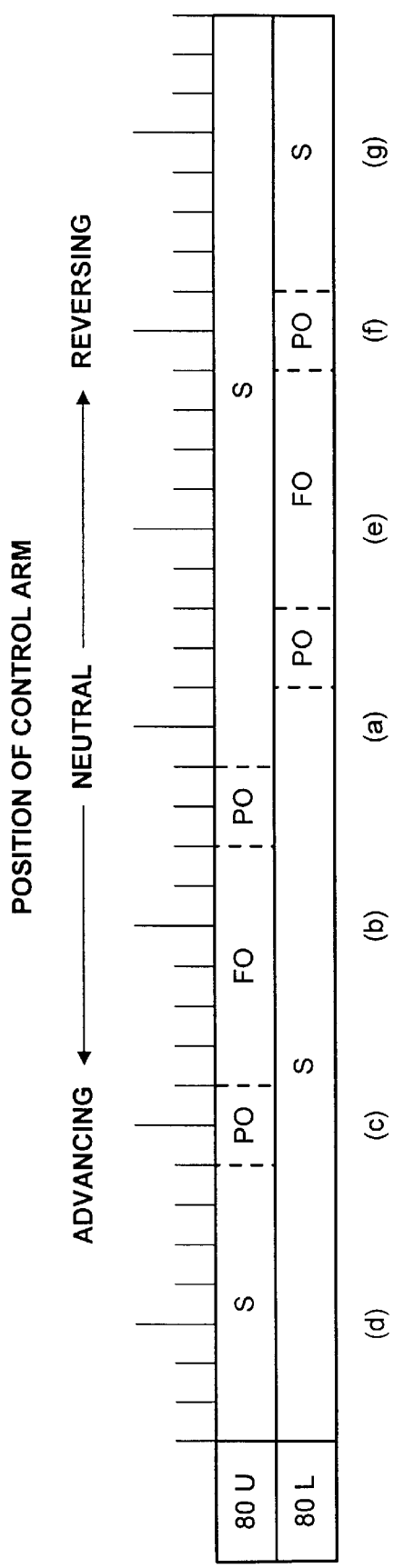
FIG. 51 is a schematic diagram showing opening conditions of orifices 60U and 80L in relation to the rotational positions of the preferred third embodiment of control arm 39' shown in FIG. 49.

As shown in FIG. 51, in case of acceleration of advancing, at the position (b) of control arm 39', lower orifice 80L connected to higher-pressured second oil passage 5'*b* is shut by contact plate 39'*c*, thereby enabling the vehicle to start swiftly.

In case of deceleration of advancing by returning to neutral, at the position (d) of control arm 39', the closed fluid circuit is back pressured so that a dynamic brake is applied on the vehicle. At the position (c), upper orifice 80U connected to higher-pressured first oil passage 5'*a* is put on the end of upper second transverse groove 39'*i* to be tightened with its opening and afterward enters it, thereby moderating the dynamic brake. Just before the neutral position as the position (b), upper orifice 80U is tightened and is finally shut by contact plate 39'*c* at the neutral position (a), thereby applying the dynamic brake on the vehicle again so as to stop it.

In case of acceleration of reversing, at the position (e) of control arm 39', upper orifice 80U connected to higher-pressured first oil passage 5'*a* is shut by contact plate 39'*e*, thereby enabling the vehicle to start swiftly.

In case of deceleration of reversing by returning to neutral, at the position (g) of control arm 39'*c*, the closed fluid circuit is back pressured so that a dynamic brake is applied on the vehicle. At the position (f), lower orifice 80L connected to higher-pressured second oil passage 5'*b* is put on the end of lower second transverse groove 39'*i* to be tightened with its opening and afterward enters it, thereby moderating the dynamic brake. Just before the neutral position as the position (e), lower orifice 80L is tightened and is finally shut by contact plate 39'*c* at the neutral position (a), thereby applying the dynamic brake on the vehicle again so as to stop it.

Referring to FIGS. 52 through 55, modification of the third embodiment of control arm 39' will be described.

Figure 52:
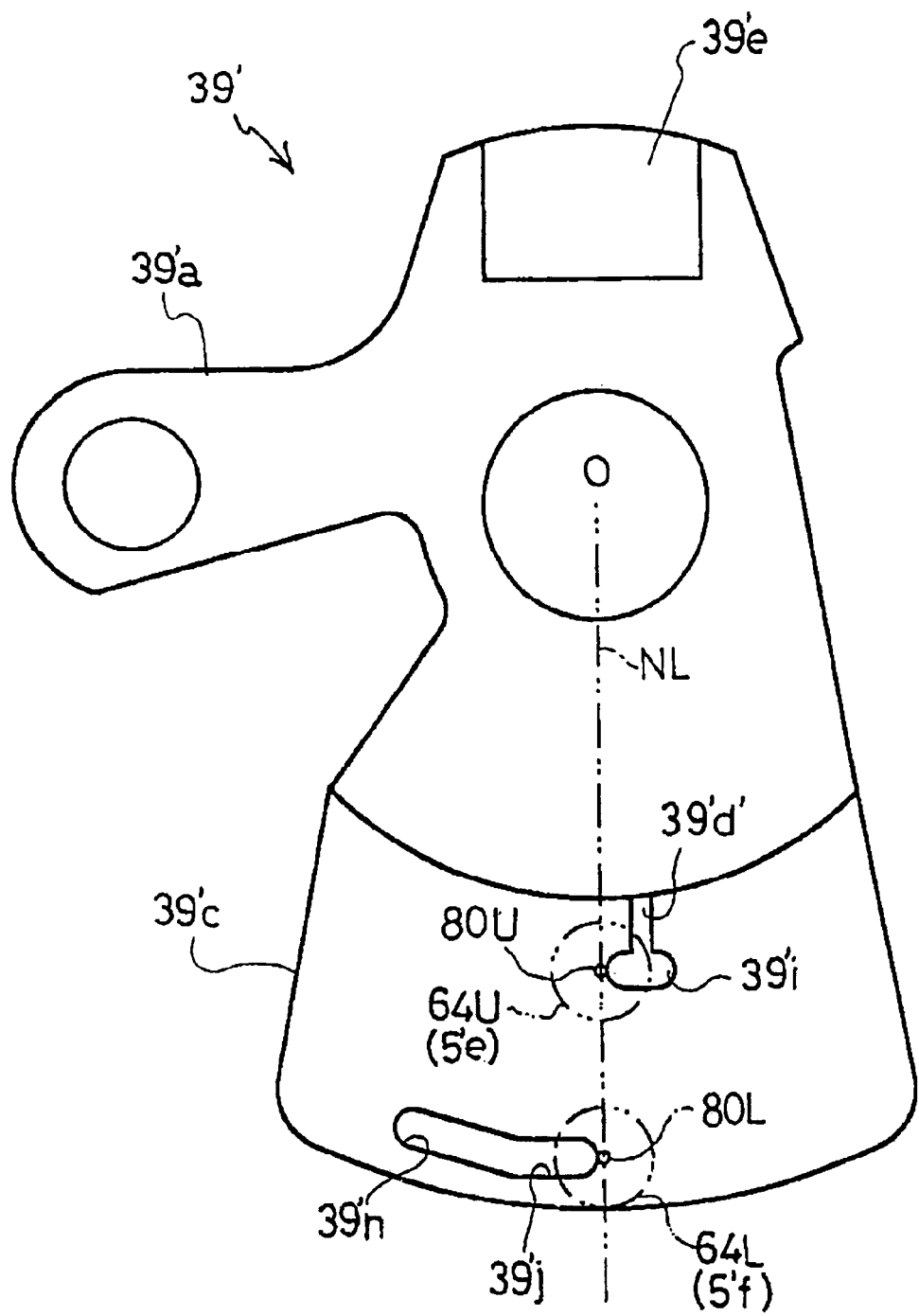
FIG. 52 is a side view of a first modification of the third embodiment of control arm 39' in neutral position N.
Figure 53:
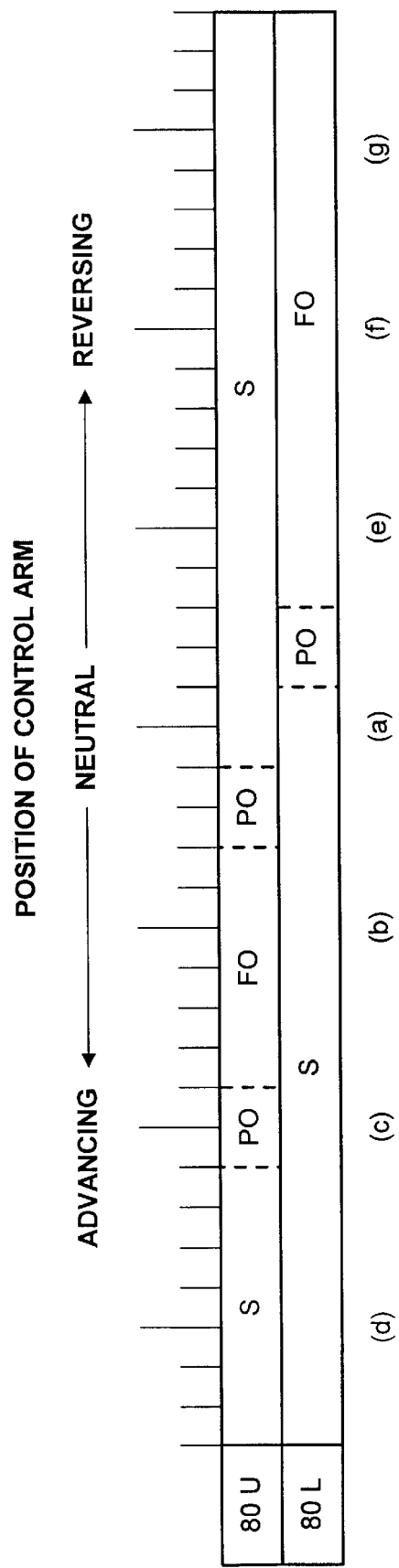
FIG. 53 is a schematic diagram showing opening conditions of orifices 80U and 80L in relation to the rotational positions of the first modification of the third embodiment of control arm 39' shown in Fig, 52.
Figure 54:
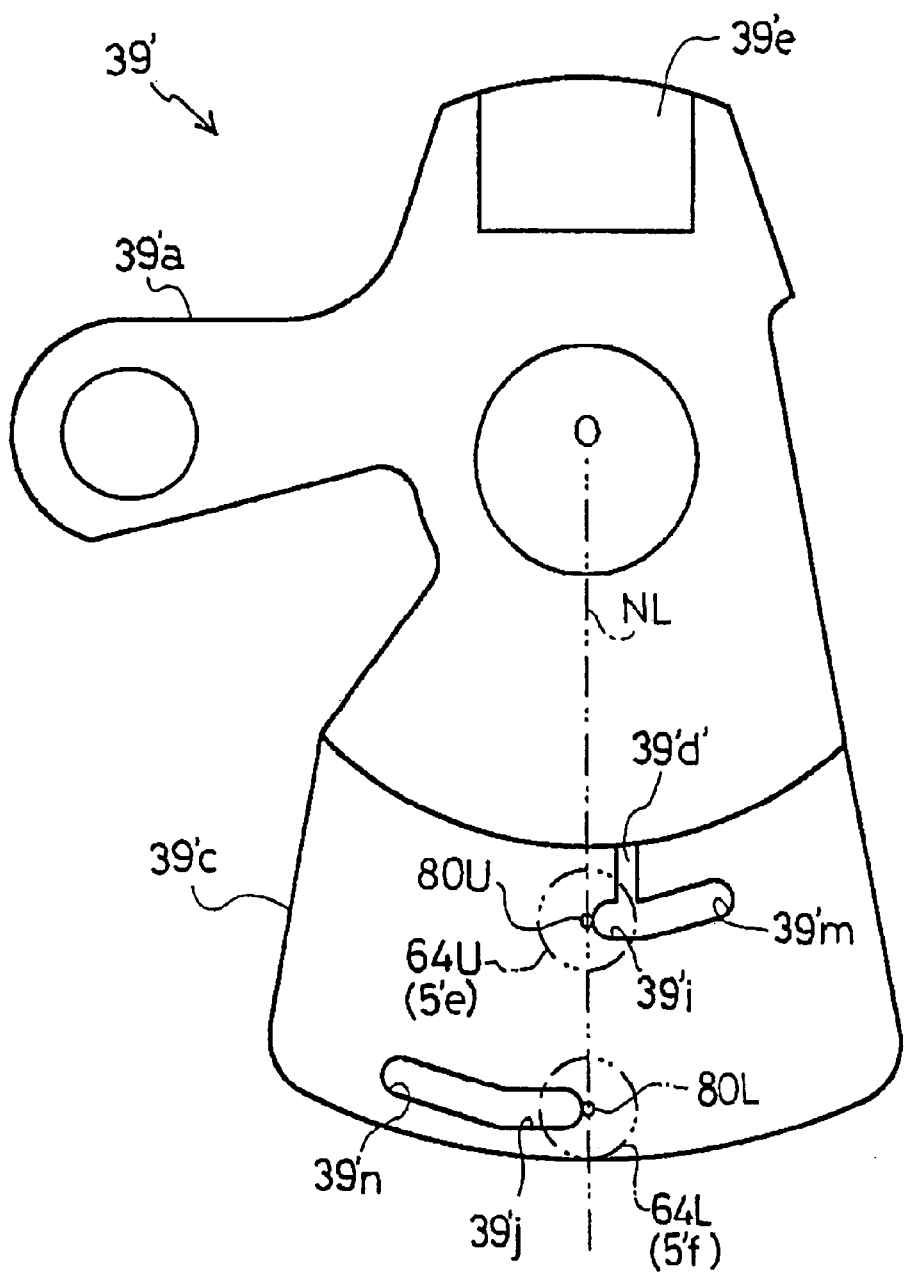
FIG. 54 is a side view of a second modification of the third embodiment of control arm 39' in neutral position N.
Figure 55:
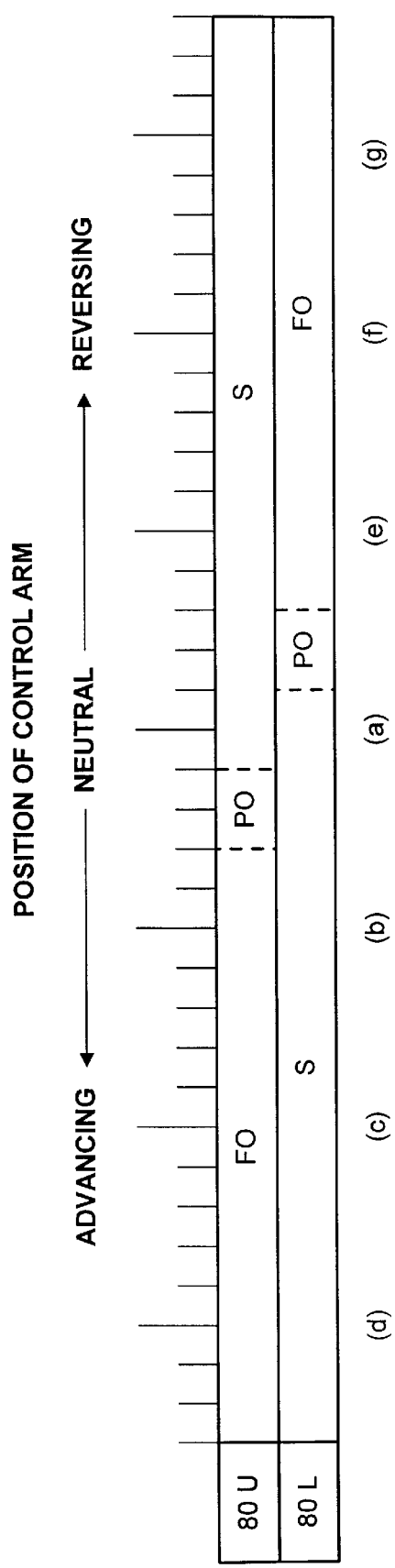
FIG. 55 is a schematic diagram showing opening conditions of orifices 80U and 80L in relation to the rotational positions of the second modification of the third embodiment of control arm 39' shown in FIG. 54.

For a first modification shown in FIG. 52, lower vertical groove 39'*d*" is removed and extending groove 39'*n* is extended from the end of lower second transverse groove 39'*j*. For a second modification shown in FIG. 54, lower vertical groove 39'*d*" is similarly removed and extending groove 39'*m* is additionally extended from the end of upper second transverse groove 38'*i*.

According to the first modification, the dynamic brake is moderated during deceleration of advancing by returning to neutral, and at the neutral position, dynamic brake is applied so as to stop the vehicle. According to the second modification, the same phenomenon also occurs during deceleration of advancing by returning to neutral.

Figure 56:
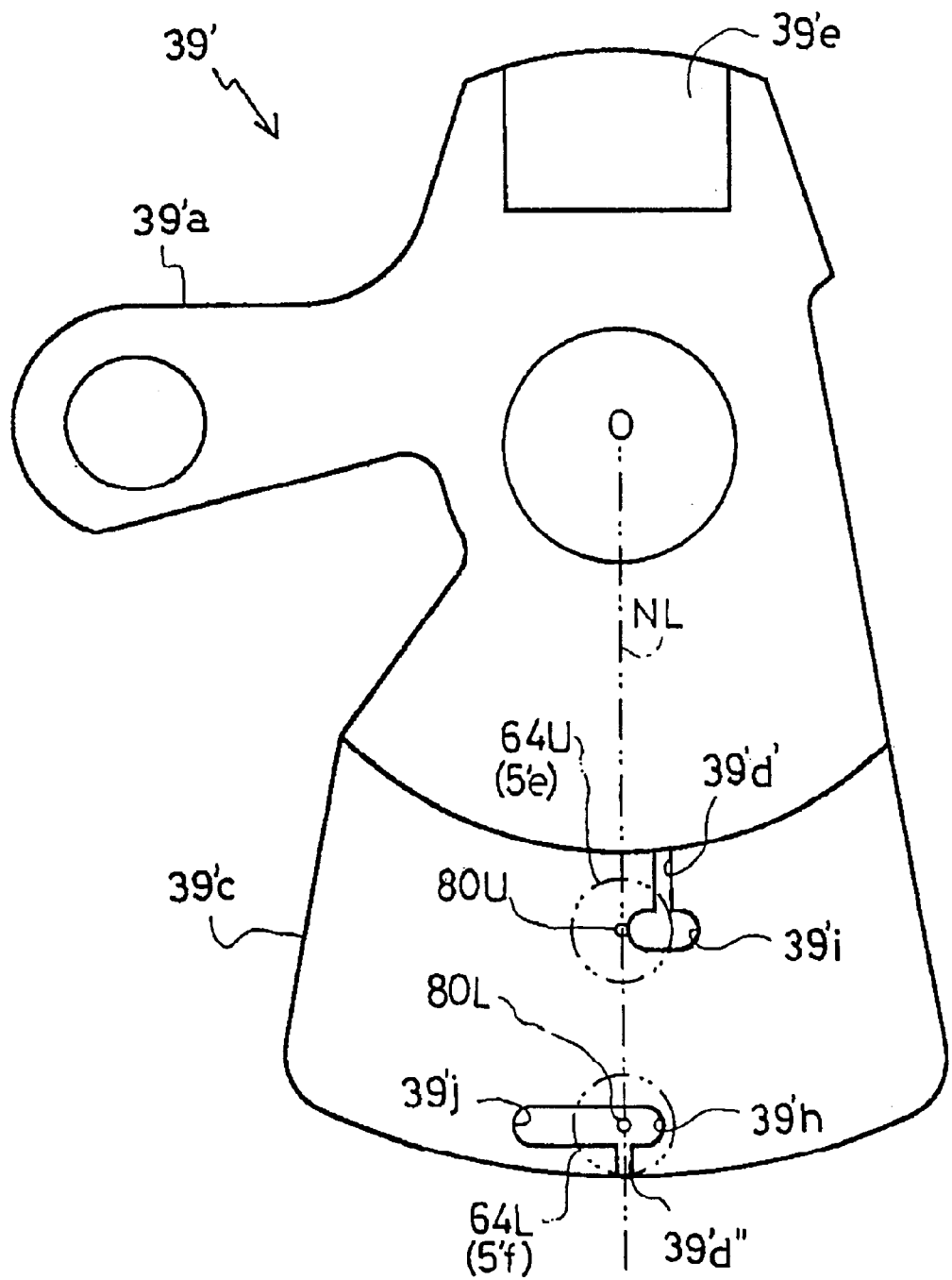
FIG. 56 is a side view of a preferred fourth embodiment of control arm 39' which is suitable to center section 5' with pistons 64U and 64L.

Next, explanation will be given on a fourth embodiment of control arm 39' in accordance with FIGS. 56 through 58. This is a mixture of first and third embodiments. In this regard, as shown in FIG. 56, vertical groove 39'*d* is divided into upper vertical groove 39'*d*' and lower vertical groove 39'*d*", which are open to the oil sump. Similar to the first embodiment, lower vertical groove 39'*d*", which is located along neutral line NL in neutral position N, is connected with lower first and second transverse grooves 39'*h* and 39'*j*. Similar to the third embodiment, upper vertical groove 39'*d*' is offset so as to be connected with the intermediate portion of upper second transverse groove 39'*i*, so that it does not communicate with upper orifice 80U at neutral position N.

Figure 57:
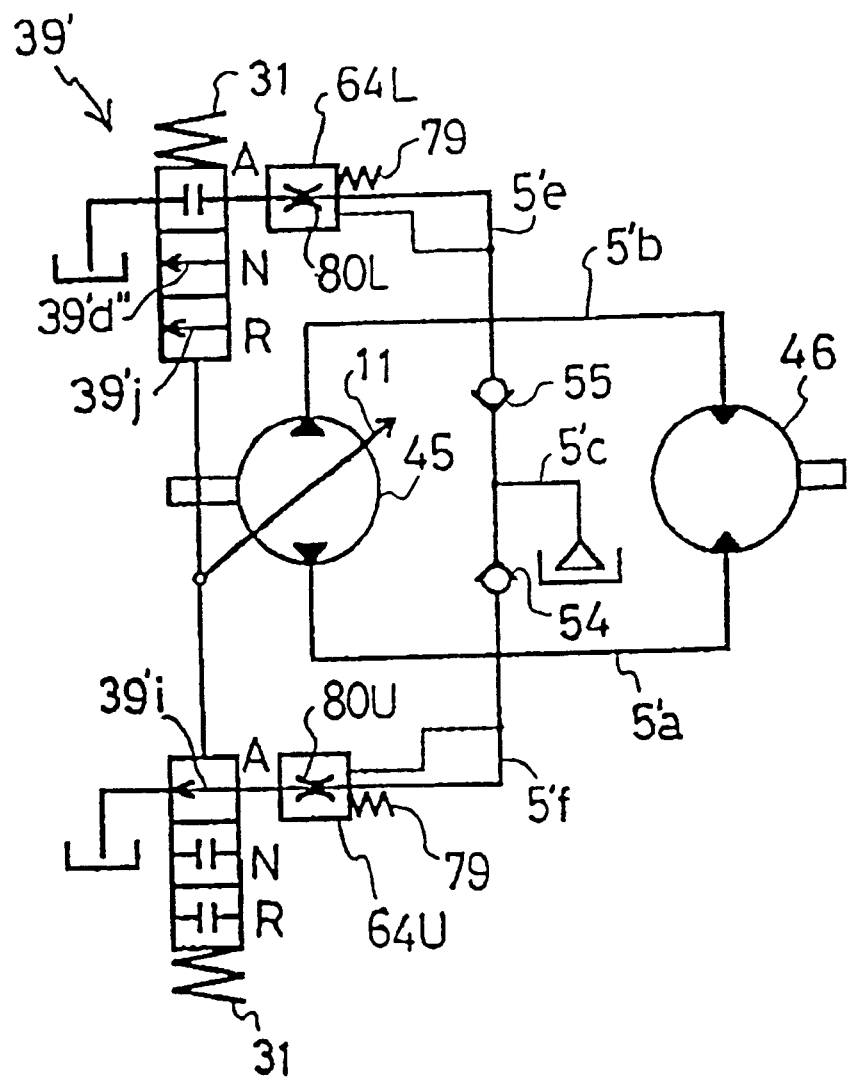
FIG. 57 is a hydraulic circuit diagram of an HST provided with center section 5' and control arm 39' according to the fourth embodiment shown in FIG. 56.
Figure 58:
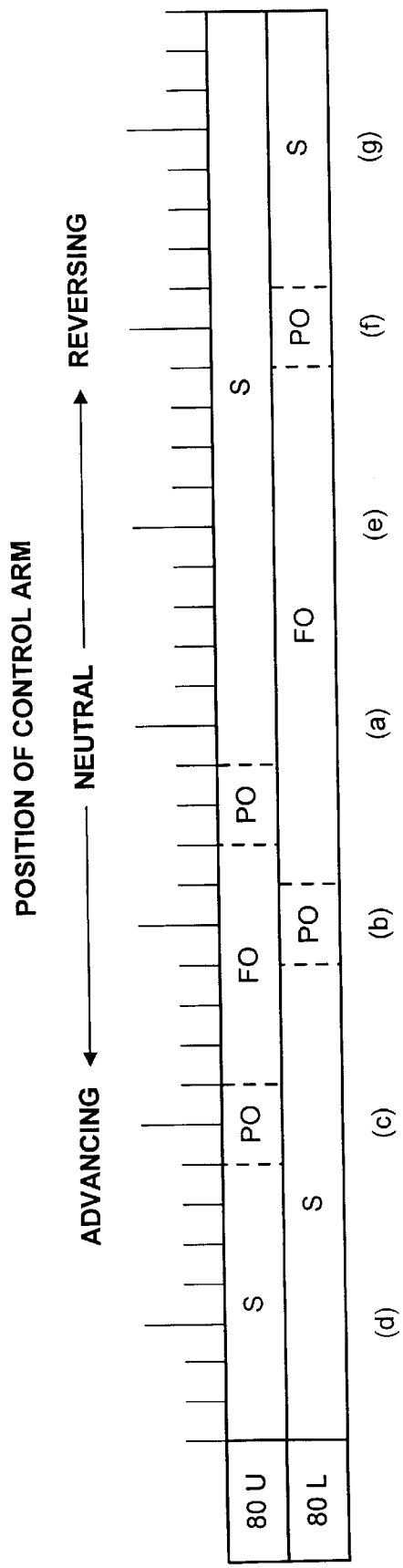
FIG. 58 is a schematic diagram showing opening conditions of orifices 80U and 80L in relation to the rotational positions of the preferred fourth embodiment of control arm 39' shown in FIG. 56.

Due to such construction, as shown in FIGS. 57 and 58, at the position (a) as neutral position N, only lower orifice 80L is fully open to the oil sump and upper orifice 80U is shut by contact plate 39'*c*, so as to limit the drained excessive pressure oil in the closed circuit in neutral position N. Hence, the vehicle in neutral left on a slope is prevented from descending.

At the position (b) as starting of advancing, the excessive pressure oil in higher-pressured second oil passage 5'*b* is drained through lower orifice 80L which is fully open to first transverse groove 39'*h* and lower vertical groove 39'*d*", thereby moderating the advancing starting shock. In this embodiment, moderation of the shock of reversing start is out of consideration so that upper first transverse groove 39'*g* is eliminated.

For a short time until reaching the neutral position during returning to neutral in advancing and reversing, one of orifices 80U and 80L enters corresponding second transverse groove 39'*i* or 39'*j*, thereby moderating the shock of deceleration and braking. Second transverse grooves 39'*i* or 39'*j* may be extended so as to form extending grooves 39'*m* or 39'*n* as the above. In this case, for all the time of returning to neutral in advancing or reversing, dynamic braking can be moderated.

As the fourth embodiment, the shape of groove on control arm 39' can be constructed by mixing any two of the above three embodiments. Also, it can be constructed by employing any two of the above various modifications. Accordingly, the orifices 80U and 80L can be made in communication with the oil sump in various timing patterns.

What is claimed is:

1. A mechanism of returning to neutral for an axle driving apparatus comprising:

a housing containing a fluid sump;

a hydrostatic transmission for driving axles, said hydrostatic transmission including a variable capacity hydraulic pump and a hydraulic motor, wherein suction and discharge ports of said hydraulic pump are connected with respective discharge and suction ports of said hydraulic motor through fluid passages;

a capacity changing member provided for said hydraulic pump, said capacity changing member being shiftable between a neutral position making said hydraulic pump discharge substantially no fluid and an acting range making said hydraulic pump discharge fluid;

a biasing member which biases said capacity changing member in said acting range so as to return to said neutral position;

orifices connecting said fluid passages to said fluid sump; and a shutting member facing said orifices so as to be operable to open and shut said orifices toward said fluid sump, wherein said shutting member is interlocked with said capacity changing member so that at least one of said orifices is open to said fluid sump in said acting range.

2. A mechanism of returning to neutral for an axle driving apparatus as set forth in claim 1, further comprising:

pistons having said orifices therethrough, said pistons being slidably fit to said respective fluid passages and being pressed at outer surfaces thereof against said shutting member by hydraulic pressure in said fluid passages, wherein said shutting member is provided with grooves so as to communicate with said orifices of said pistons.

3. A mechanism of returning to neutral for an axle driving apparatus as set forth in claim 1, wherein said hydrostatic transmission and said axles are disposed within said housing.

4. A mechanism of returning to neutral for an axle driving apparatus as set forth in claim 1, further comprising:

a predetermined position provided in said acting range, wherein in the case of returning of said capacity changing member in said acting range to said neutral position, said shutting member shuts both said orifices of said pistons until said capacity changing member reaches said predetermined position, and after said capacity changing member passes said predetermined position until said neutral position, said shutting member allows one of said orifices to open toward said fluid sump while still shutting the other of said orifices.

5. A mechanism of returning to neutral for an axle driving apparatus as set forth in claim 1, wherein during returning of said capacity changing member in said acting range to said neutral position, said shutting member shuts one of said orifices and allows the other of said orifices to open toward said fluid sump at any position in said acting range.

6. A mechanism of returning to neutral for an axle driving apparatus as set forth in claim 1, wherein at the moment that said capacity changing member leaves said neutral position, said shutting member allows both said orifices to open toward said fluid sump, and when said capacity changing member is further apart from said neutral position, said shutting member shuts one of said orifices.

7. A mechanism of returning to neutral for an axle driving apparatus as set forth in claim 1, wherein when said capacity changing member is in said neutral position, said shutting member allows both said orifices to open fully or partly toward said fluid sump.

8. A mechanism of returning to neutral for an axle driving apparatus as set forth in claim 1, further comprising at least one groove formed in said shutting member, wherein said at least one orifice is open to said fluid sump when said at least one groove comes into contact with said at least one orifice.

9. A mechanism of returning to neutral for an axle driving apparatus as set forth in claim 8, wherein said at least one groove is transverse to a line extending from a center of curvature of said shutting member to one of said orifices.

10. A mechanism of returning to neutral for an axle driving apparatus comprising:

a housing containing a fluid sump;

a hydrostatic transmission for driving axles, said hydrostatic transmission including a variable capacity hydraulic pump and a hydraulic motor, wherein suction and discharge ports of said hydraulic pump are connected with respective discharge and suction ports of said hydraulic motor through fluid passages;

a capacity changing member provided for said hydraulic pump, said capacity changing member being shiftable between a neutral position making said hydraulic pump discharge substantially no fluid and an acting range making said hydraulic pump discharge fluid;

a biasing member which biases said capacity changing member in said acting range so as to return to said neutral position;

orifices connecting said fluid passages to said fluid sump;

a shutting member facing said orifices so as to be operable to open and shut said orifices toward said fluid sump, wherein said shutting member is interlocked with said capacity changing member;

pistons having said orifices therethrough, said pistons being slidably fit to said respective fluid passages and being pressed at outer surfaces thereof against said shutting member by hydraulic pressure in said fluid passages;

grooves provided in said shutting member so as to communicate with said orifices of said pistons; and biasing members pushing said pistons so as to press the outer surfaces thereof against said shutting member, wherein the biasing forces of said biasing members for pushing said pistons are smaller than that of said biasing member for returning said capacity changing member to neutral.

11. A mechanism for returning to neutral for an axle driving apparatus comprising:

a housing containing a fluid sump;

a hydrostatic transmission for driving axles, said hydrostatic transmission including a variable capacity hydraulic pump and a hydraulic motor, wherein suction and discharge ports of said hydraulic pump are connected with respective discharge and suction ports of said hydraulic motor through fluid passages;

a capacity changing member provided for said hydraulic pump, said capacity changing member being shiftable between a neutral position making said hydraulic pump discharge substantially no fluid and an acting range making said hydraulic pump discharge fluid;

a biasing member which biases said capacity changing member in said acting range so as to return to said neutral position;

orifices connecting said fluid passages to said fluid sump; and a shutting member facing said orifices so as to be operable to open and shut said orifices toward said fluid sump, wherein said shutting member is interlocked with said capacity changing member so that at least one of said orifices is open to said fluid sump during returning of said capacity changing member from said acting range to said neutral position, wherein when said capacity changing member is in said neutral position, said shutting member shuts one of said orifices.

12. A mechanism of returning to neutral for an axle driving apparatus as set forth in claim 11, wherein when said capacity changing member is in said neutral position, said shutting member shuts both said orifices.

* * * * *